US010911596B1

(12) United States Patent
Do et al.

(10) Patent No.: US 10,911,596 B1
(45) Date of Patent: Feb. 2, 2021

(54) VOICE USER INTERFACE FOR WIRED COMMUNICATIONS SYSTEM

(71) Applicant: Amazon Technologies, Inc., Seattle, WA (US)

(72) Inventors: Tu Dien Do, Kanata (CA); Cheuk-man Kong, Toronto (CA); Mee Tchin Jane John Chuan, Richmond Hill (CA); Usman Ismail, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 15/692,747

(22) Filed: Aug. 31, 2017

(51) Int. Cl.
*H04M 3/00* (2006.01)
*H04L 12/66* (2006.01)
(Continued)

(52) U.S. Cl.
CPC ........ *H04M 3/42068* (2013.01); *G06F 3/167* (2013.01); *G10L 13/00* (2013.01);
(Continued)

(58) Field of Classification Search
CPC .. H04M 3/533; H04M 7/006; H04M 3/42042; H04M 3/2254; H04M 3/4228; H04M 3/42314; H04M 3/42323; H04M 1/575; H04M 3/436; H04M 1/663; H04M 2201/40; H04M 2203/2038; H04M 3/42229; H04M 2242/22; H04M 3/42382;
(Continued)

(56) References Cited

U.S. PATENT DOCUMENTS 7,804,815 B1 9/2010 Stahl
7,822,188 B1 10/2010 Kirchhoff et al.
(Continued)

FOREIGN PATENT DOCUMENTS

EP 0568979 A1 11/1993
EP 1041779 A2 10/2000
(Continued)

OTHER PUBLICATIONS

International Search Report and Written Opinion for Application No. PCT/US2017/047611, dated Nov. 6, 2017.
(Continued)

*Primary Examiner* — Ahmad F. Matar
*Assistant Examiner* — Kharye Pope
(74) *Attorney, Agent, or Firm* — Pierce Atwood LLP

(57) ABSTRACT

A system capable of connecting a device to a Public Switched Telephone Network (PSTN) using an adapter. During a telephone call using the PSTN, the adapter may receive an incoming call from the PSTN and send caller identification to remote server(s). The remote server(s) may determine an identity of a first user currently on the telephone call and determine that the incoming call is directed to a second user. Based on the caller identification, the remote server(s) may send a notification to the second user indicating the incoming call. Alternatively, the remote server(s) may interrupt the current telephone call to announce the incoming call. For example, if a parent is on the telephone when an incoming call for a child is received, the remote server(s) may send a text message to the child without interrupting the current telephone call.

21 Claims, 33 Drawing Sheets

(51) Int. Cl.
*H04M 3/42* (2006.01)
*H04M 3/436* (2006.01)
*H04M 3/432* (2006.01)
*G06F 3/16* (2006.01)
*G10L 13/00* (2006.01)
*G10L 17/00* (2013.01)

(52) U.S. Cl.
CPC ......... *G10L 17/00* (2013.01); *H04M 3/42382* (2013.01); *H04M 3/432* (2013.01); *H04M 3/4365* (2013.01)

(58) Field of Classification Search
CPC .... H04M 1/576; H04M 2250/74; H04Q 3/72; H04Q 2213/1322; H04Q 2213/13091; H04Q 3/0029; H04Q 3/74; G10L 15/26; G10L 15/265; G10L 17/00
USPC ............ 379/142.04, 142.01, 142.17, 142.06, 379/93.17, 88.01, 88.11, 88.17, 93.23, 379/88.02, 88.19; 370/352, 353, 355, 370/356, 354, 357
See application file for complete search history.

(56) References Cited

U.S. PATENT DOCUMENTS

| | | | | |
|---|---|---|---|---|
| 8,761,186 | B2* | 6/2014 | Binder | H04M 7/0081 370/352 |
| 9,350,557 | B2* | 5/2016 | Rivera | H04B 1/38 |
| 9,900,431 | B1* | 2/2018 | Kreiner | H04M 3/436 |
| 2003/0215078 | A1 | 11/2003 | Brahm et al. | |
| 2008/0080699 | A1* | 4/2008 | Skubnik | H04M 3/436 379/356.01 |
| 2008/0273677 | A1* | 11/2008 | Alfano | H04M 3/02 379/93.17 |
| 2008/0298575 | A1* | 12/2008 | Rondeau | H04M 3/436 379/211.01 |
| 2009/0097472 | A1 | 4/2009 | Hossain | |
| 2009/0104898 | A1 | 4/2009 | Harris | |
| 2009/0125948 | A1* | 5/2009 | Kuhlke | H04L 12/2827 725/58 |
| 2010/0216509 | A1* | 8/2010 | Riemer | H04M 1/72577 455/557 |
| 2010/0290609 | A1 | 11/2010 | Clark et al. | |
| 2011/0038469 | A1 | 2/2011 | Clark et al. | |
| 2011/0171940 | A1 | 7/2011 | Dinur | |
| 2013/0053063 | A1 | 2/2013 | McSheffrey | |
| 2014/0136195 | A1* | 5/2014 | Abdossalami | G10L 15/26 704/235 |
| 2014/0200896 | A1 | 7/2014 | Lee et al. | |
| 2014/0278444 | A1* | 9/2014 | Larson | H04M 1/72522 704/275 |
| 2015/0003599 | A1* | 1/2015 | Brunn | H04L 65/1069 379/142.04 |
| 2015/0117439 | A1* | 4/2015 | Efrati | H04L 65/1079 370/352 |
| 2017/0195625 | A1 | 7/2017 | Mahar et al. | |
| 2018/0242219 | A1* | 8/2018 | Deluca | H04W 48/02 |
| 2018/0338038 | A1* | 11/2018 | Ly | G10L 15/22 |

FOREIGN PATENT DOCUMENTS

| | | | | |
|---|---|---|---|---|
| WO | WO-2004068827 A1 * | 8/2004 | | H04M 1/725 |
| WO | 2007033459 A1 | 3/2007 | | |

OTHER PUBLICATIONS

Hart et al., Pending U.S. Appl. No. 15/392,323, entitled "Enabling Voice Control of Telephone Device"; filed Dec. 28, 2016.
"First Office Action dated Jul. 24, 2017", U.S. Appl. No. 15/392,323, 23 pages.
Hart et al., Pending U.S. Appl. No. 15/392,314, entitled "Enabling Voice Control of Telephone Device", filed Dec. 28, 2016.
"First Office Action dated Nov. 28, 2017", U.S. Appl. No. 15/392,314, 16 pages.
Kong et al., Pending U.S. Appl. No. 15/692,444, entitled "Voice User Interface for Wired Communications System", filed Aug. 31, 2017.
Chuan et al., Pending U.S. Appl. No. 15/692,964, entitled "Enabling Additional Endpoints to Connect to Audio Mixing Device", filed Aug. 31, 2017.
Hart et al., Pending U.S. Appl. No. 15/392,329, entitled "Enabling Voice Control of Telephone Device", filed Dec. 28, 2016.
"First Office Action dated Nov. 1, 2017", U.S. Appl. No. 15/392,329, 16 pages.

* cited by examiner

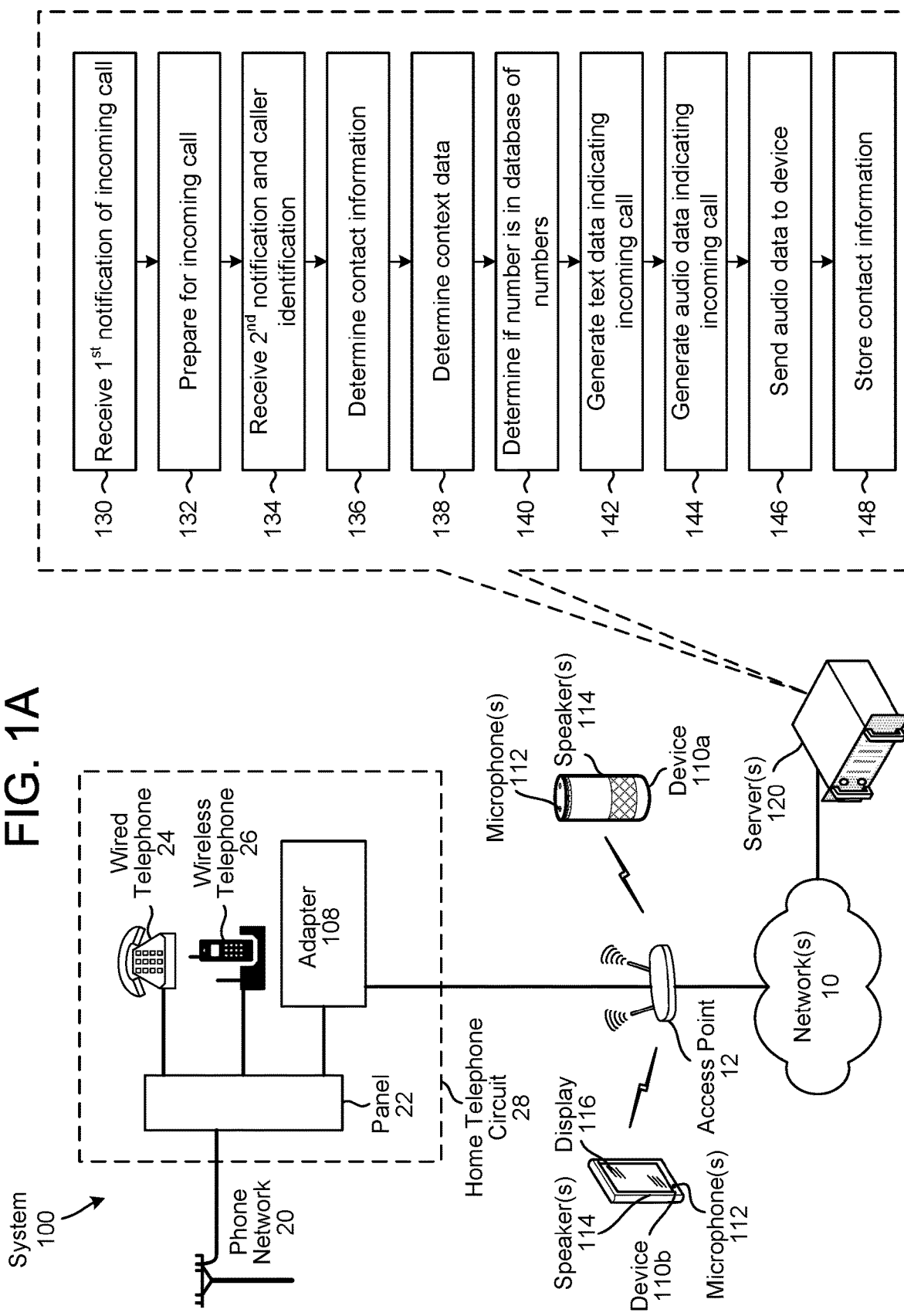

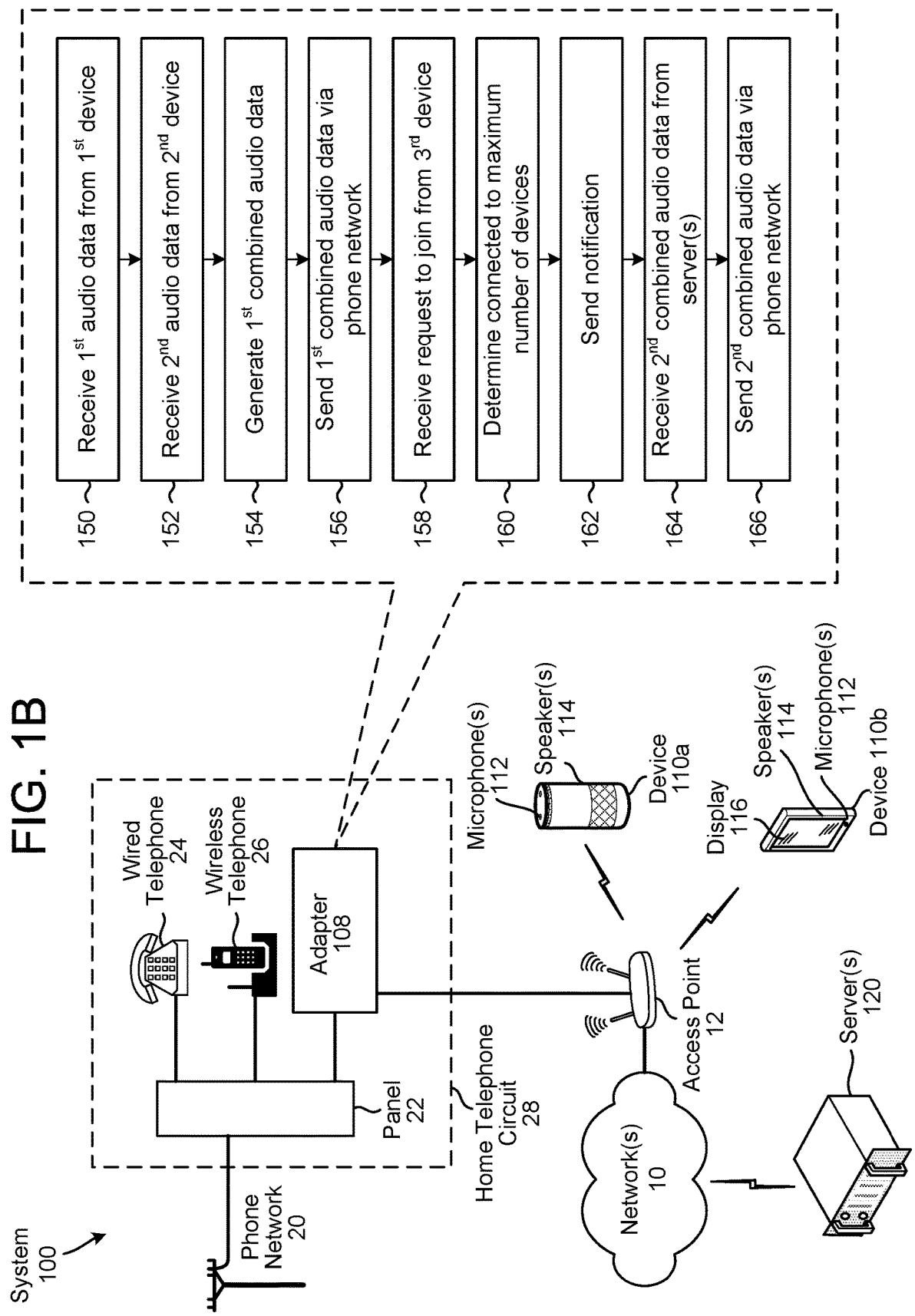

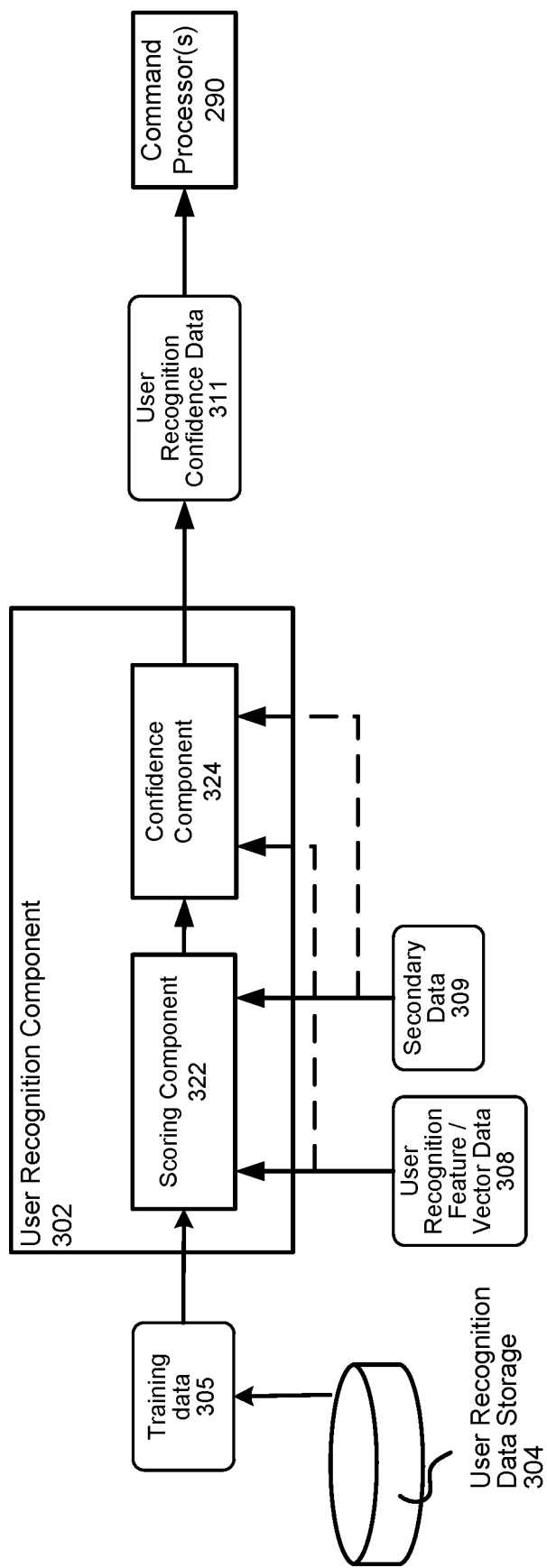

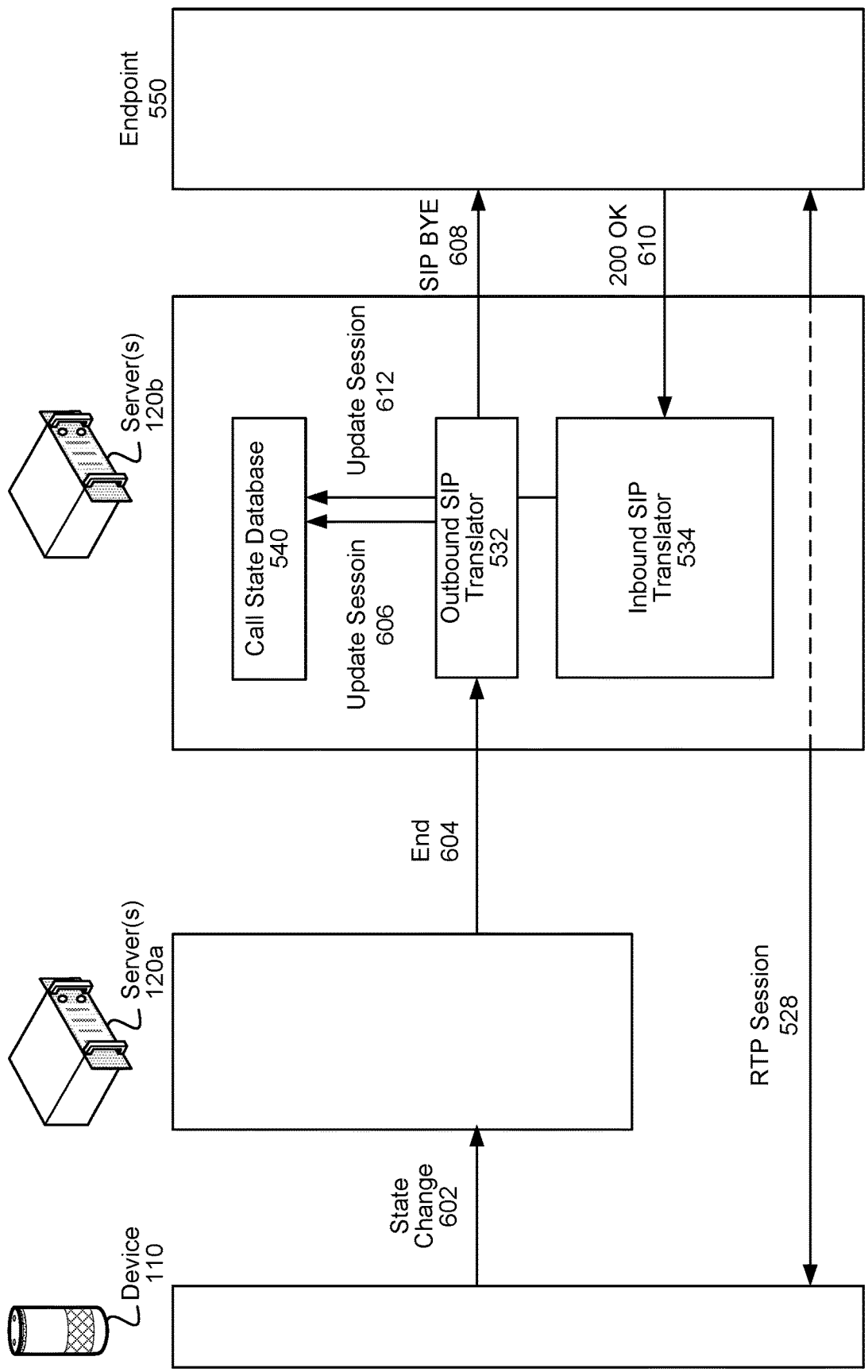

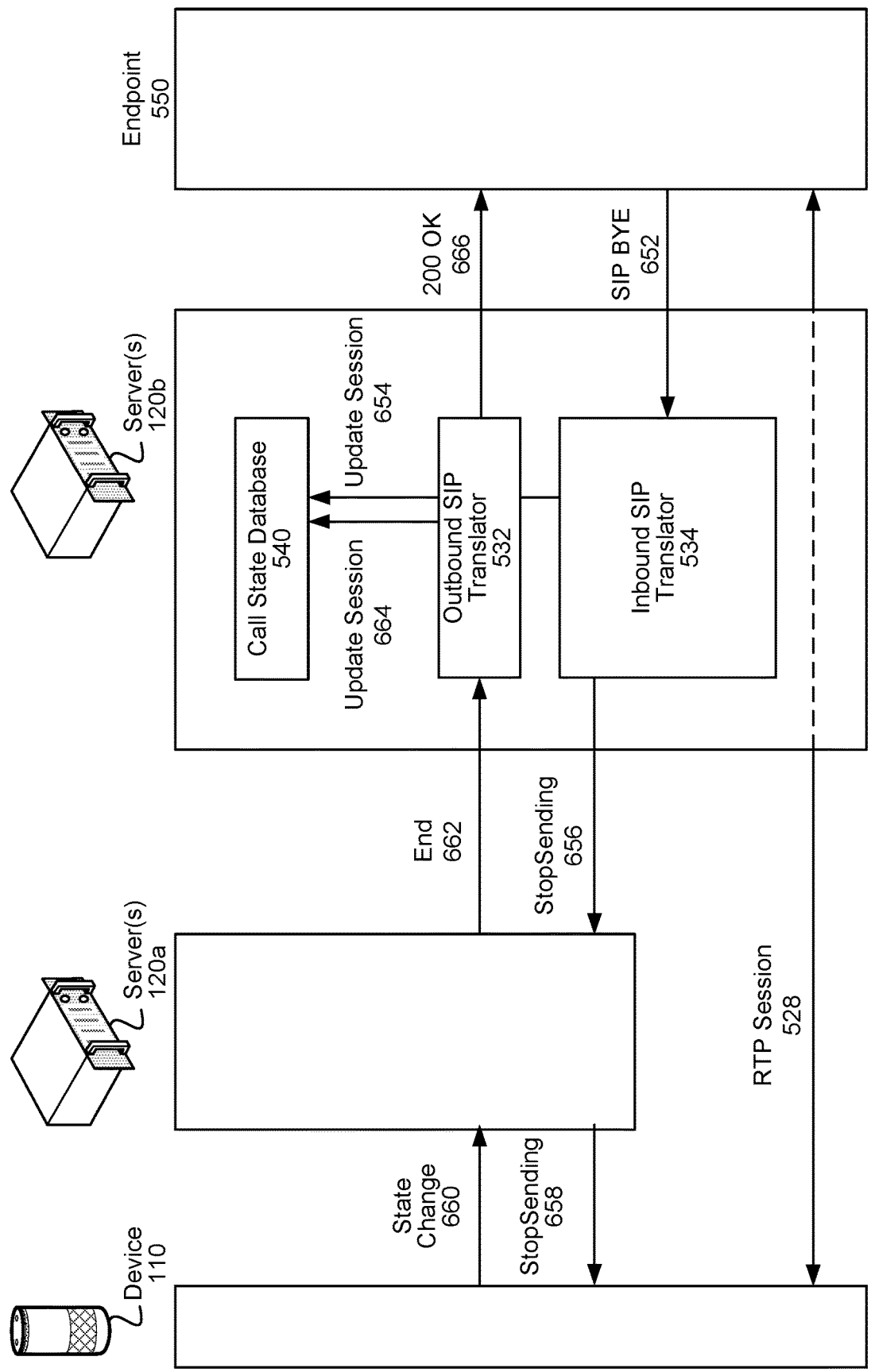

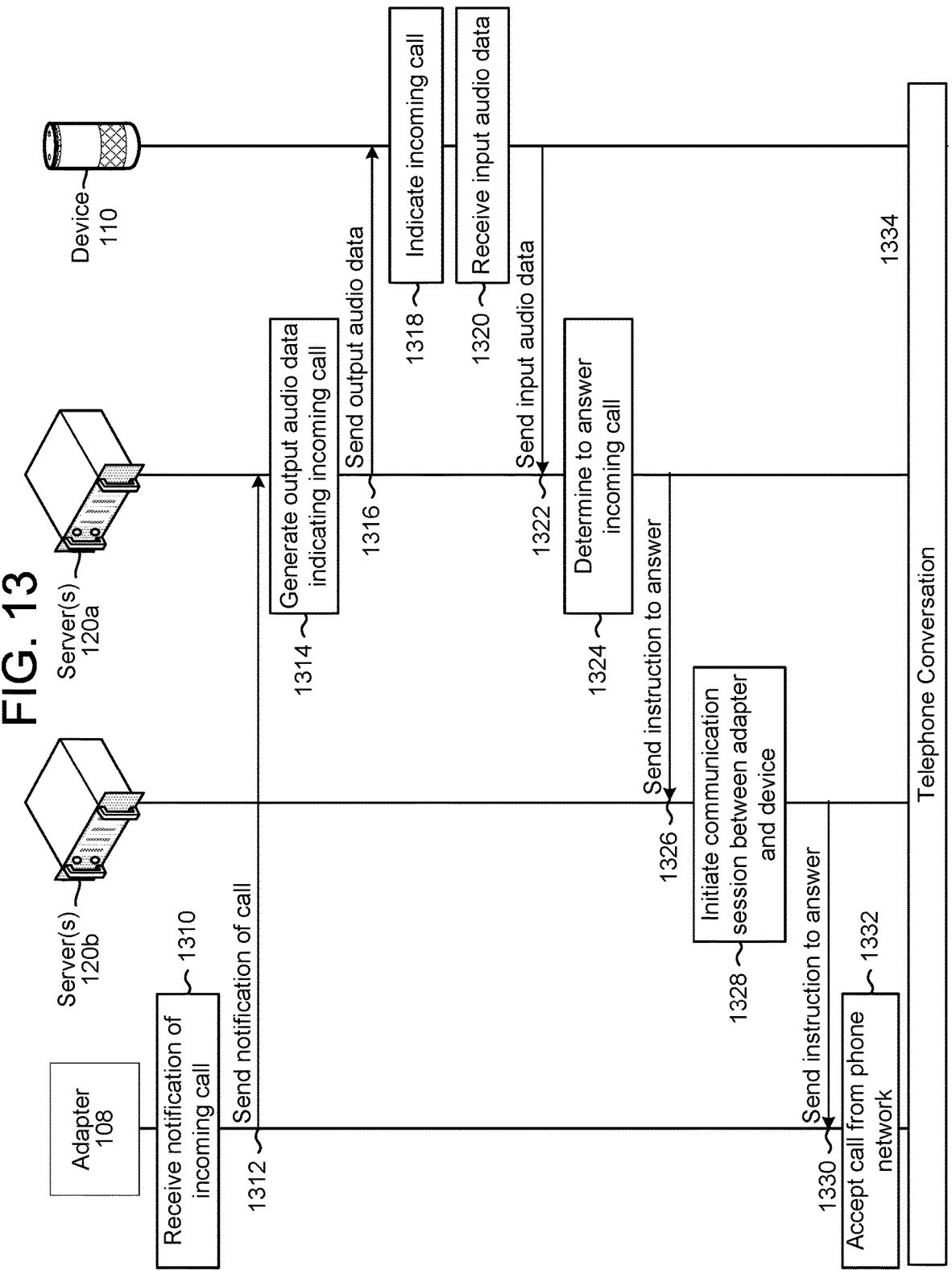

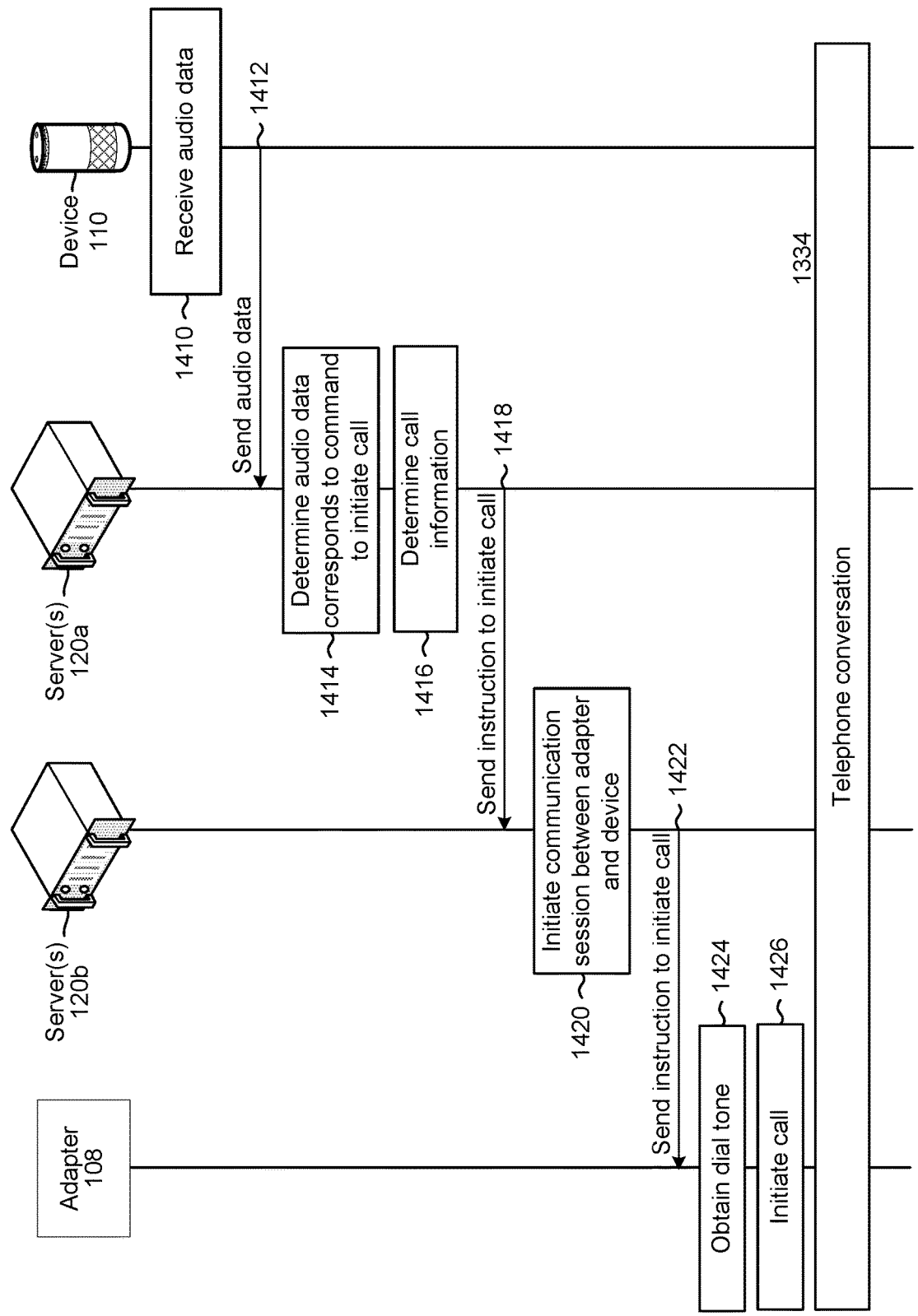

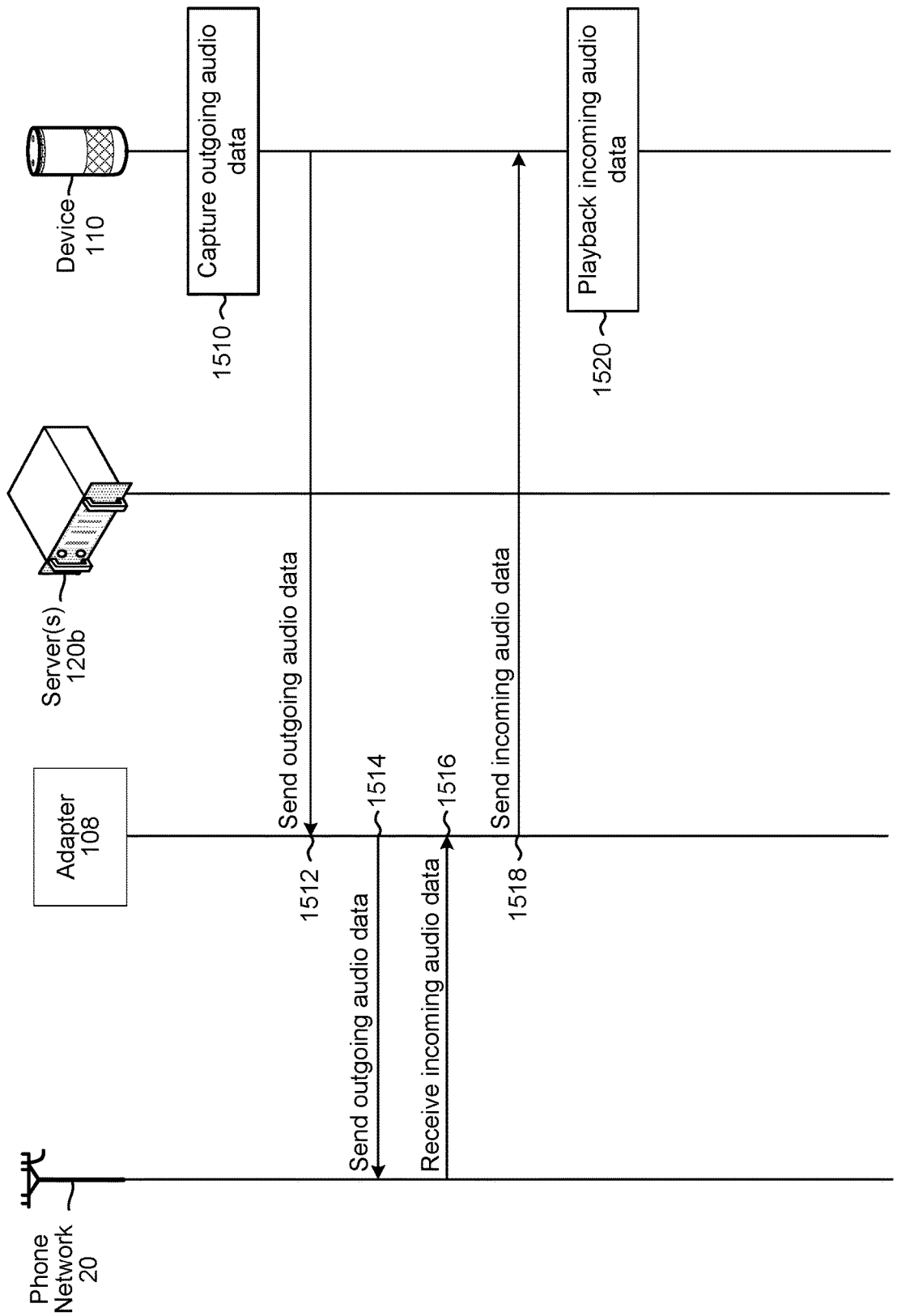

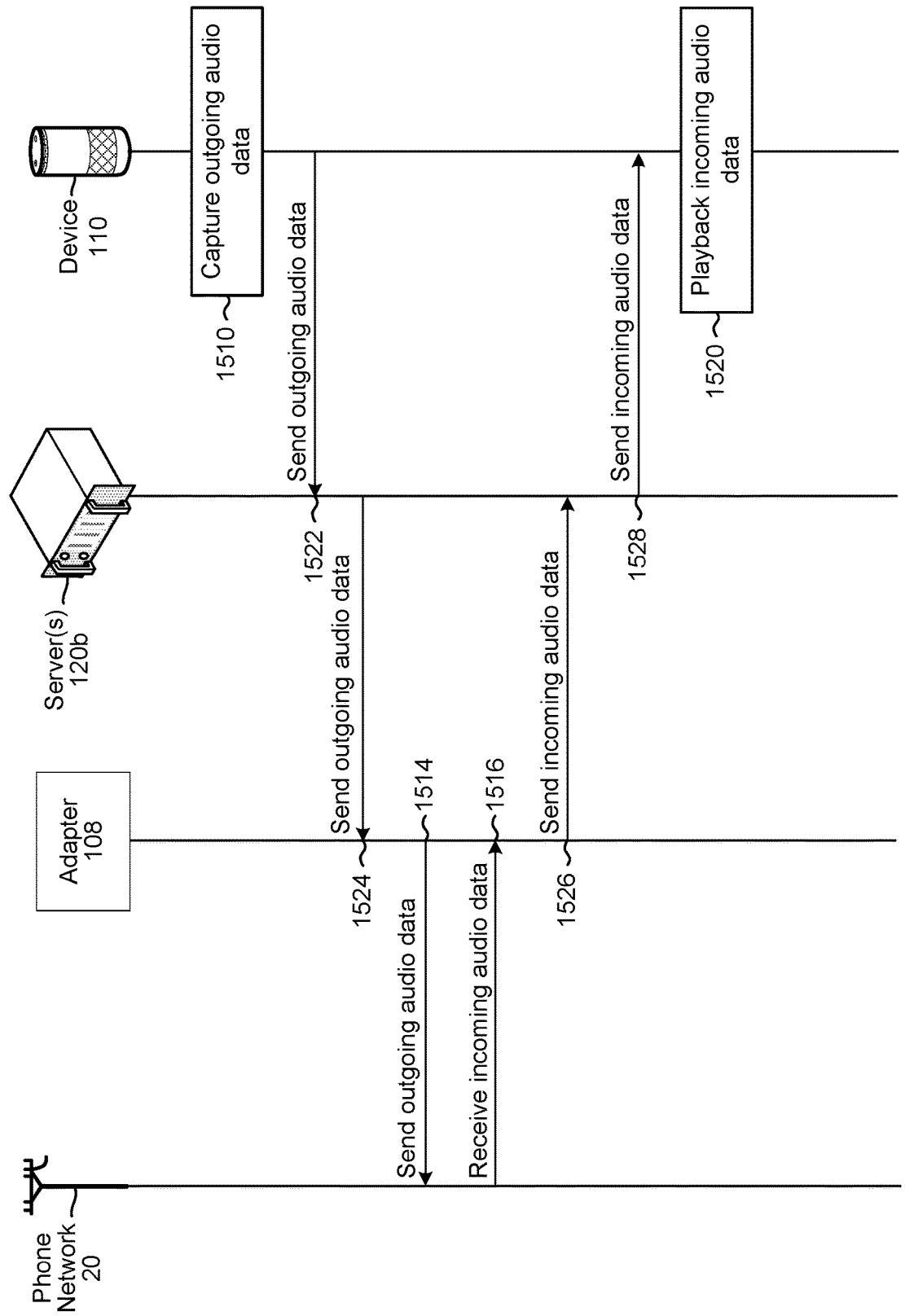

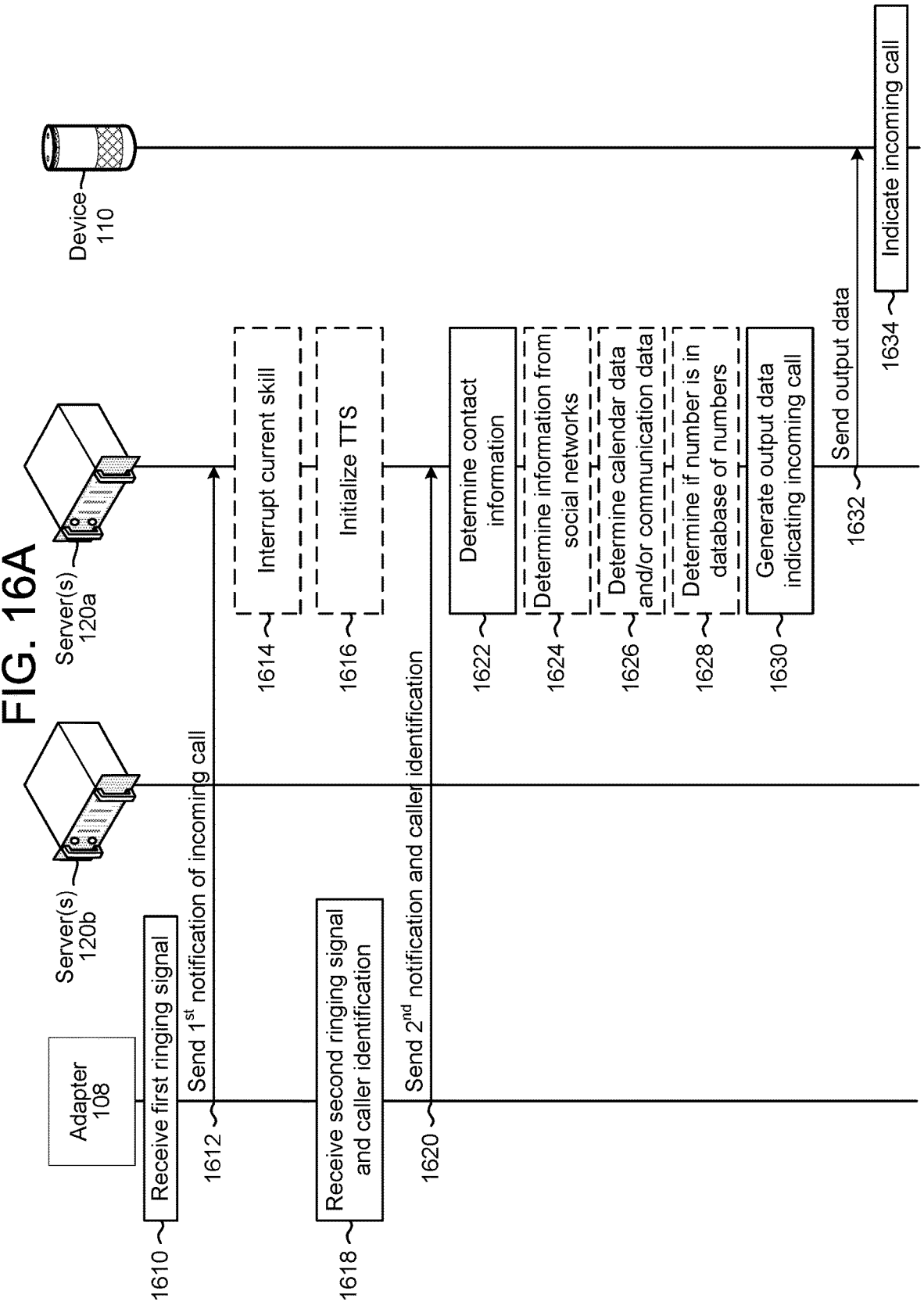

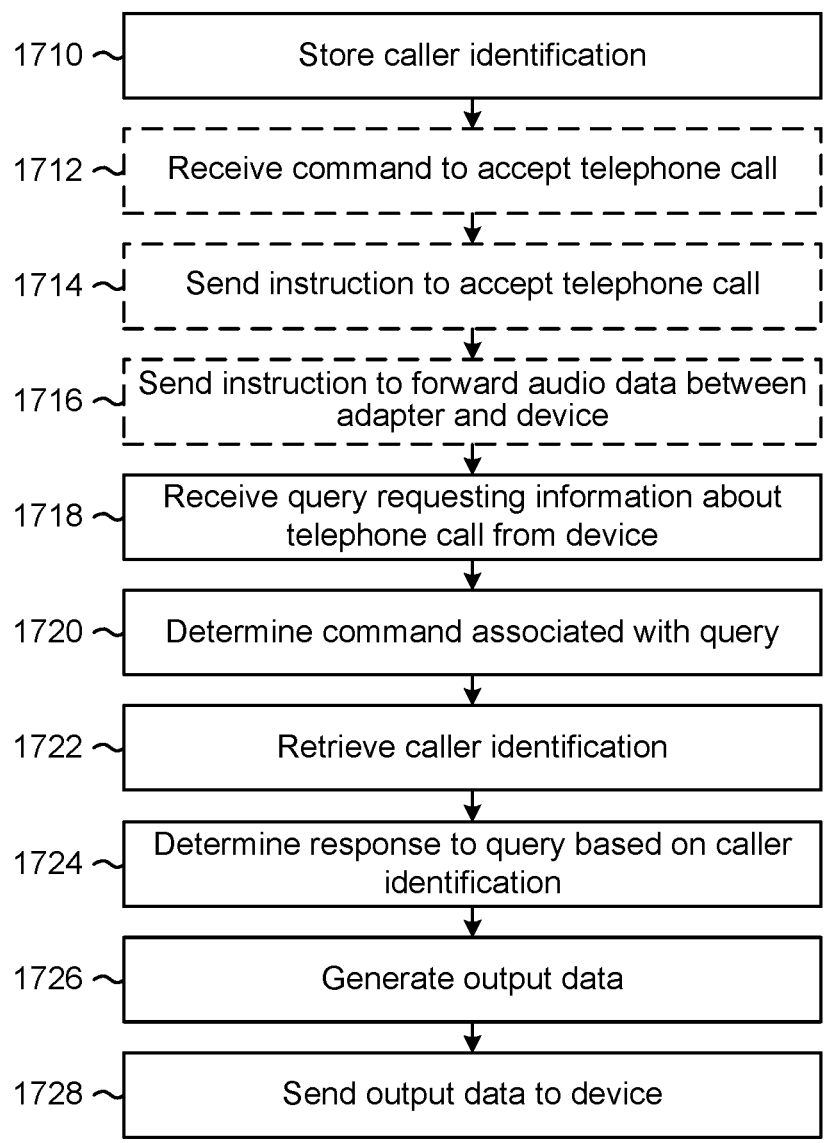

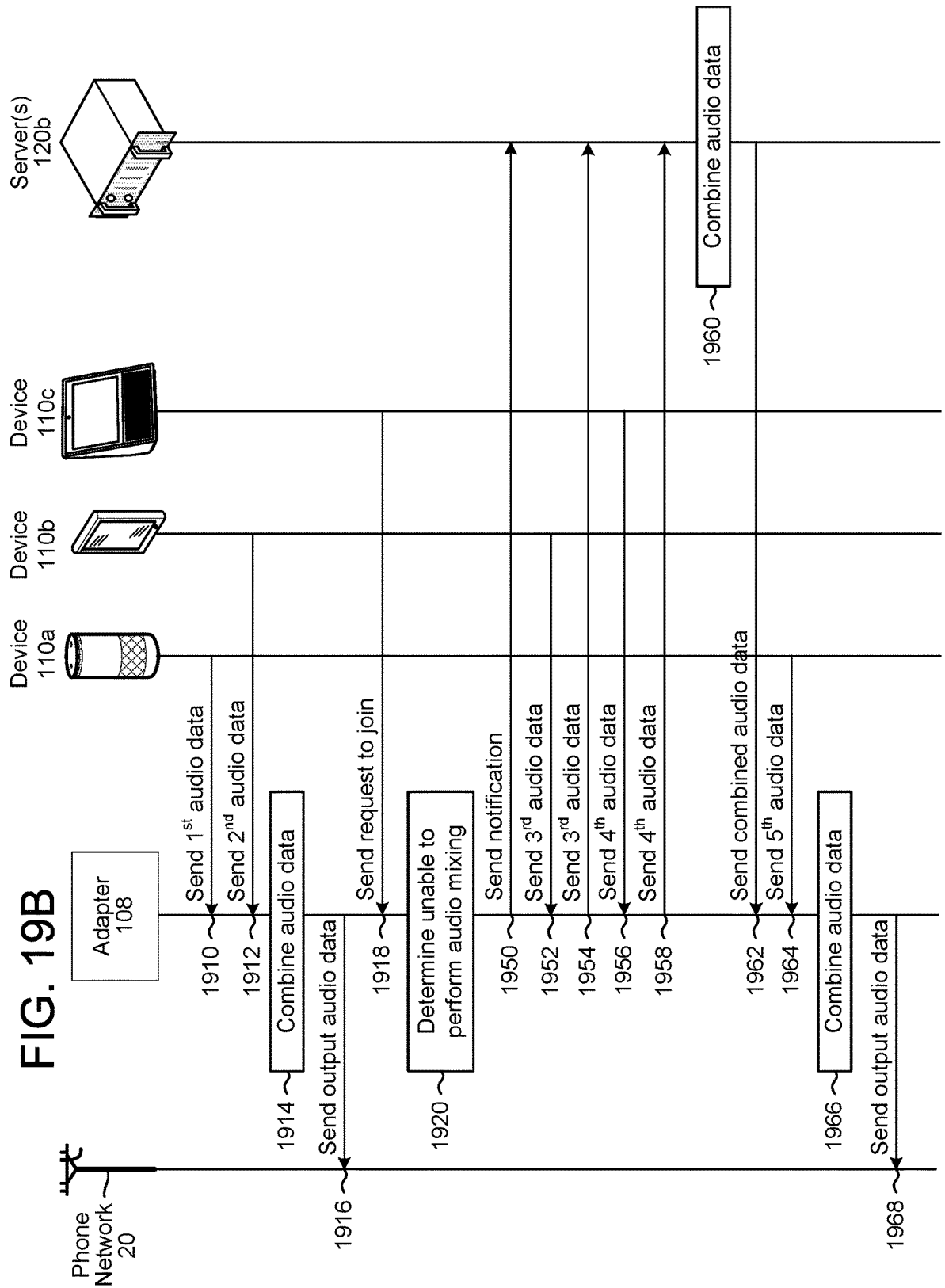

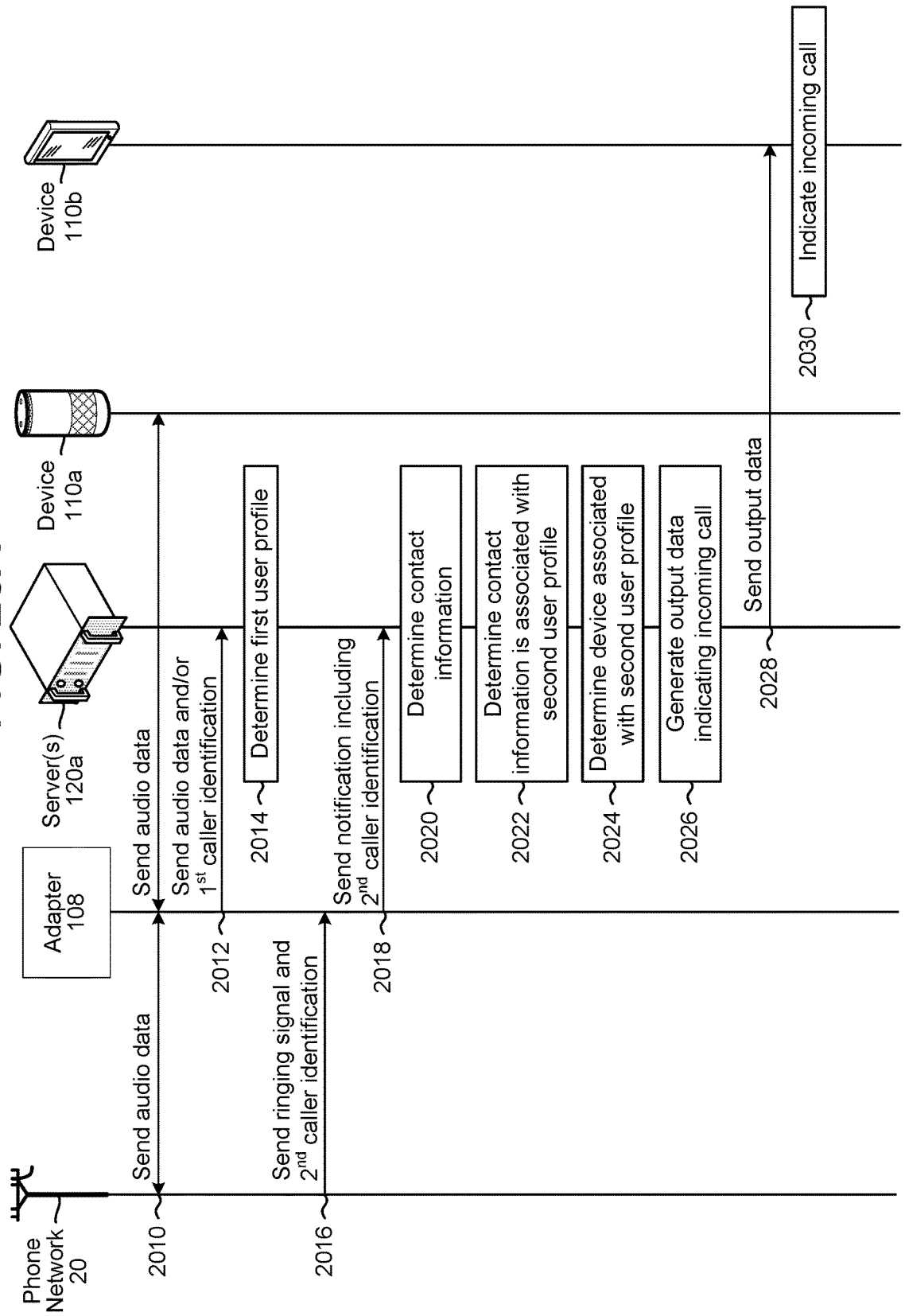

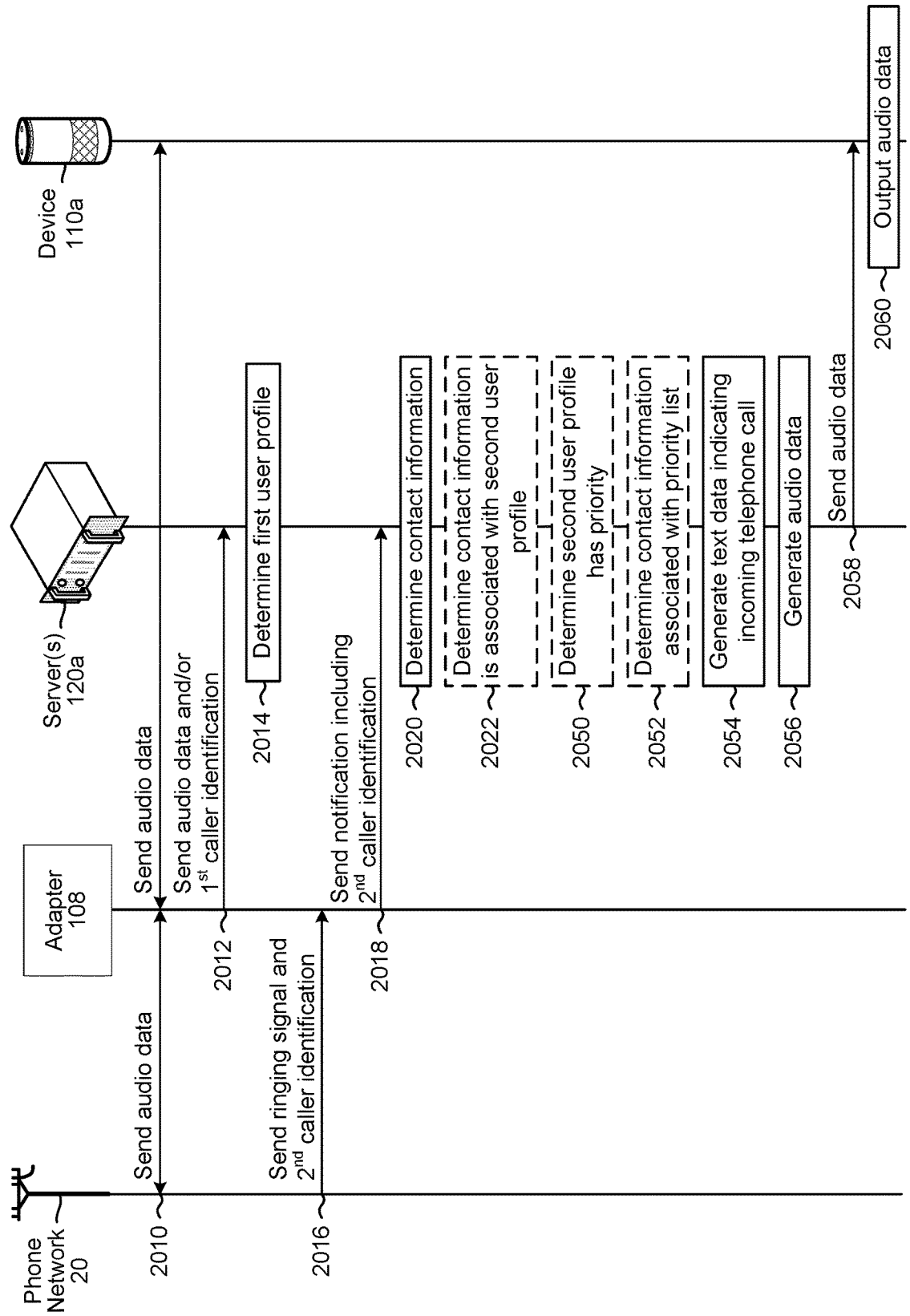

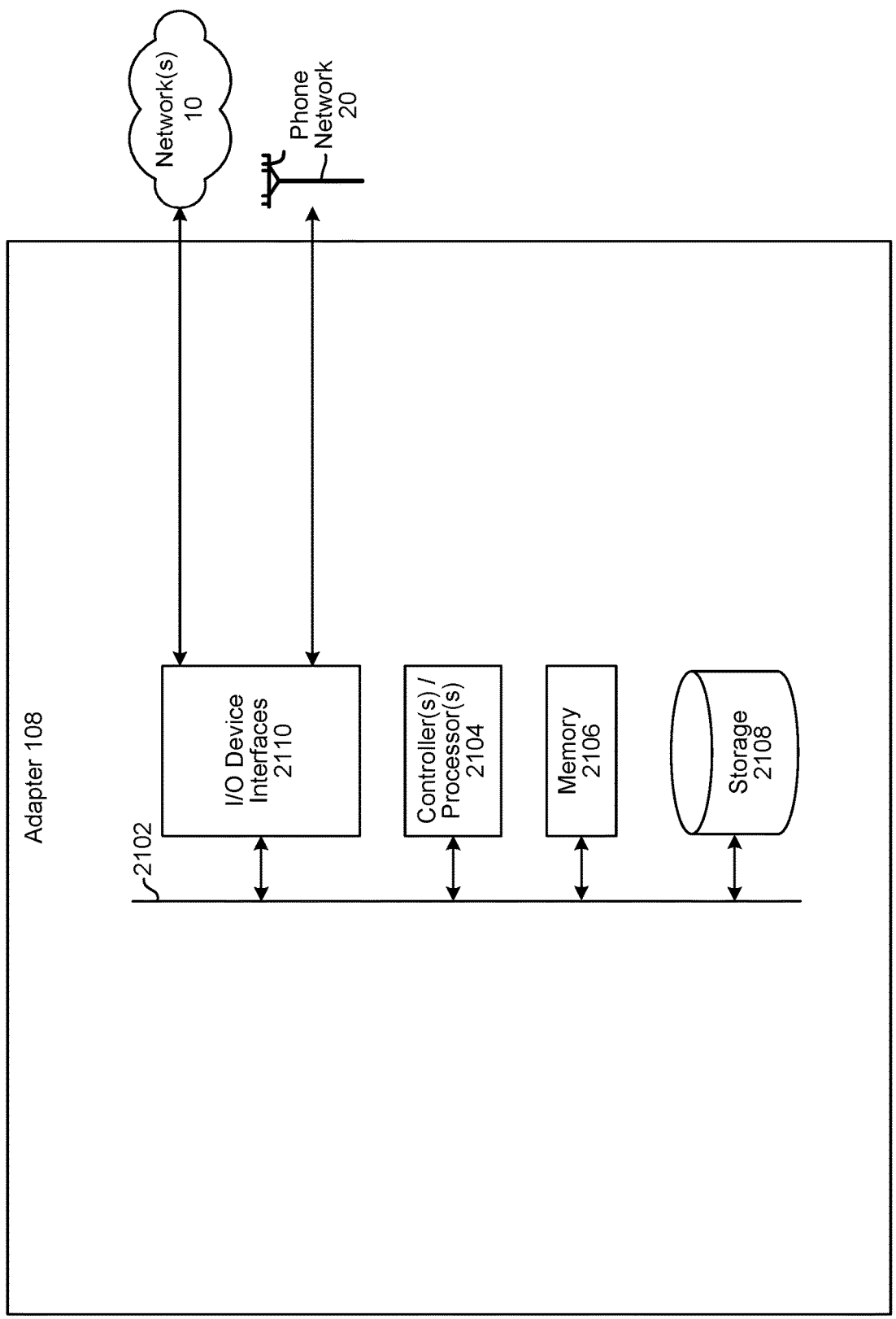

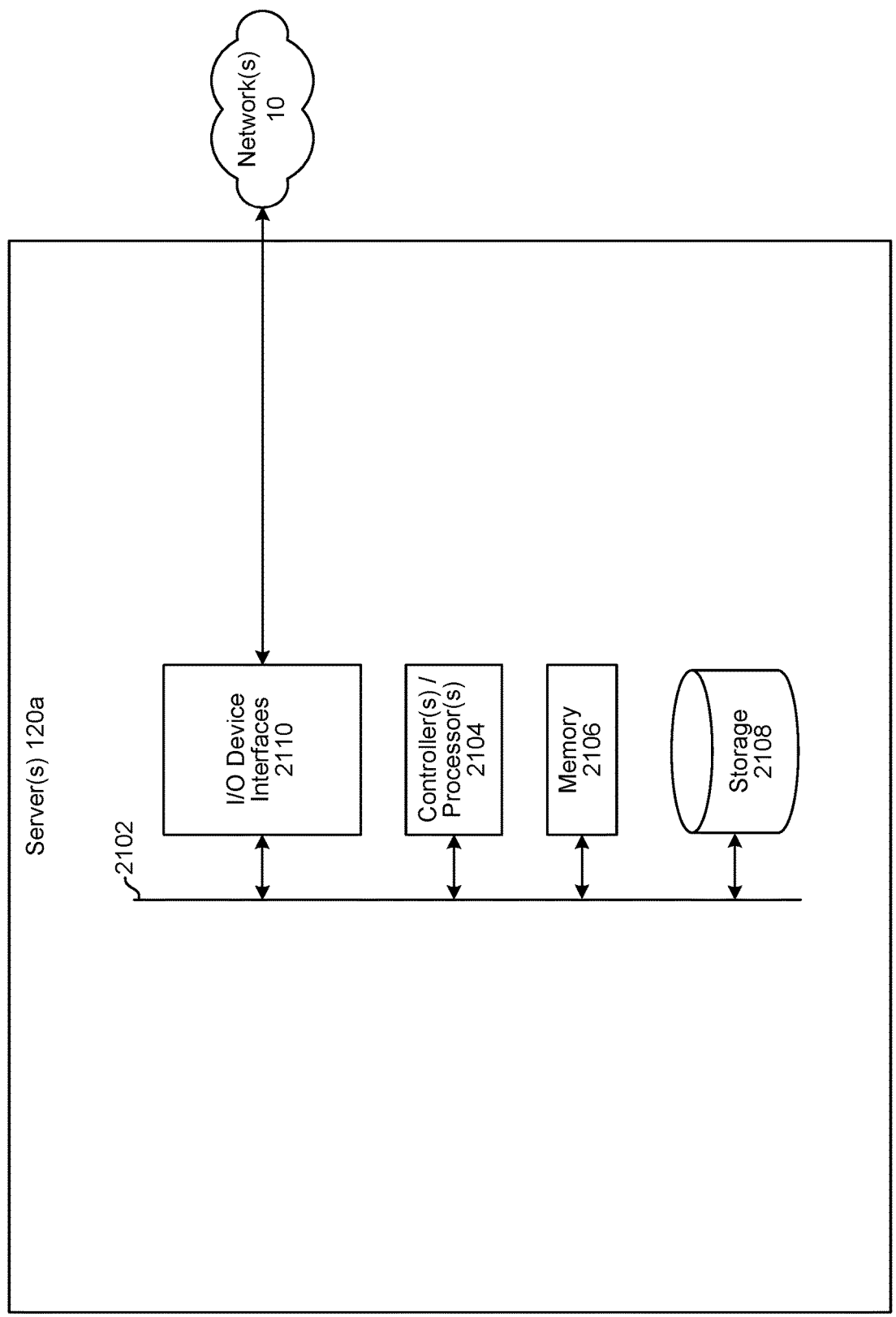

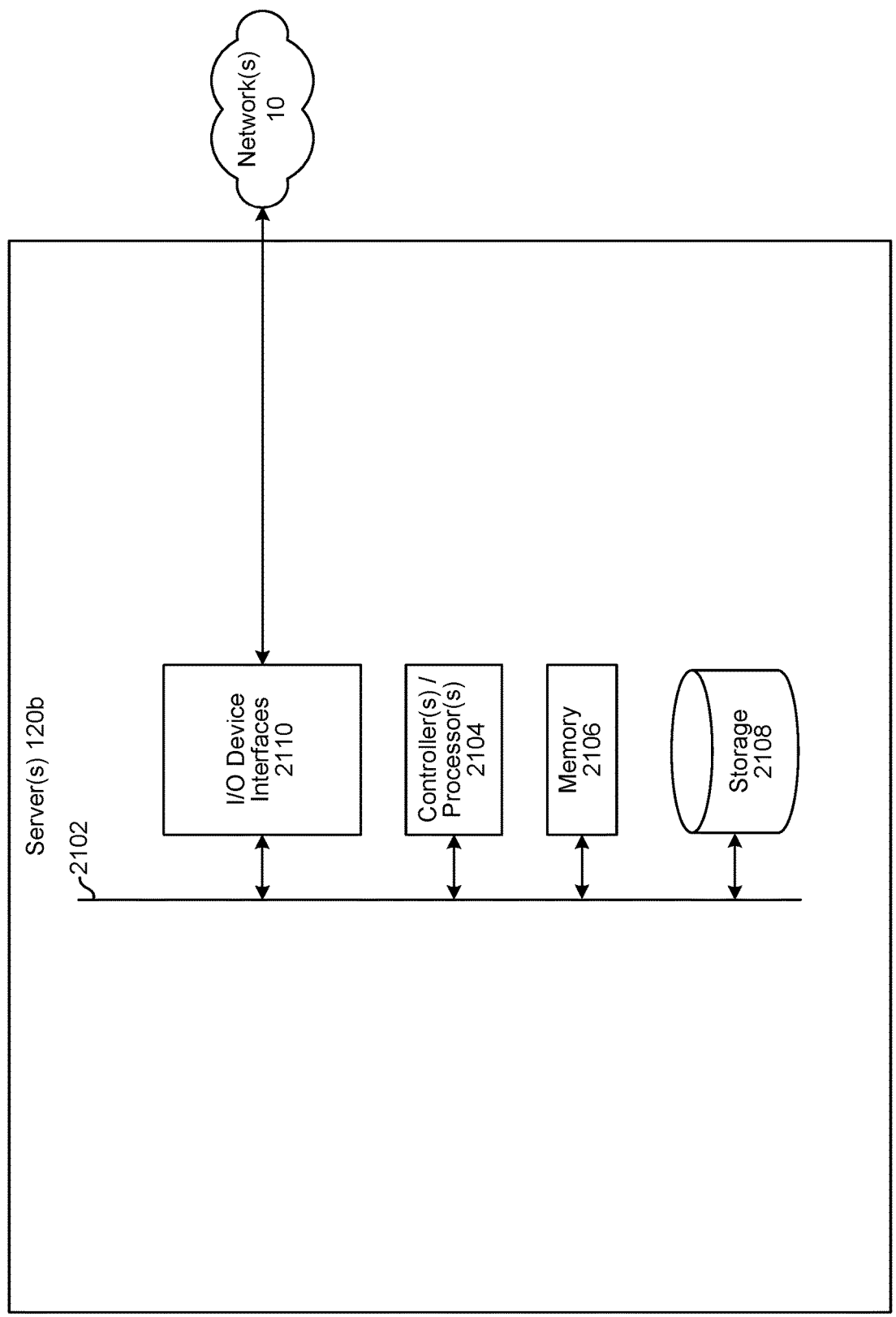

US 10,911,596 B1

VOICE USER INTERFACE FOR WIRED COMMUNICATIONS SYSTEM

BACKGROUND

With the advancement of technology, the use and popularity of electronic devices has increased considerably. Electronic devices are commonly used to capture and process audio data. During a communication session, the audio data may be sent between electronic devices using a digital communication network. Using an analog telephone adapter (ATA), the digital communication network may connect with a telephone network, such as a Public Switched Telephone Network (PSTN)) or other wire, fiber, and/or other physical connection-based network, enabling the electronic devices to send audio data over the phone network.

BRIEF DESCRIPTION OF DRAWINGS

For a more complete understanding of the present disclosure, reference is now made to the following description taken in conjunction with the accompanying drawings.

FIGS. 1A-1C illustrate examples of systems according to embodiments of the present disclosure.

FIGS. 3A-3B illustrate an example of a user recognition component and a text-to-speech (TTS) component generating TTS or synthesized speech according to examples of the present disclosure.

FIG. 6A-6B illustrate examples of signaling to end a communication session according to examples of the present disclosure.

FIG. 13 is a communication diagram conceptually illustrating an example of receiving an incoming call according to embodiments of the present disclosure.

FIG. 14 is a communication diagram conceptually illustrating an example of initiating an outgoing call according to embodiments of the present disclosure.

FIGS. 15A-15B are communication diagrams conceptually illustrating examples of sending and receiving audio data during a telephone conversation using a phone network according to embodiments of the present disclosure.

FIGS. 16A-16B are communication diagrams conceptually illustrating examples of receiving delayed caller identification and outputting a notification of an incoming call based on the caller identification according to embodiments of the present disclosure.

FIG. 17 is a flowchart conceptually illustrating an example method for enabling additional functionality by storing caller identification associated with a telephone call according to examples of the present disclosure.

FIGS. 19A-19B are communication diagrams conceptually illustrating examples of shifting audio mixing from an adapter to a remote server when a number of devices exceed a maximum value according to embodiments of the present disclosure.

FIGS. 20A-20B are communication diagrams conceptually illustrating examples of sending notifications of an incoming telephone call during an existing telephone call according to embodiments of the present disclosure.

FIGS. 21A-21D are block diagrams conceptually illustrating example components of a system according to embodiments of the present disclosure.

DETAILED DESCRIPTION

Figure 1C:
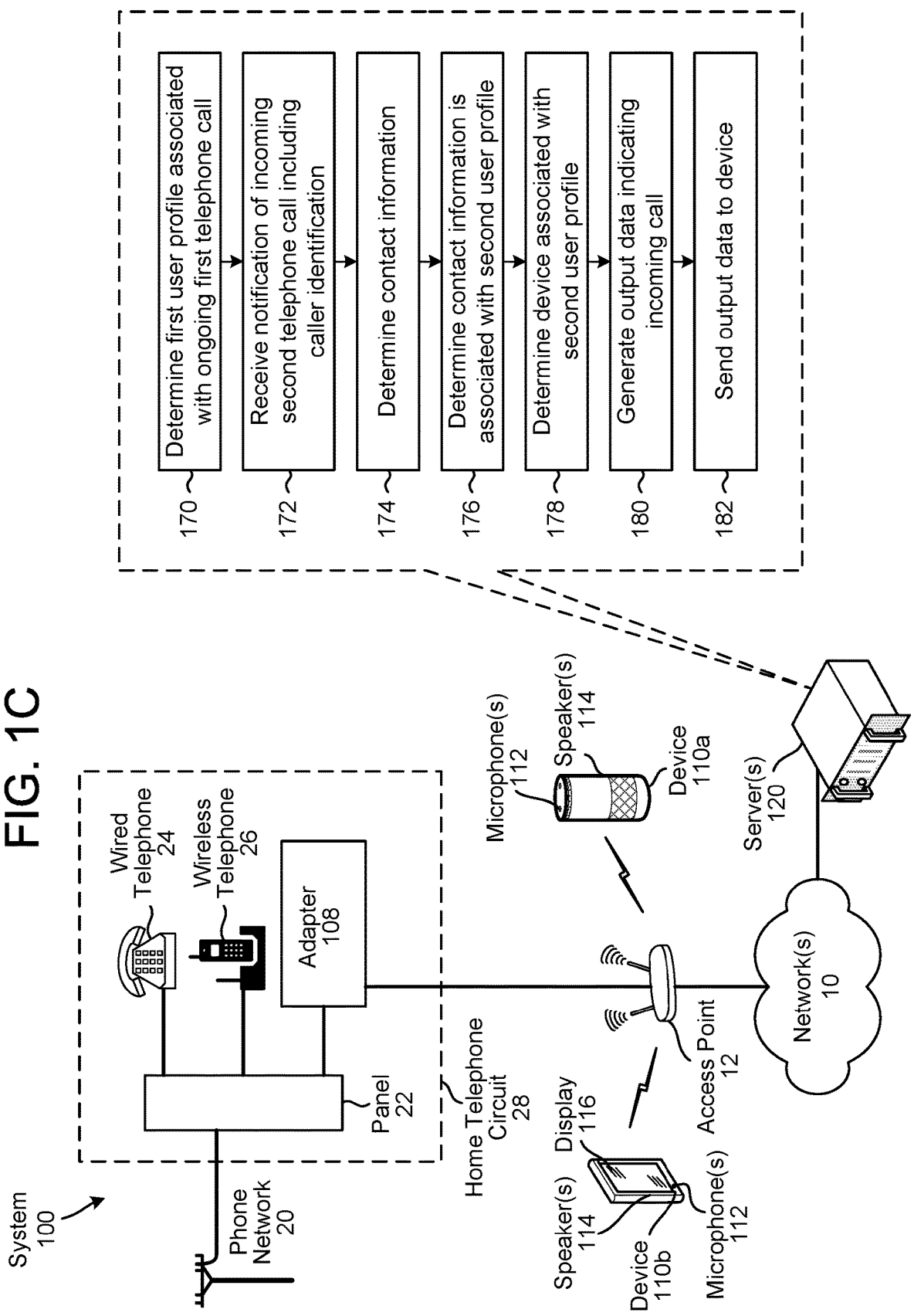

Telephones coupled to a home telephone circuit may be used to communicate using a phone network, via landlines, such as a public switched telephone network (PSTN) and/or cable television (TV) networks (e.g., via a cable provider), via wireless networks such as Public Land Mobile Network (PLMN) (e.g., cellular network) and/or via the internet using techniques such as Voice over Internet Protocol (VoIP). While VoIP enables devices to communicate using an existing telephone number from any location, including while away from a home associated with the telephone number, telephones connected to the home telephone circuit require a connection to the phone network in the home and are therefore unable to be used more than a short distance from the home.

To enable calls to be initiated and received from any location using an existing phone network service, offered is a system that links the phone network to a home endpoint device (such as a speech controlled device) via the internet. For example, an adapter may connect to the phone network (e.g., via a wired and/or wireless connection) and to remote server(s) (e.g., via the internet) and may be configured to receive and initiate calls using the phone network. Thus, electronic devices connected to the remote server(s) may communicate via the phone network through the adapter and/or the server(s). Such devices may also be controlled using voice commands as part of a speech controlled system.

The system may announce an incoming telephone call from a caller along with contact information and/or additional information associated with the caller. For example, the system may receive caller identification from the phone network and may use the caller identification to determine contact information stored in a database associated with a user, a device and/or an account. The system may generate output data (e.g., text data and/or audio data) indicating the caller, the contact information and/or the additional information and may send the output data to home endpoint devices. The system may store the caller identification and other data to enable additional functionality by the speech controlled system. In some examples, the system may determine that an incoming second telephone call is directed to a second user and may send a message to the second user indicating the second telephone call. Additionally or alternatively, the system may enable additional devices to participate in a telephone call by shifting audio mixing from the adapter to the remote server(s).

FIG. 1A illustrates a high-level conceptual block diagram of a system 100 configured to enable a voice user interface for a wired communication system (e.g., a phone network). Although FIG. 1A, and other figures/discussion illustrate the operation of the system in a particular order, the steps described may be performed in a different order (as well as certain steps removed or added) without departing from the intent of the disclosure. As illustrated in FIG. 1A, the system 100 may include a phone network 20 connected to a home telephone circuit 28, which includes a panel 22 configured to connect communication devices (e.g., wired telephone 24, wireless telephone 26 and an adapter 108). While FIG. 1A illustrates the phone network 20 as including a telephone pole, the disclosure is not limited to a single phone network and the phone network 20 may be any wired communication system without departing from the disclosure. For example, the phone network 20 may be a public switched telephone network (PSTN) 30, a Voice over Internet Protocol (VoIP) provider 40, a cable television (TV) network 50 and/or a Public Land Mobile Network (PLMN) 60 (e.g., cellular network) without departing from the disclosure.

In addition, FIG. 1A illustrates the adapter 108 and/or device(s) 110 (e.g., a speech controlled device 110a and/or a smartphone device 110b) connected to an access point (AP) 12 via wired and/or wireless connections, enabling the adapter 108 and/or the device(s) 110 to connect to network(s) 10. Using the network(s) 10, the adapter 108 and/or the device(s) 110 may be communicatively coupled to remote server(s) 120, including one or more server(s) 120a that are configured to process voice commands and/or one or more server(s) 120b that are configured to enable and/or facilitate communication sessions.

The adapter 108 may be configured to connect to the phone network 20 and/or the network(s) 10 (using a wired local area network (LAN) network adapter (e.g., Ethernet or the like), a wireless local area network (WLAN) network adapter (e.g., WiFi, Bluetooth, ZigBee, etc.) and/or a wireless network adapter (e.g., Long Term Evolution (LTE) network, WiMAX network, 3G network, etc.), or the like) to enable users to make and receive telephone calls using their existing phone network 20 service via devices 110. The devices 110 can initiate and receive calls via the phone network 20 through interactions between the adapter 108, the server(s) 120a/120b, and the user's existing landline (e.g., phone network 20).

As used herein, the user's existing landline refers to the phone number through the phone network 20 that is associated with the home telephone circuit 28. The home telephone circuit 28 may include fixed wiring in the home to which each of the devices connected to the panel 22 may connect using one or more phone jacks such as a one-line RJ11 jack, two-line RJ14 jack, three-line RJ25 jack, four-line RJ61 jack, etc. Thus, telephones connected to the home telephone circuit 28, such as the wired telephone 24 and/or the wireless telephone 26, may be referred to as landline telephones and may make or receive telephone calls using the phone network 20. However, the landline telephones are not limited to a typical landline phone network (e.g., PSTN 30), and may be connected to any phone network 20, such as the PSTN 30, the VoIP provider 40, the cable TV network 50 and/or the PLMN 60 (e.g., cellular network).

The PSTN 30 is a typical landline telephone network that may be used to communicate over telephone wires and may include an analog PSTN and/or a digital PSTN. In contrast, the VoIP provider 40 may be used to communicate over the network(s) 10 by sending and receiving audio data and/or video data using a VoIP provider adapter 41. Similarly, the cable TV network 50 may be used to communicate via cable telephony over cable TV networks. For example, a telephone interface (e.g., cable adapter 51) may convert analog signals from the home telephone circuit 28 to digital signals and send the digital signals over the cable connection to the cable provider, which may connect to the PSTN 30 and send the digital signals using the PSTN 30. The PLMN 60 may be a mobile network that may also be interconnected with the PSTN 30. For example, a telephone interface (e.g., PLMN adapter 61) may convert analog signals from the home telephone circuit 28 to digital signals and may send the digital signals via a wireless connection to the mobile network (e.g., using cellular towers or the like), which may send the digital signals using the PLMN 60 and/or the PSTN 30.

As illustrated in FIG. 1A, the adapter 108 may connect to the phone network 20 and may also make or receive telephone calls using the phone network 20. For example, if an incoming call is received by the panel 22, the wired telephone 24, the wireless telephone 26 and/or the adapter 108 may receive an indication that there is an incoming telephone call and the wired telephone 24 and/or the wireless telephone 26 may ring to notify a user that there is an incoming telephone call. If the adapter 108 answers the call, the adapter 108 may communicate via the phone network 20 and the wired telephone 24 and/or the wireless telephone 26 will stop ringing.

The AP 12 may be associated with an internet provider and may create a wireless local area network (WLAN) to which the adapter 108 and/or the device(s) 110 may connect. By connecting to the WLAN, the adapter 108 and/or the devices 110 may communicate with the server(s) 120a/120b via the network(s) 10.

The adapter 108 and/or the device(s) 110 may include a network adapter to connect to the WLAN and/or the network(s) 10 via wired and/or wireless connections. The device(s) 110 may include microphone(s) 112, speakers 114, and/or a display 116. For example, FIG. 1A illustrates the speech controlled device 110a including the microphone(s) 112 and the speakers 114, while the smartphone device 110b includes the microphone(s) 112, the speakers 114 and the display 116. Using the microphone(s) 112, the device 110 may capture outgoing audio data and determine a voice command and/or send the outgoing audio data to the server(s) 120a to determine the voice command. For example, the server(s) 120a may perform Automatic Speech Recognition (ASR) processing, Natural Language Understanding (NLU) processing and/or command processing to determine the voice command as explained herein.

While the examples described herein illustrate the server(s) 120a performing multiple functions, the disclosure is not limited thereto. Instead, the device 110 may perform any of the functions described herein without departing from the disclosure. For example, the server(s) 120a may assist the device 110 with Automatic Speech Recognition (ASR) processing, Natural Language Understanding (NLU) processing, command processing, generating progress data, saving progress data and/or generating synthesized speech. A single server 120a may be capable of performing all speech processing or multiple server(s) 120a may combine to perform the speech processing. For example, multiple different devices may combine to perform ASR processing, multiple different devices may combine to perform NLU processing, etc. In addition, certain speech detection or command execution functions may be performed by device 110. Thus, the device 110 and/or the server(s) 120*a* may perform the functions described herein without departing from the disclosure.

Additionally or alternatively, the device 110 may capture outgoing audio data and send the outgoing audio data to the server(s) 120*b* as part of a communication session (e.g., real time synchronous communication session, such as an audio conversation) and the device 110 may receive incoming audio data from the server(s) 120*b* as part of the communication session. For ease of explanation, the following description refers to capturing and sending audio data during the communication session. However, the disclosure is not limited thereto and the device 110 may capture and send video data during the communication session without departing from the present disclosure.

Using the adapter 108, the device 110 may communicate via the phone network 20. Thus, the adapter 108 may enable the device 110 to send outgoing audio data to a remote telephone via the phone network 20 and/or to receive incoming audio data from the remote telephone via the phone network 20 and to generate output audio using the incoming audio data. For example, the adapter 108 may be configured to receive first data from the device 110 via a network component connected to the network(s) 10, to convert (e.g., transcode) the first data into second data (e.g., audio data) and to output the second data via at least one port connected to the phone network 20. Similarly, the adapter 108 may be configured to receive the second data from the phone network 20 via the at least one port, to convert the second data into the first data and to send the first data to the device 110 via the network component. Thus, the adapter 108 may be configured to send and receive the first data and/or the second data using different formats, protocols or the like.

As illustrated in FIG. 1A, the server(s) 120 may receive (130) a first notification of an incoming telephone call from the adapter 108. In some examples, the server(s) 120 may receive the first notification via one of the devices 110. The server(s) 120 may prepare (132) for the incoming telephone call. For example, the server(s) 120 may interrupt a current skill (e.g., application) and store a current dialog state associated with the skill, along with any additional information about a current state of the skill. Thus, after telephone call, the device 110 may return to the current state in the skill. Additionally or alternatively, the server(s) 120 may initialize text-to-speech processing to announce the incoming telephone call. For example, the server(s) 120 may load a template (e.g., text data) that indicates an incoming telephone call and may perform text-to-speech processing on the template without knowing the caller identification. By initializing the text-to-speech processing prior to receiving the second notification, the server(s) 120 may more quickly generate audio data indicating the incoming telephone call once the caller identification is received.

The server(s) 120 may receive (134) a second notification, which may include caller identification associated with the telephone call. The server(s) 120 may determine (136) contact information that corresponds to the caller identification. For example, the caller identification may indicate a phone number, a name, and/or additional information provided by the phone network 20. The server(s) 120 may identify contact information associated with the device 110, an account associated with the device 110, a user profile associated with the device 110, and/or the like. For example, the caller identification may indicate that the incoming telephone call is associated with a name (e.g., John Doe) and a number (e.g., (555)555-5555). The server(s) 120 may compare the name and/or the number to a database of contacts that correspond to a first user profile associated with the device 110, and may determine that first contact information matches the name and/or the number. Thus, the server(s) 120*a* may associate the caller identification and therefore the incoming call with the first contact information that is associated with the first user profile. The contact information may include a variety of data associated with the caller, such as a name, a number, a relationship to a first user associated with the first user profile, image data representing the caller, recent messages between the caller and the first user profile (e.g., using email, text message, social networking applications, etc.), recent telephone calls between the caller and the first user profile (e.g., date and time), recent and/or upcoming calendar entries indicating meetings between the caller and the first user profile, or the like. Thus, the server(s) 120 may determine (138) context data, which includes information from social networks, calendar data (e.g., recent or upcoming meetings) and/or communication data (e.g., previous communications via text, email, social networks or telephone) or the like.

The server(s) 120 may determine (140) if the number is included in a database of numbers. For example, the database of numbers may be unique to the first user profile (e.g., a blocked number list set by the first user) and/or to an account associated with the first user profile (e.g., a blocked number list set by anyone in the first user's family), which may be referred to as a local database. If the phone number is included in the local database, the server(s) 120*a* may indicate to the first user that the phone number is blocked or the like. Additionally or alternatively, the database of numbers may be a global list indicating telemarketers, political campaigns, robo-calling centers or the like, which may be referred to as a global database. This global list may be compiled based on multiple accounts and/or based on third party sources that monitor call histories and/or receive feedback indicating unwanted telephone calls. If the phone number is included in the global database, the server(s) 120*a* may indicate to the first user that the phone number is possible spam or the like.

The server(s) 120 may generate (142) text data indicating the incoming telephone call, generate (144) audio data based on the text data, may send (146) the audio data to the device 110 and store (148) the contact information (e.g., caller identification and/or any additional information) to enable additional functionality. For example, the server(s) 120 may generate text data that indicates that an incoming telephone call has been received from a phone number, along with a name of the caller, a relationship between the caller and the first user, relevant information retrieved from social networks, recent communications between the caller and the first user, recent and/or upcoming meetings scheduled between the caller and the first user, and/or the like. In addition, if the phone number is included in the local database or the global database, the text data may indicate that the phone number is blocked, possible spam and/or the like.

A plurality of devices 110 may join the telephone call using the adapter 108. However, the adapter 108 may be capable of performing audio mixing for only a limited number of devices 110 (e.g., 2-5 devices 110 at a time). Thus, when the adapter 108 is at maximum capacity (e.g., performing audio mixing for 2-5 devices 110), additional devices 110 are unable to join the telephone call using the adapter 108. To enable additional devices 110 to join the telephone call even when the adapter 108 is at maximum capacity, the system 100 may shift at least a portion of the audio mixing from the adapter 108 to the server(s) 120.

To illustrate an example, if the adapter 108 is only capable of combining two digital audio streams (e.g., first audio data associated with a first device 110a and second audio data associated with a second device 110b) and a third device 110c wants to join the telephone call, the system 100 may perform first audio mixing using the server(s) 120 and second audio mixing using the adapter 108.

As illustrated in FIG. 1B, the adapter 108 may receive (150) first audio data from a first device 110a, may receive (152) second audio data from a second device 110b, may generate (154) first combined audio data by combining the first audio data and the second audio data, and may send (156) the first combined audio data via the phone network 20.

The adapter 108 may receive (158) a request to join the telephone call from a third device 110c, may determine (160) that the adapter 108 is connected to a maximum number of devices 110 and may send (162) a notification to the devices 110 and/or the server(s) 120. The system 100 may shift audio mixing from the adapter 108 to the server(s) 120, such that the adapter 108 may receive (164) second combined audio data from the server(s) 120 and may send (166) the second combined audio data vi the phone network 20. Thus, the server(s) 120 enable the devices 110a-110c to participate in the telephone call even though it exceeds the adapter 108's maximum capacity.

As illustrated in FIG. 1C, the server(s) 120 may determine (170) a first user profile associated with an ongoing telephone call. For example, the server(s) 120 may perform voice recognition on audio data associated with the ongoing telephone call and may identify the first user profile based on the voice recognition. Additionally or alternatively, the server(s) 120 may identify that first caller identification is associated with the first user profile. However, the disclosure is not limited thereto and the server(s) 120 may determine the first user profile using any techniques known to one of skill in the art without departing from the disclosure.

The server(s) 120 may receive (172) a notification of incoming second telephone call, which includes caller identification, and may determine (174) contact information corresponding to the caller identification. The server(s) 120 may determine (176) that the contact information is associated with a second user profile, may determine (178) a device associated with the second user profile, may generate (180) output data indicating the incoming second telephone call and may send (182) the output data to the device. Thus, the system 100 may alert the second user that the incoming call is being received.

For ease of explanation, the disclosure distinguishes between an instruction and a command (e.g., voice command), although the disclosure is not limited thereto and the terms may be used interchangeably without departing from the disclosure. As used herein, an instruction refers to a directive sent between devices, whereas a command refers to a directive received from a user (e.g., voice command). For example, the system 100 may receive a command from the user requesting that the system 100 perform an action (e.g., initiate a telephone call, accept a telephone call, etc.). In order to execute the command, the server(s) 120a may send an instruction to the device 110 and/or the adapter 108 to perform an action (e.g., initiate a telephone call, accept a telephone call, etc.), and/or the device 110 may send an instruction to the adapter 108 to perform the action.

While FIGS. 1A-1C and other figures and descriptions below illustrate and discuss the system 100 communicating via the phone network 20, the disclosure is not limited thereto. Instead, the system 100 may support a mobile-only household use case such that users could place and receive calls via devices 110 using their existing mobile phone and service (e.g., PLMN 60), or other phone networks (such as a cable phone system, etc.) without departing from the disclosure.

The adapter 108 may connect to the phone network 20 during an initialization step. For example, after powering on the adapter 108 and connecting the adapter 108 to the phone network 20 (e.g., using a phone port such as an RJ11 jack), a user may configure the adapter 108 to connect to the AP 12 via a WLAN and/or an Ethernet port (e.g., RJ45 jack or the like). The user's home telephone circuit 28 may still be connected to the existing landline service (e.g. telephone provider with phone number (555)555-5555), such that the user may place a telephone call using the wired telephone 24 and/or the wireless telephone 26. In addition, the existing landline service may also be accessible to the user via the devices 110. Thus, the user may initiate telephone calls using the devices 110 and/or may receive incoming telephone calls using the devices 110.

To illustrate an example of initiating an outgoing call using the device 110, the user may say "Alexa, call Bob" and the device 110 may capture audio data corresponding to this utterance. The device 110 may send the audio data to the server(s) 120a and the server(s) 120a may perform speech processing to understand the utterance and determine a command. For example, the server(s) 120a may determine that the utterance corresponds to a command to initiate a telephone call to a particular contact (e.g., "Bob") included in a user profile associated with the device 110 and may determine a phone number associated with the contact. If the selected phone number is associated with a landline (e.g., accessible via the phone network 20), the system 100 may determine to initiate the telephone call using the existing landline (e.g., phone network 20). For example, the system 100 may send a first instruction from the server(s) 120a to the server(s) 120b to initiate the telephone call, the first instruction indicating call information such as a number from which to call, a recipient number to call, a data source name (DSN), the device 110 from which to call and/or additional information. The server(s) 120b may send a second instruction to the adapter 108 to initiate the telephone call using the phone network 20 and may initiate a communication session between the device 110 and the adapter 108 to send and receive audio data between the device 110 and the adapter 108. The recipient (e.g., "Bob") would recognize the user since the caller identification would indicate that the telephone call is associated with the existing landline home phone number (e.g., (555)555-5555), which is associated with the user and may already be in the recipient's address book for the user.

The contact may be associated with multiple phone numbers. In some examples, to identify which phone number with which to initiate the telephone call, the server(s) 120a may request clarification from the user by sending a notification to the device 110. However, the disclosure is not limited thereto and the server(s) 120a may select a default phone number associated with the contact and/or may select from the multiple phone numbers (for example in a contact list associated with the caller's/callee's user profile) based on the utterance. Thus, the server(s) 120a may attempt to determine the intent of the user based on the utterance. For example, the server(s) 120a may differentiate between "Alexa, call Mom's house" and "Alexa, call Mom's mobile" when initiating the call. Additionally or alternatively, the server(s) 120*a* may attempt to determine the intent of the user based on characteristics of the multiple phone numbers associated with the contact. For example, if the user requests to initiate a telephone call using the device 110 associated with the server(s) 120*b* and a first phone number of the multiple phone numbers is also associated with the server(s) 120*b*, the server(s) 120*b* may initiate the telephone call to the first phone number without using the phone network 20 (e.g., using software running on the device 110, Voice over Internet Protocol (VoIP) or the like).

Similarly, the server(s) 120*a* may determine from which phone number the user would like to initiate the telephone call. For example, the server(s) 120*a* may differentiate between "Alexa, call Mom on my home line" and "Alexa, call Mom with video" or the like. In addition, if the user requests to initiate the telephone call to a landline phone number, the server(s) 120*a* may determine to initiate the telephone call using the phone network 20, whereas if the telephone call is to a phone number associated with the remote server(s) 120*b*, the server(s) 120*a* may determine to initiate the telephone call without using the phone network 20.

To illustrate an example of receiving an incoming telephone call, a caller (e.g. "Bob") may dial the home phone number associated with the user (e.g., (555)555-5555), causing each of the devices (e.g., 24, 26, 108) connected to the home telephone circuit 28 to ring. The adapter 108 may detect the incoming telephone call and send a signal to the server(s) 120*b* indicating the incoming telephone call and/or a phone number associated with the caller. The server(s) 120*b* may communicate with the server(s) 120*a* and the server(s) 120*a* may then notify the user of the incoming telephone call by sending a notification to the devices 110. Thus, the wired telephone 24, the wireless telephone 26 and/or the devices 110 would ring and the user may choose whether or not to answer the incoming telephone call from the wired telephone 24, the wireless telephone 26 and/or the devices 110. If the user elects to answer the incoming telephone call using one of a device 110 (for example by speaking to the device 110 "Alexa, answer the call"), the device 110 may send a signal (e.g., data corresponding to the answer request) to the server(s) 120*a* (which will then perform speech processing to determine the command), the server(s) 120*a* may communicate with the server(s) 120*b* and the server(s) 120*b* may send a signal to the adapter 108 that instructs the adapter 108 to answer the incoming telephone call. Thus, the adapter 108 may answer the incoming telephone call, causing the wired telephone 24 and/or the wireless telephone 26 to stop ringing, and may forward audio data between the phone network 20 and the device 110 via the server(s) 120*b* to facilitate the call.

If the user is away from home and the device 110 is a mobile device connected to the internet, the user can also place and receive calls using the adapter 108 over the existing landline (e.g., phone network 20) despite being away from home. Once again, the recipient of the user's calls can identify the user because the caller ID would be shown as the home phone number (e.g., (555)555-5555). In the case of a multi-person household, calls initiated by any family member via the devices 110 may be sent over the existing landline service using the home phone number (e.g., (555)555-5555).

Figure 2:
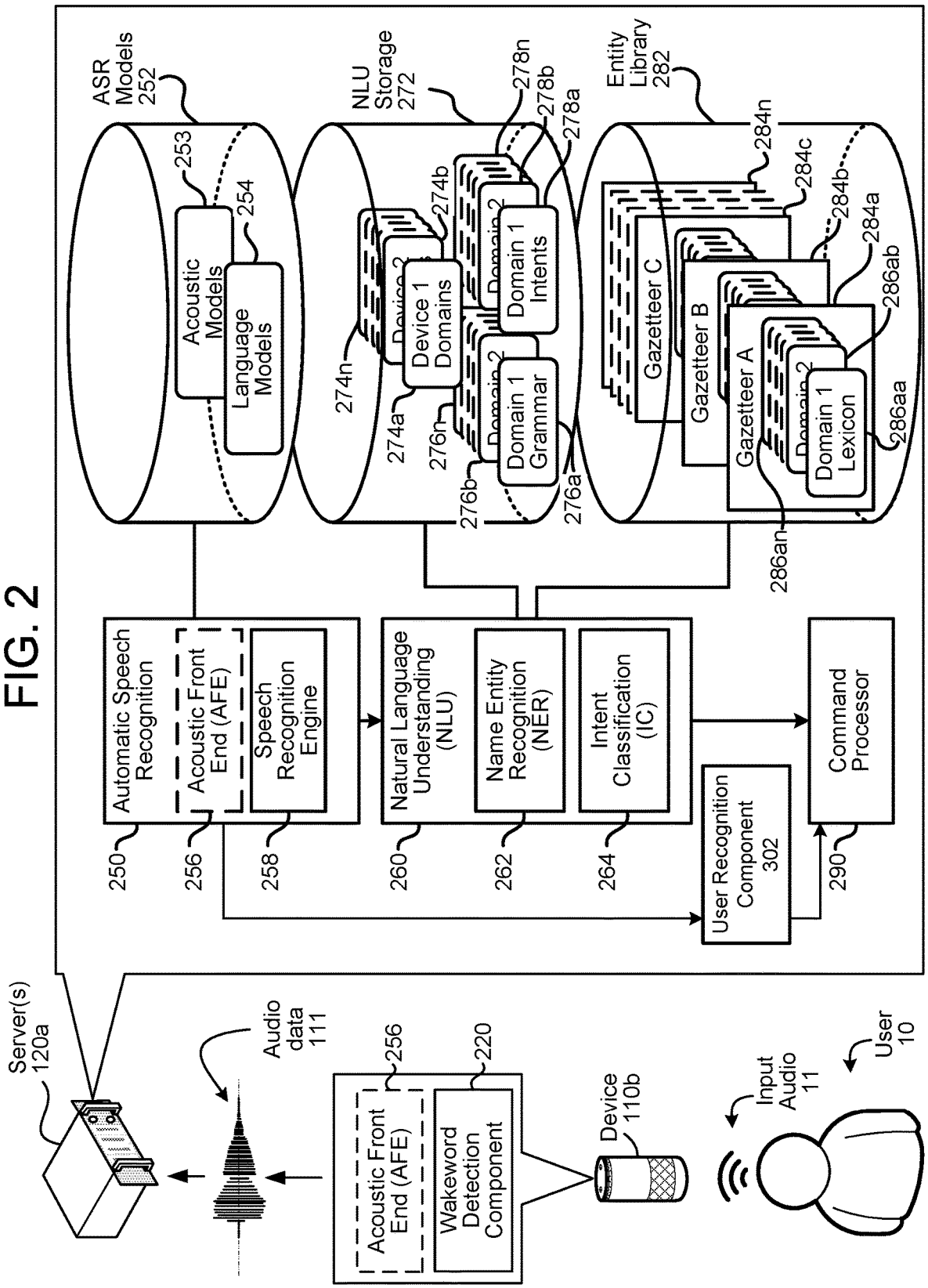
FIG. 2 is a conceptual diagram of how a spoken utterance is processed according to examples of the present disclosure.

The system 100 of FIGS. 1A-1C may operate using various speech processing components as described in FIG. 2. FIG. 2 is a conceptual diagram of how a spoken utterance is processed, allowing a system to capture and execute commands spoken by a user, such as spoken commands that may follow a wakeword. The various components illustrated may be located on a same or different physical devices. Communication between various components illustrated in FIG. 2 may occur directly or across network(s) 10. An audio capture component, such as microphone(s) 112 of device 110, captures audio 11 corresponding to a spoken utterance.

The device 110, using a wakeword detection component 220, then processes the audio 11, or audio data 111 corresponding to the audio 11, to determine if a keyword (such as a wakeword) is detected in the audio 11. Following detection of a wakeword, the device sends audio data 111 corresponding to the utterance, to a server(s) 120*a* that includes an ASR component 250. The audio data 111 may be output from an acoustic front end (AFE) 256 located on the device 110 prior to transmission. Or the audio data 111 may be in a different form for processing by a remote AFE 256.

The wakeword detection component 220 works in conjunction with other components of the device, for example microphone(s) 112 to detect keywords in audio 11. For example, the device 110 may convert audio 11 into audio data 111, and process the audio data 111 with the wakeword detection component 220 to determine whether speech is detected, and if so, if the audio data 111 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data 111 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120a for speech processing. Audio data 111 corresponding to that audio 11 may be sent to a server(s) 120b for routing to a recipient device or may be sent to the server(s) 120a for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the local device 110 prior to sending. Further, a local device 110 may "wake" upon detection of speech/spoken audio above a threshold, as described herein. Upon receipt by the server(s) 120a, an ASR component 250 may convert the audio data 111 into text. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units, phonemes, etc.) and sequences of sounds to identify words that match the sequence of sounds spoken in the utterance of the audio data 111.

An ASR process 250 converts the audio data 111 into text. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data 111. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data 111 from the microphone(s) 112 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values, called features, representing the qualities of the audio data 111, along with a set of those values, called a feature vector or audio feature vector, representing the features/qualities of the audio data 111 within the frame. Many different features may be determined, as known in the art, and each feature represents some quality of the audio 11 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data 111 into feature vectors (for example using an on-device AFE 256) and transmit that information to a server across network(s) 10 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 10. For example, ASR results in the form of a single textual representation of the speech, an N-best list including multiple hypotheses and respective scores, lattice, etc. may be sent to a server, such as the server(s) 120a, for natural language understanding (NLU) processing, such as conversion of the text into commands for execution, either by the device 110, by the server(s) 120a, or by another device (such as a server running a search engine, etc.).

The device performing NLU processing 260 (e.g., server(s) 120a) may include various components, including potentially dedicated processor(s), memory, storage, etc. A device configured for NLU processing 260 may include a named entity recognition (NER) component 252, intent classification (IC) component 264, NLU storage 272 and a and knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server(s) 120a or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition component 262 receives a query in the form of ASR results and attempts to identify relevant grammars and lexical information that may be used to construe meaning. To do so, a name entity recognition component 262 may begin by identifying potential domains that may relate to the received query. The NLU storage 272 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

In some examples, the device 110 may determine contextual information to assist with performing speech processing, such as a domain, based on the process operating when a voice command is received. For example, the device 110 may associate a first domain with a first feature group. When the device 110 receives a voice command while operating a first application corresponding to the first feature group, the device 110 may generate contextual information that indicates the first domain and/or other information and may associate the contextual information with the voice command.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) component 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC component 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the query to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (in the NLU's storage 272). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the voice-controlled device "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server(s) 120a as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text to be processed by a TTS engine and output from a device as synthesized speech, such as announcements made with the pages described above.

In some examples, a contact may be available via different communication paths (e.g., PSTN 20, Voice over Internet Protocol (VoIP), etc.), which may be associated with different applications. For example, the contact may be available via a landline number, via a first application associated with the server(s) 120b and via a second application that is not associated with the server(s) 120b. As part of performing the NLU, the server(s) 120a may determine which way to route the telephone call (e.g., which communication path to select) based on a cost (e.g., avoid charges), a phone quality (e.g., throughput associated with the communication path), whether presence information is available (e.g., server(s) 120b receives an indication that the contact is available via the first application), and/or the like. Thus, the server(s) 120a may determine how to route the telephone call based on the intent or based on other user preferences without departing from the disclosure.

FIG. 3A illustrates an example of a user recognition component according to examples of the present disclosure. The user recognition component 302 of the server(s) 120a performs user recognition using various data including training data 305 corresponding to sample audio data corresponding to known users, user recognition feature/vector data 308, and secondary data 309. The user recognition component 302 may then output user recognition confidence data 311 which reflects a certain confidence that the input utterance was spoken by one or more particular users. The user recognition confidence data 311 may include an indicator of the verified user (such as a user ID corresponding to the speaker of the utterance) along with a confidence value corresponding to the user ID, such as a numeric value or binned value as discussed below.

The training data 305 may be stored in a user recognition data storage 304. The user recognition data storage 304 may be stored by the server(s) 120a, or may be a separate device. Further, the user recognition data storage 304 may be part of user profile storage 802. The user recognition data storage 304 may be a cloud-based storage. The training data 305 stored in the user recognition data storage 304 may be stored as waveforms and/or corresponding features/vectors. The training data 305 may correspond to data from various audio samples, each audio sample associated with a known user and/or user identity. For example, each user known to the system may be associated with some set of training data 305 for the known user. The user recognition component 302 may then use the training data 305 to compare against incoming audio data (represented by user recognition feature/vector data 308) to determine the identity of a user speaking an utterance. The training data 305 stored in the user recognition data storage 304 may thus be associated with multiple users of multiple devices. Thus, the training data 305 stored in the storage 304 may be associated with both a user that spoke the respective utterance, as well as the speech-controlled device 110 that captured the respective utterance.

The training data 305 for a particular user may include a feature vector of the same size as a vector of the user recognition feature/vector data 308. Thus, for example, if a feature vector 308 is of size F, the training data 305 may also be a feature vector of size F. To create such a training data feature vector, during a training period the system may either prompt a user to speak sample audio data or may identify sample audio data known to have been spoken by a particular user. The system may then process the sample audio data to create sample training data 305 (e.g., a feature vector of size F). The training data 305 may then be stored by the system (such as in data storage 304) and saved for use during runtime user recognition processing.

To perform user recognition, the user recognition component 302 may determine the speech-controlled device 110 from which the audio data 111 originated. For example, the audio data 111 may include a tag indicating the speech-controlled device 110. Either the speech-controlled device 110 or the server(s) 120a may tag the audio data 111 as such. The tag indicating the speech-controlled device 110 may be associated with the user recognition feature/vector data 308 produced from the audio data 111. The user recognition component 302 may send a signal to the user recognition data storage 304, with the signal requesting only training data 305 associated with known users of the speech-controlled device 110 from which the audio data 111 originated. This may include accessing a user profile associated with the speech-controlled device 110 and then only inputting training data 305 associated with users corresponding to the user profile of the device 110. This limits the universe of possible training data the recognition component 302 should consider at runtime when recognizing a user and thus decreases the amount of time to perform user recognition by decreasing the amount of training data 305 needed to be processed. Alternatively, the user recognition component 302 may access all (or some other subset of) training data 305 available to the system. However, accessing all training data 305 will likely increase the amount of time needed to perform user recognition based on the magnitude of training data to be processed.

If the user recognition component 302 receives training data 305 as an audio waveform, the user recognition component 302 may determine features/vectors of the waveform(s) or otherwise convert the waveform into a data format that can be used by the user recognition component 302 to actually perform the user recognition. The user recognition component 302 may then identify the user that spoke the utterance in the audio data 111 by comparing features/vectors of the user recognition feature/vector data 308 to training features/vectors (either received from the storage 304 or determined from training data 305 received from the storage 304).

The user recognition feature/vector data 308 may include multiple vectors each corresponding to different portions of the input utterance. Alternatively, the user recognition feature/vector data 308 may be a single vector representing audio qualities of the input utterance. For example, the single vector may be created using an encoder which can create a fixed-size vector to represent certain characteristics of the audio data entities. In mathematical notation, given a sequence of feature data values $x\_1, \ldots x\_n, \ldots x\_N$, with $x\_n$ being a D-dimensional vector, an encoder $E(x\_1, \ldots x\_N)=y$ projects the feature sequence to y, with y being a F-dimensional vector. F is a fixed length of the vector and is configurable depending on use of the encoded vector and other system configurations. Accumulated/processed speech audio data for the utterance (from beginpoint to endpoint) may be represented in a single feature vector for the user verification feature/vector data 308, which may then be used for user recognition.

The user recognition component 302 may include a scoring component 322 which determines respective scores indicating whether the input utterance (represented by user verification feature/vector data 308) was spoken by particular users (represented by training data 305). The user recognition component 302 may also include a confidence component 324 which determines an overall confidence as the accuracy of the user recognition operations (such as those of the scoring component 322) and/or an individual confidence for each user potentially identified by the scoring component 322. The output from the scoring component 322 may include scores for all users with respect to which user recognition was performed (e.g., all users associated with the speech-controlled device 110). For example, the output may include a first score for a first user, a second score for a second user, and third score for a third user, etc. Although illustrated as two separate components, the scoring component 322 and confidence component 324 may be combined into a single component or may be separated into more than two components.

The scoring component 322 and confidence component 324 may implement one or more trained machine learning models (such neural networks, classifiers, etc.) as known in the art. For example, the scoring component 322 may use probabilistic linear discriminant analysis (PLDA) techniques. PLDA scoring determines how likely it is that the input user recognition feature vector 308 corresponds to a particular training data feature vector 305 for a particular user. The PLDA scoring may generate similarity scores for each training feature vector considered and may output the list of scores and users and/or the user ID of the speaker whose training data feature vector most closely corresponds to the input user recognition feature vector 308 of the utterance. The scoring component 322 may also use other techniques such as GMMs, generative Bayesian models, or the like, to determine similarity scores.

The confidence component 324 may input various data including information about an utterance length (e.g., number of frames or time of the utterance), audio condition/quality data (such as signal-to-interference data or other metric data), fingerprint data, image data, or other factors to consider how confident the user recognition component 302 is with regard to the scores linking users to the input utterance. The confidence component 324 may also consider the similarity scores and user IDs output by the scoring component 322. Thus, the confidence component 324 may determine that poor input audio quality, or other factors, may result in a lower confidence of the user recognition component 302. Whereas better input audio quality, or other factors, may result in a higher confidence of the user recognition component 302. Precise determination of the confidence may depend on configuration and training of the confidence component 324 and the models used therein. The confidence component 324 may operate using a number of different machine learning models/techniques such as GMM, neural networks, etc. For example, the confidence component 324 may be a classifier configured to map a score output by the scoring component 322 to a confidence.

The user recognition component 302 may output user recognition confidence data 311 specific to a single user, or multiple users in the form of an N-best list. For example, the user recognition component 302 may output user recognition confidence data 311 with respect to each user indicated in the profile associated with the speech-controlled device 110 from which the audio data 111 was received. The user recognition confidence data 311 may include particular scores (e.g., 0.0-1.0, 0-1000, or whatever scale the system is configured to operate). Thus the system may output an N-best list of potential users with confidence scores (e.g., John—0.2, Jane—0.8). Alternatively or in addition, the user recognition confidence data 311 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 311 may only include information related to the top scoring user as determined by the user recognition component 302. The scores and bins may be based on information determined by the confidence component 324. The user recognition component 302 may also output a confidence value that the scores/bins are correct, where the confidence value indicates how confident the user recognition component 302 is in the output results. This confidence value may be determined by the confidence component 324.

The confidence component 324 may determine individual user confidences and differences between user confidences when determining the user recognition confidence data 311. For example, if a difference between a first user's confidence score and a second user's confidence score is large, and the first user's confidence score is above a threshold, then the user recognition component 302 is able to recognize the first user as the user that spoke the utterance with a much higher confidence than if the difference between the users' confidences were smaller.

The user recognition component 302 may perform certain thresholding to avoid incorrect user recognition results being output. For example, the user recognition component 302 may compare a confidence score output by the confidence component 324 to a confidence threshold. If the confidence score is not above the confidence threshold (for example, a confidence of "medium" or higher), the user recognition component 302 may not output user recognition confidence data 311, or may only include in that data 311 an indication that a user speaking the utterance could not be verified. Further, the user recognition component 302 may not output user recognition confidence data 311 until enough user recognition feature/vector data 308 is accumulated and processed to verify the user above a threshold confidence. Thus the user recognition component 302 may wait until a sufficient threshold quantity of audio data of the utterance has been processed before outputting user recognition confidence data 311. The quantity of received audio data may also be considered by the confidence component 324.

The user recognition component 302 may be defaulted to output binned (e.g., low, medium, high) user recognition confidence data 311. However, such may be problematic from the command processor(s) 290 perspective. For example, if the user recognition component 302 computes a single binned confidence for multiple users, the command processor(s) 290 may not be able to determine which user to determine content with respect to. In this situation, the user recognition component 302 may be configured to override its default setting and output user recognition confidence data 311 including values (e.g., 0.0-1.0) associated with the users associated with the same binned confidence. This enables the command processor(s) 290 to select content associated with the user associated with the highest confidence value. The user recognition confidence data 311 may also include the user IDs corresponding to the potential user(s) who spoke the utterance.

In addition, the user recognition component 302 may use secondary data 309 to inform user recognition processing. Thus, a trained model or other component of the user recognition component 302 may be trained to take secondary data 309 as an input feature when performing recognition. Secondary data 309 may include a wide variety of data types depending on system configuration and may be made available from other sensors, devices, or storage such as user profile data 802, etc. The secondary data 309 may include a time of day at which the audio data was captured, a day of a week in which the audio data was captured, the text data generated by the ASR component 250, and/or NLU results generated by the NLU component 260.

In one example, secondary data 309 may include image data or video data. For example, facial recognition may be performed on image data or video data received from the speech-controlled device 110 from which the audio data 111 was received. Facial recognition may be performed by the user recognition component 302, or another component of the server(s) 120*a*. The output of the facial recognition process may be used by the user recognition component 302. That is, facial recognition output data may be used in conjunction with the comparison of the features/vectors of the audio data 111 and training data 305 to perform more accurate user recognition.

The secondary data 309 may also include location data of the speech-controlled device 110. The location data may be specific to a building within which the speech-controlled device 110 is located. For example, if the speech-controlled device 110 is located in user A's bedroom, such location may increase user recognition confidence data associated with user A, but decrease user recognition confidence data associated with user B.

The secondary data 309 may further include type data indicating a type of the speech-controlled device 110. Different types of speech-controlled devices may include, for example, a smart watch, a smart phone, a tablet computer, and a vehicle. The type of speech-controlled device 110 may be indicated in a profile associated with the speech-controlled device 110. For example, if the speech-controlled device 110 from which the audio data 111 was received is a smart watch or vehicle belonging to user A, the fact that the speech-controlled device 110 belongs to user A may increase user recognition confidence data associated with user A, but decrease user recognition confidence data associated with user B.

The secondary data 309 may additionally include geographic coordinate data associated with the speech-controlled device 110. For example, a profile associated with a vehicle may indicate multiple users (e.g., user A and user B). The vehicle may include a global positioning system (GPS) indicating latitude and longitude coordinates of the vehicle when the audio data 111 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the speech-controlled device 110. The global coordinates and associated locations may be associated with respective users in the user profile.

The secondary data 309 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 309 and considered by the user recognition component 302. If a mobile device (such as a phone, Tile, dongle, or other device) known to be associated with a particular user is detected proximate to (for example physically close to, connected to the same WiFi network as, or otherwise nearby) the speech-controlled device 110, this may be reflected in the secondary data 309 and considered by the user recognition component 302.

Depending on system configuration, the secondary data 309 may be configured to be included in the vector representation of the user recognition feature/vector data 308 so that all the data relating to the utterance to be processed by the scoring component 322 may be included in a single vector. Alternatively, the secondary data 309 may be reflected in one or more different data structures to be processed by the scoring component 322.

The ASR component 250 may output text data, which in turn is processed by the NLU component 260. The results of NLU processing performed by the NLU component 260 and the user recognition confidence data 311 output by the user recognition component 302 may be sent to one or more applications, represented by command processor(s) 290. The command processor(s) 290 that receives the NLU results and the user recognition confidence score data 311 may be determined by the server(s) 120*a* as corresponding to content responsive to the utterance in the audio data 111. For example, if the audio data 111 includes the utterance "Play my music," the NLU results and user recognition confidence data 311 may be sent to a music playing command processor 290. If user recognition confidence data 311 associated with a single user is passed to the command processor(s) 290, the command processor(s) 290 may identify content responsive to the utterance and associated with the user. If, instead, user recognition confidence score data 311 associated with multiple users is passed to the command processor(s) 290, the command processor(s) 290 may identify content responsive to the utterance and associated with the user associated with the highest recognition confidence.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 3B:
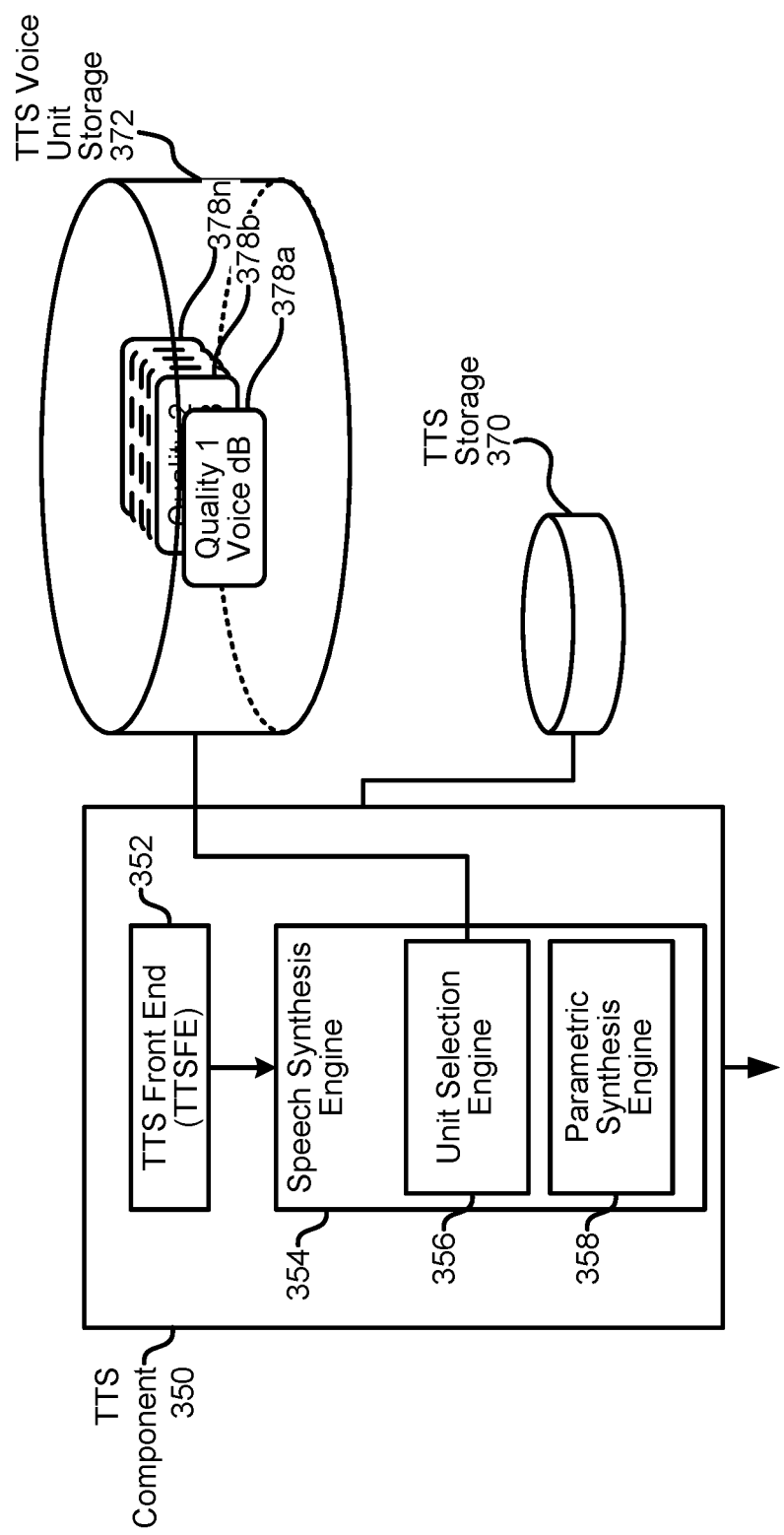

FIG. 3B illustrates an example of a text-to-speech (TTS) component generating TTS or synthesized speech according to examples of the present disclosure. The TTS component/processor 350 includes a TTS front end (TTSFE) 352, a speech synthesis engine 354, and TTS storage 370. The TTSFE 352 transforms input text data (for example from command processor 290) into a symbolic linguistic representation for processing by the speech synthesis engine 354. The TTSFE 352 may also process tags or other data input to the TTS component that indicate how specific words should be pronounced (e.g., an indication that a word is an interjection). The speech synthesis engine 354 compares the annotated phonetic units models and information stored in the TTS storage 370 for converting the input text into speech. The TTSFE 352 and speech synthesis engine 354 may include their own controller(s)/processor(s) and memory or they may use the controller/processor and memory 310 of the server(s) 120*a*, device 110, or other device, for example. Similarly, the instructions for operating the TTSFE 352 and speech synthesis engine 354 may be located within the TTS component 350, within the memory and/or storage of the server(s) 120*a*, device 110, or within an external device.

Text input into a TTS component 350 may be sent to the TTSFE 352 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 352 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 350 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage 370. The linguistic analysis performed by the TTSFE 352 may also identify different grammatical components such as prefixes, suffixes, phrases, punctuation, syntactic boundaries, or the like. Such grammatical components may be used by the TTS component 350 to craft a natural sounding audio waveform output. The language dictionary may also include letter-to-sound rules and other tools that may be used to pronounce previously unidentified words or letter combinations that may be encountered by the TTS component 350. Generally, the more information included in the language dictionary, the higher quality the speech output.

Based on the linguistic analysis the TTSFE 352 may then perform linguistic prosody generation where the phonetic units are annotated with desired prosodic characteristics, also called acoustic features, which indicate how the desired phonetic units are to be pronounced in the eventual output speech. During this stage the TTSFE 352 may consider and incorporate any prosodic annotations that accompanied the text input to the TTS component 350. Such acoustic features may include pitch, energy, duration, and the like. Application of acoustic features may be based on prosodic models available to the TTS component 350. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the TTSFE 352, referred to as a symbolic linguistic representation, may include a sequence of phonetic units annotated with prosodic characteristics. This symbolic linguistic representation may be sent to a speech synthesis engine 354, also known as a synthesizer, for conversion into an audio waveform of speech for output to an audio output device and eventually to a user. The speech synthesis engine 354 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 354 may perform speech synthesis using one or more different methods. In one method of synthesis called unit selection, described further below, a unit selection engine 356 matches the symbolic linguistic representation created by the TTSFE 352 against a database of recorded speech, such as a database of a voice corpus. The unit selection engine 356 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 356 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 358, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 350 may include an acoustic model, or other models, which may convert a symbolic linguistic representation into a synthetic acoustic waveform of the text input based on audio signal manipulation. The acoustic model includes rules which may be used by the parametric synthesis engine 358 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 352.

The parametric synthesis engine 358 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 354, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 356 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 356. As part of unit selection, the unit selection engine 356 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 370 and/or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 354 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS component 350 may be sent to an audio output component, such as a speaker for playback to a user or may be sent for transmission to another device, such as another server(s) 120a/120b, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 350 may be configured to perform TTS processing in multiple languages. For each language, the TTS component 350 may include specially configured data, instructions and/or components to synthesize speech in the desired language(s). To improve performance, the TTS component 350 may revise/update the contents of the TTS storage 370 based on feedback of the results of TTS processing, thus enabling the TTS component 350 to improve speech recognition.

Other information may also be stored in the TTS storage 370 for use in speech recognition. The contents of the TTS storage 370 may be prepared for general TTS use or may be customized to include sounds and words that are likely to be used in a particular application. For example, for TTS processing by a global positioning system (GPS) device, the TTS storage 370 may include customized speech specific to location and navigation. In certain instances the TTS storage 370 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 354 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS component 350 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Figure 4:
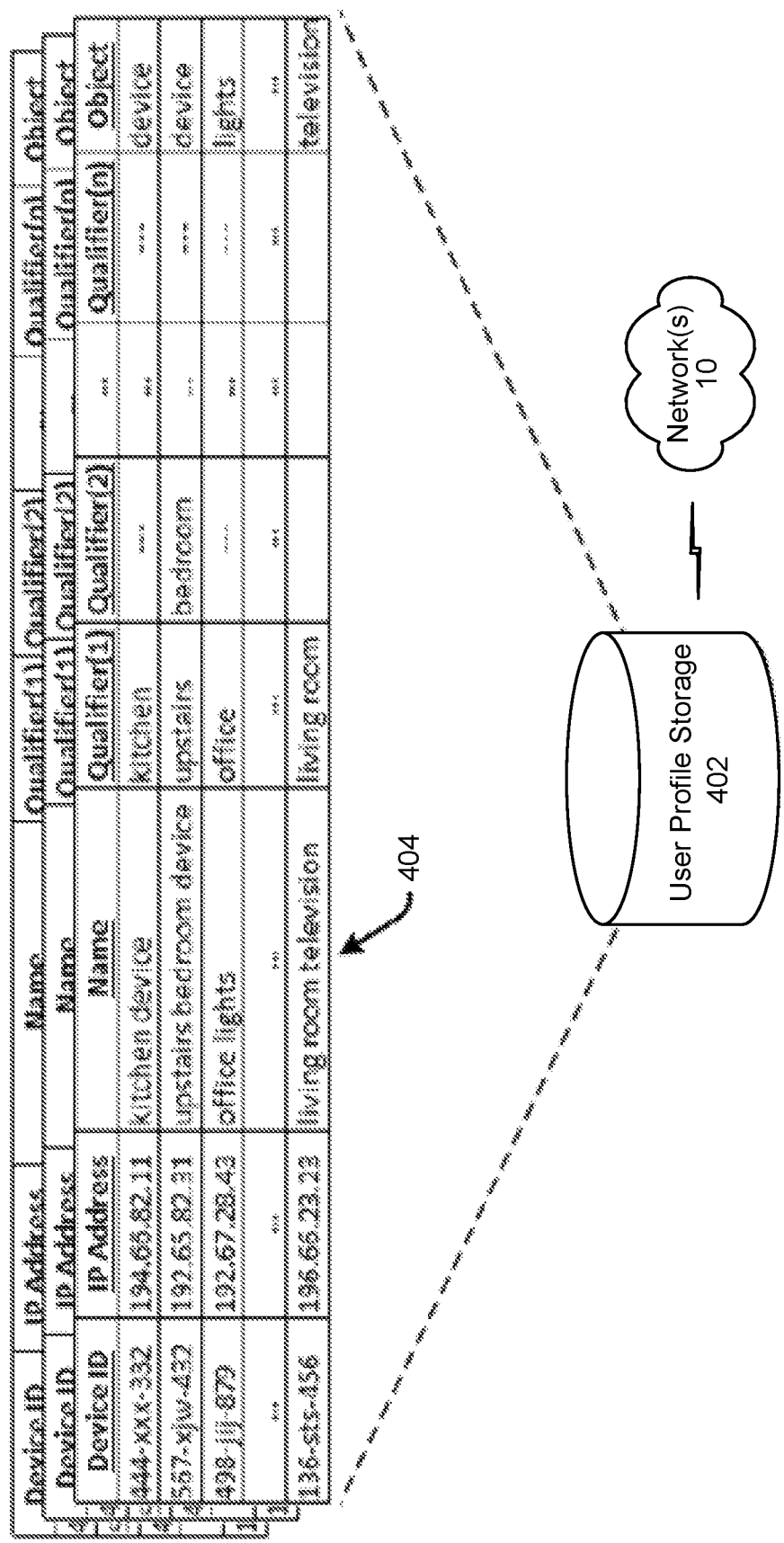
FIG. 4 illustrates data stored and associated with user profiles according to embodiments of the present disclosure.

The server(s) 120a/120b may include or refer to data regarding user accounts, shown by the user profile storage 402 illustrated in FIG. 4. The user profile storage 402 may be located proximate to server(s) 120a/120b, or may otherwise be in communication with various components, for example over network(s) 10. The user profile storage 402 may include a variety of information related to individual users, households, accounts, etc. that interact with the system 100. For illustration, as shown in FIG. 4, the user profile storage 402 may include data regarding the devices associated with particular individual user accounts 404. In an example, the user profile storage 402 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Figure 5:
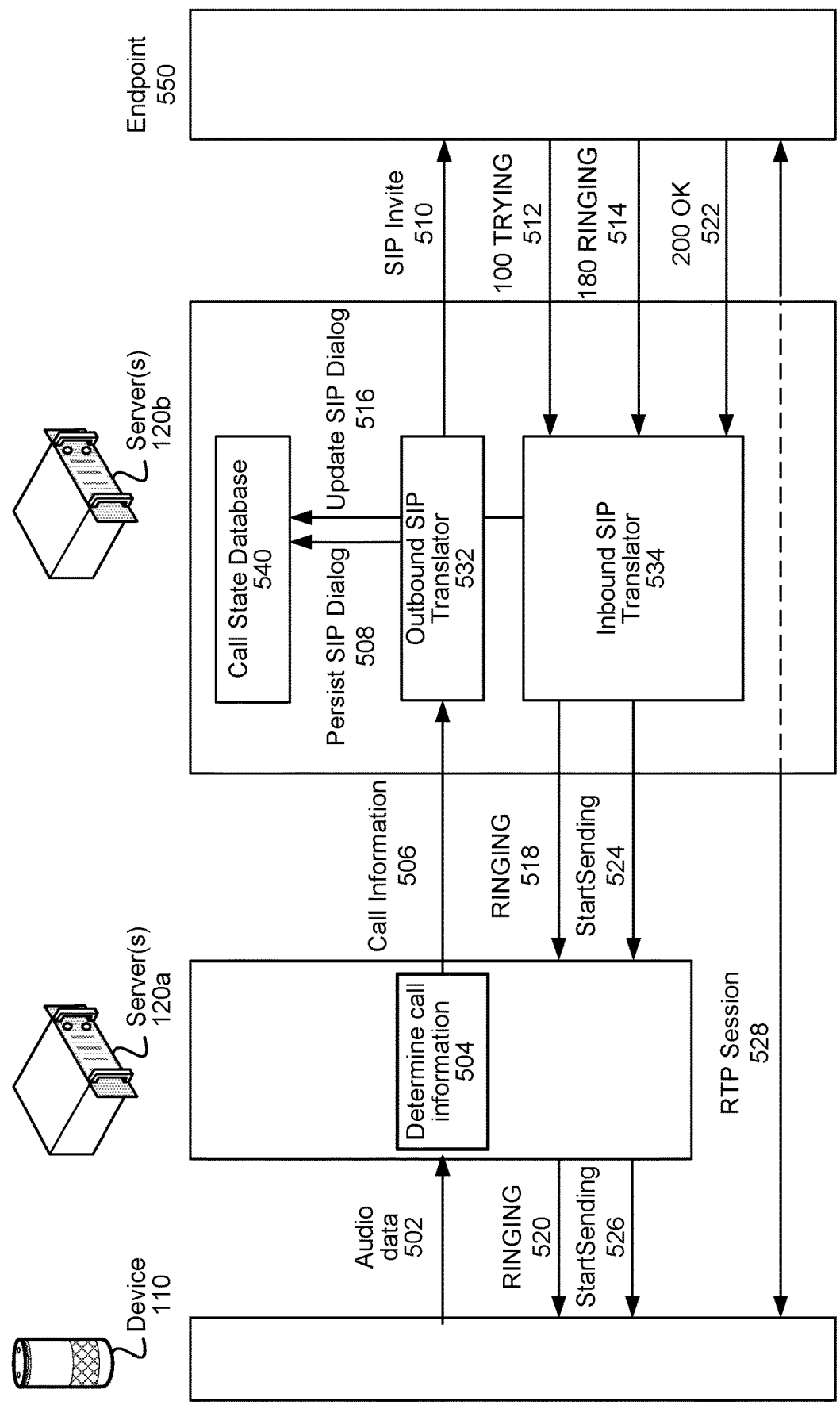
FIG. 5 illustrates an example of signaling to initiate a communication session according to examples of the present disclosure.

FIG. 5 illustrates an example of signaling to initiate a communication session according to examples of the present disclosure. In one example configuration, the server(s) 120a are configured to enable voice commands (e.g., perform ASR, NLU, etc. to identify a voice command included in audio data), whereas the server(s) 120b are configured to enable communication sessions (e.g., using session initiation protocol (SIP)). For example, the server(s) 120b may send SIP messages to endpoints (e.g., adapter 108, device 110, remote devices, etc.) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the server(s) 120b may send SIP messages to initiate a single RTP media stream between two endpoints (e.g., direct RTP media stream between the device 110 and the adapter 108) and/or to initiate and facilitate RTP media streams between the two endpoints (e.g., RTP media streams between the device 110 and the server(s) 120b and between the server(s) 120b and the adapter 108). During a communication session, the server(s) 120b may initiate two media streams, with a first media stream corresponding to incoming audio data from the device 110 to the adapter 108 and a second media stream corresponding to outgoing audio data from the adapter 108 to the device 110, although for ease of explanation this may be illustrated as a single RTP media stream.

As illustrated in FIG. 5, the device 110 may send (502) audio data to the server(s) 120a and the server(s) 120a may determine (504) call information using the audio data and may send (506) the call information to the server(s) 120b. The server(s) 120a may determine the call information by performing ASR, NLU, etc., as discussed above with regard to FIGS. 2-4, and the call information may include a data source name (DSN), a number from which to call, a number to which to call, encodings and/or additional information. For example, the server(s) 120a may identify from which phone number the user would like to initiate the telephone call, to which phone number the user would like to initiate the telephone call, from which device 110 the user would like to perform the telephone call, etc.

While FIG. 5 illustrates the server(s) 120a sending the call information to the server(s) 120b in a single step (e.g., 506), the disclosure is not limited thereto. Instead, the server(s) 120a may send the call information to the device 110 and the device 110 may send the call information to the server(s) 120b in order to initiate the telephone call without departing from the disclosure. Thus, the server(s) 120a may not communicate directly with the server(s) 120b in step 506, but may instead instruct the device 110 to connect to the server(s) 120b in order to initiate the telephone call.

The server(s) 120b may include an outbound SIP translator 532, an inbound SIP translator 534 and a call state database 540. The outbound SIP translator 532 may include logic to convert commands received from the server(s) 120a into SIP requests/responses and may handle sending outgoing SIP requests and sending responses to incoming SIP requests. After receiving the call information by the outbound SIP translator 532, the outbound SIP translator 532 may persist (508) a SIP dialog using the call state database 540. For example, the DSN may include information such as the name, location and driver associated with the call state database 540 (and, in some examples, a user identifier (ID) and password of the user) and the outbound SIP translator 532 may send a SIP dialog to the call state database 540 regarding the communication session. The call state database 540 may persist the call state if provided a device ID and one of a call ID or a dialog ID. The outbound SIP translator 532 may send (510) a SIP Invite to an Endpoint 550, which may correspond to the adapter 108, a remote device, a Session Border Controller (SBC) or the like. In some examples, the endpoint 550 may be a SIP endpoint, although the disclosure is not limited thereto.

The inbound SIP translator 534 may include logic to convert SIP requests/responses into commands to send to the server(s) 120a and may handle receiving incoming SIP requests and incoming SIP responses. The endpoint 550 may send (512) a 100 TRYING message to the inbound SIP translator 534 and may send (514) a 180 RINGING message to the inbound SIP translator 534. The inbound SIP translator 534 may update (516) the SIP dialog using the call state database 540 and may send (518) a RINGING message to the server(s) 120a, which may send (520) the RINGING message to the device 110.

When the communication session is accepted by the endpoint 550, the endpoint 550 may send (522) a 200 OK message to the inbound SIP translator 534, the inbound SIP translator 545 may send (524) a startSending message to the server(s) 120a and the server(s) 120a may send (526) the startSending message to the device 110. The startSending message may include information associated with an internet protocol (IP) address, a port, encoding or the like required to initiate the communication session. Using the startSending message, the device 110 may establish (528) an RTP communication session with the endpoint 550 via the server(s) 120b.

While FIG. 5 illustrates the server(s) 120b sending the RINGING message and the StartSending message to the device 110 via the server(s) 120a, the disclosure is not limited thereto. Instead, steps 518 and 520 may be combined into a single step and the server(s) 120b may send the RINGING message directly to the device 110 without departing from the disclosure. Similarly, steps 524 and 526 may be combined into a single step and the server(s) 120b may send the StartSending message directly to the device 110 without departing from the disclosure. Thus, the server(s) 120b may communicate with the device 110 directly without using the server(s) 120a as an intermediary.

For ease of explanation, the disclosure illustrates the system 100 using SIP. However, the disclosure is not limited thereto and the system 100 may use any communication protocol for signaling and/or controlling communication sessions without departing from the disclosure. Similarly, while some descriptions of the communication sessions refer only to audio data, the disclosure is not limited thereto and the communication sessions may include audio data, video data and/or any other multimedia data without departing from the disclosure.

FIG. 6A-6B illustrate examples of signaling to end a communication session according to examples of the present disclosure. After establishing the RTP communication session 528 between the device 110 and the endpoint 550, the RTP communication session may be ended by the user inputting a command to end the telephone call to the device 110, as illustrated in FIG. 6A, or a remote party inputting a command to end the telephone call to the endpoint 550, as illustrated in FIG. 6B.

As illustrated in FIG. 6A, the device 110 may send (602) a state change message to the server(s) 120a and the server(s) 120a may send (604) an end message to the server(s) 120b. The outbound SIP translator 532 may update (606) the session using the call state database 540 and may send (608) a SIP BYE message to the endpoint 550. The endpoint 550 may send (610) a 200 OK message to the inbound SIP translator 534 and the inbound SIP translator 534 may update (612) the session using the call state database 540. In some examples, the inbound SIP translator 534 may send the 200 OK message to the device 110 to confirm that the communication session has been ended. Thus, the RTP communication session 528 may be ended between the device 110 and the endpoint 550. If the endpoint 550 corresponds to the adapter 108, the adapter 108 may hang up (e.g., end) the telephone call using the phone network 20.

As illustrated in FIG. 6B, the endpoint 550 may send (652) a SIP BYE message to the inbound SIP translator 534 and the inbound SIP translator 534 may update (654) the session using the call state database 540. The inbound SIP translator 534 may send (656) a stopSending message to the server(s) 120a and the server(s) 120a may send (658) the stopSending message to the device 110. The device 110 may send (660) a state change message to the server(s) 120a and the server(s) 120a may send (662) an End message to the outbound SIP translator 532, the End message including a DSN. The outbound SIP translator 532 may then update (664) the session using the call state database 540, and send (666) a 200 OK message to the endpoint 550. Thus, the RTP communication session 528 may be ended between the device 110 and the endpoint 550. If the endpoint 550 corresponds to the adapter 108, the adapter 108 may hang up (e.g., end) the telephone call using the phone network 20.

While FIGS. 6A and 6B illustrate the server(s) 120a acting as an intermediary between the device 110 and the server(s) 120b, the disclosure is not limited thereto. Instead, steps 602 and 604 may be combined into a single step and the device 110 may directly send the state change message and/or the End message to the server(s) 120b without departing from the disclosure. Similarly, steps 656 and 658 may be combined into a single step and the server(s) 120b may send the StopSending message directly to the device 110 without departing from the disclosure, and/or steps 660 and 662 may be combined into a single step and the device 110 may directly send the state change message and/or the End message to the server(s) 120b without departing from the disclosure.

While FIGS. 5, 6A and 6B illustrate the RTP communication session 528 being established between the device 110 and the endpoint 550, the disclosure is not limited thereto and the RTP communication session 528 may be established between the adapter 108 and the endpoint 550 without departing from the disclosure. Additionally or alternatively, the adapter 108 may be the endpoint 550 and the RTP communication session 528 may be established between the device 110 and the adapter 108, such as when the device 110 is part of a telephone call using the phone network 20.

Figure 7A:
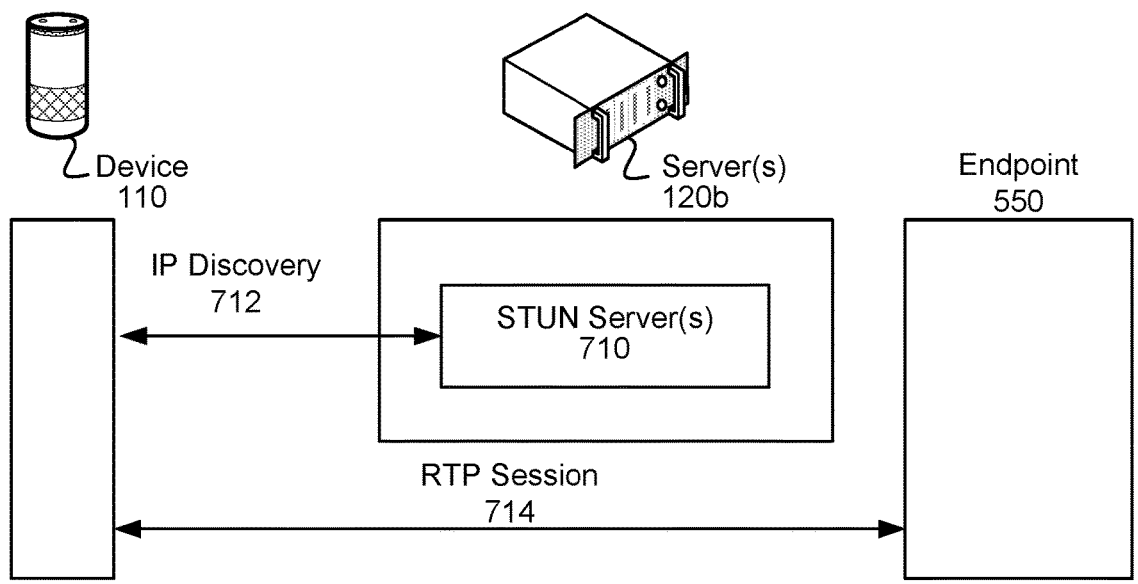
FIG. 7A-7B illustrate examples of establishing media streams between devices according to examples of the present disclosure.
Figure 7B:
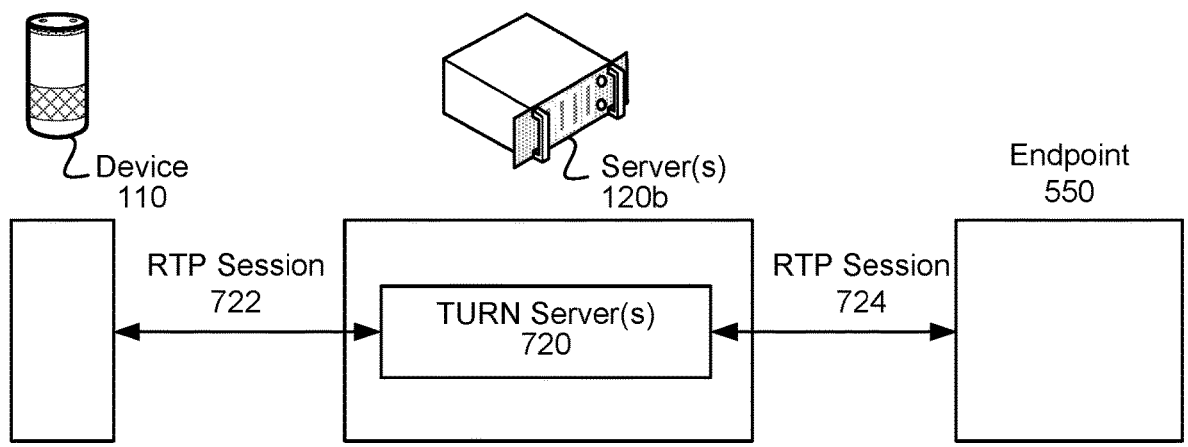

FIG. 7A-7B illustrate examples of establishing media streams between devices according to examples of the present disclosure. In some examples, the device 110 may have a publicly accessible IP address and may be configured to establish the RTP communication session directly with the endpoint 550. To enable the device 110 to establish the RTP communication session, the server(s) 120b may include Session Traversal of User Datagram Protocol (UDP) Through Network Address Translators (NATs) server(s) (e.g., STUN server(s) 710). The STUN server(s) 710 may be configured to allow NAT clients (e.g., device 110 behind a firewall) to setup telephone calls to a VoIP provider hosted outside of the local network by providing a public IP address, the type of NAT they are behind and a port identifier associated by the NAT with a particular local port. As illustrated in FIG. 7A, the device 110 may perform (712) IP discovery using the STUN server(s) 710 and may use this information to set up an RTP communication session 714 (e.g., UDP communication) between the device 110 and the endpoint 550 to establish a telephone call.

In some examples, the device 110 may not have a publicly accessible IP address. For example, in some types of NAT the device 110 cannot route outside of the local network. To enable the device 110 to establish an RTP communication session, the server(s) 120b may include Traversal Using relays around NAT (TURN) server(s) 720. The TURN server(s) 720 may be configured to connect the device 110 to the endpoint 550 when the client 110 is behind a NAT. As illustrated in FIG. 7B, the device 110 may establish (722) an RTP session with the TURN server(s) 720 and the TURN server(s) 720 may establish an RTP session with the endpoint 550. Thus, the device 110 may communicate with the endpoint 550 via the TURN server(s) 720. For example, the device 110 may send outgoing audio data to the server(s) 120b and the server(s) 120b may send the outgoing audio data to the endpoint 550. Similarly, the endpoint 550 may send incoming audio data to the server(s) 120b and the server(s) 120b may send the incoming audio data to the device 110.

In some examples, the system 100 may establish communication sessions using a combination of the STUN server(s) 710 and the TURN server(s) 720. For example, a communication session may be more easily established/configured using the TURN server(s) 720, but may benefit from latency improvements using the STUN server(s) 710. Thus, the system 100 may use the STUN server(s) 710 when the communication session may be routed directly between two devices and may use the TURN server(s) 720 for all other communication sessions. Additionally or alternatively, the system 100 may use the STUN server(s) 710 and/or the TURN server(s) 720 selectively based on the communication session being established. For example, the system 100 may use the STUN server(s) 710 when establishing a communication session between two devices (e.g., point to point) within a single network (e.g., corporate LAN and/or WLAN), but may use the TURN server(s) 720 when establishing a communication session between two devices on separate networks and/or three or more devices regardless of network(s). When the communication session goes from only two devices to three or more devices, the system 100 may need to transition from the STUN server(s) 710 to the TURN server(s) 720. Thus, the system 100 may anticipate three or more devices being included in the communication session and may establish the communication session using the TURN server(s) 720.

Figure 8:
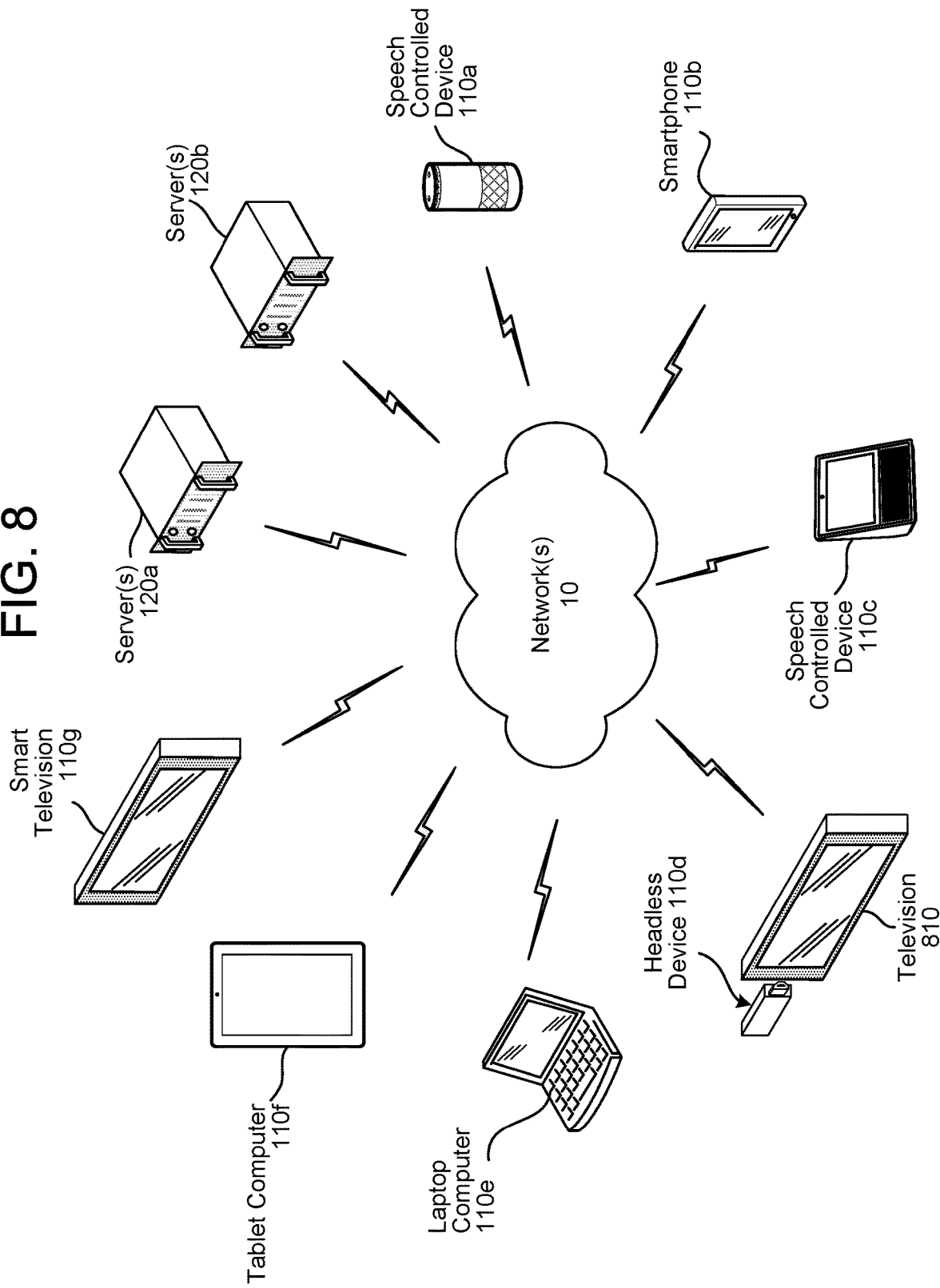
FIG. 8 illustrates an example of a computer network for use with the system according to examples of the present disclosure.

As illustrated in FIG. 8, devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a speech controlled device 110a, a smartphone 110b, a speech controlled device 110c (which includes a touchscreen display), a headless device 110d connected to a television 810, a laptop computer 110e, a tablet computer 110f and/or a smart television 110g, may be connected to the network(s) 10 through a wired and/or wireless connection. Thus, while the examples illustrated above are directed to the speech controlled device 110a, the disclosure is not limited thereto and the device 110 may be any device capable of capturing audio from and/or outputting audio to a user. In addition, the server(s) 120a and the server(s) 120b may communicate with the device 110 via the network(s) 10.

While the examples described herein illustrate the device 110 performing multiple functions, the disclosure is not limited thereto. Instead, the server(s) 120a may perform any of the functions described herein without departing from the disclosure. For example, the server(s) 120a may assist the device 110 with ASR processing, NLU processing, command processing, and/or generating synthesized speech. A single server 120a may be capable of performing all speech processing or multiple server(s) 120a may combine to perform the speech processing. In addition, certain speech detection or command execution functions may be performed by device 110. Thus, the device 110 and/or the server(s) 120a may perform the functions described herein without departing from the disclosure.

Figure 9:
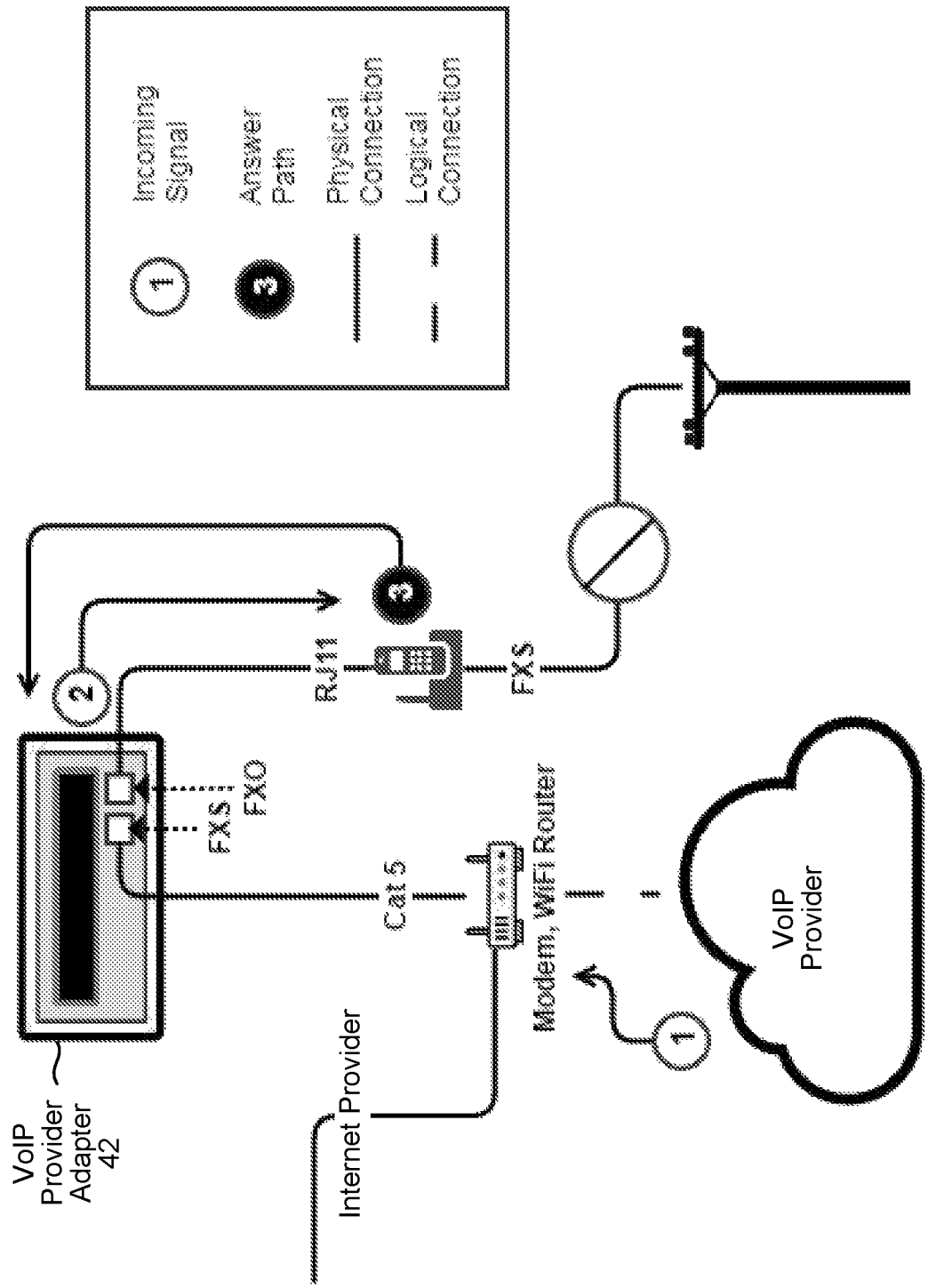
FIG. 9 illustrates an example of an existing voice over internet protocol (VoIP) solution.

FIG. 9 illustrates an example of an existing voice over internet protocol (VoIP) solution. As illustrated in FIG. 9, a VoIP provider adapter 41 may be connected to the AP 12 using a category 5 cable (e.g., Cat 5), which is a twisted pair cable for carrying signals (e.g., Ethernet cable). The AP 12 may be connected to the network(s) 10 via an internet provider, enabling the VoIP provider adapter 41 to send and receive data using the network(s) 10. The VoIP provider adapter 41 may also be connected to the wireless telephone 26 using an RJ11 connector (e.g., phone jack), thus enabling the wireless telephone 26 to send and receive audio data using the VoIP provider adapter 41. For example, an incoming signal from the VoIP provider may be received by the AP 12 and send to the wireless telephone 26 via the VoIP provider adapter 41. If the wireless telephone 26 answers the incoming signal, the wireless telephone 26 may send an answer request to the VoIP provider adapter 41 via the answer path (3).

As illustrated in FIG. 9, VoIP Provider adapters are seeking to provide telephone service to the home. For example, a VoIP provider adapter 41 is a Foreign Exchange Subscriber (FXS) device because it delivers an analog line. In other words, it delivers a dial tone, battery current and ring voltage. The majority of analog telephone adapter (ATA) devices in the marketplace today are Foreign Exchange Subscriber Devices because they are designed to replace a user's existing home phone service thereby generating revenue for the new VoIP provider. As illustrated in FIG. 9, the wireless telephone 26 is not connected to the phone network 20 and only sends and receives audio data using the VoIP provider adapter 41 via the network(s) 10.

In contrast, the adapter 108 extends the existing home telephone service and acts more similarly to a cordless home phone base station. It can seize the telephone line to place a call and receive ring voltage from the home network for an incoming call. Like a cordless home phone base station, the adapter 108 signals the devices (e.g., devices 110) tethered to it, the difference being that the adapter 108 will signal devices over the internet. The adapter 108 is therefore a Foreign Exchange Office (FXO) Device as it plugs into an existing Foreign Exchange Subscriber (FXS) port to receive on/off hook indications from the user's landline provider.

Figure 10A:
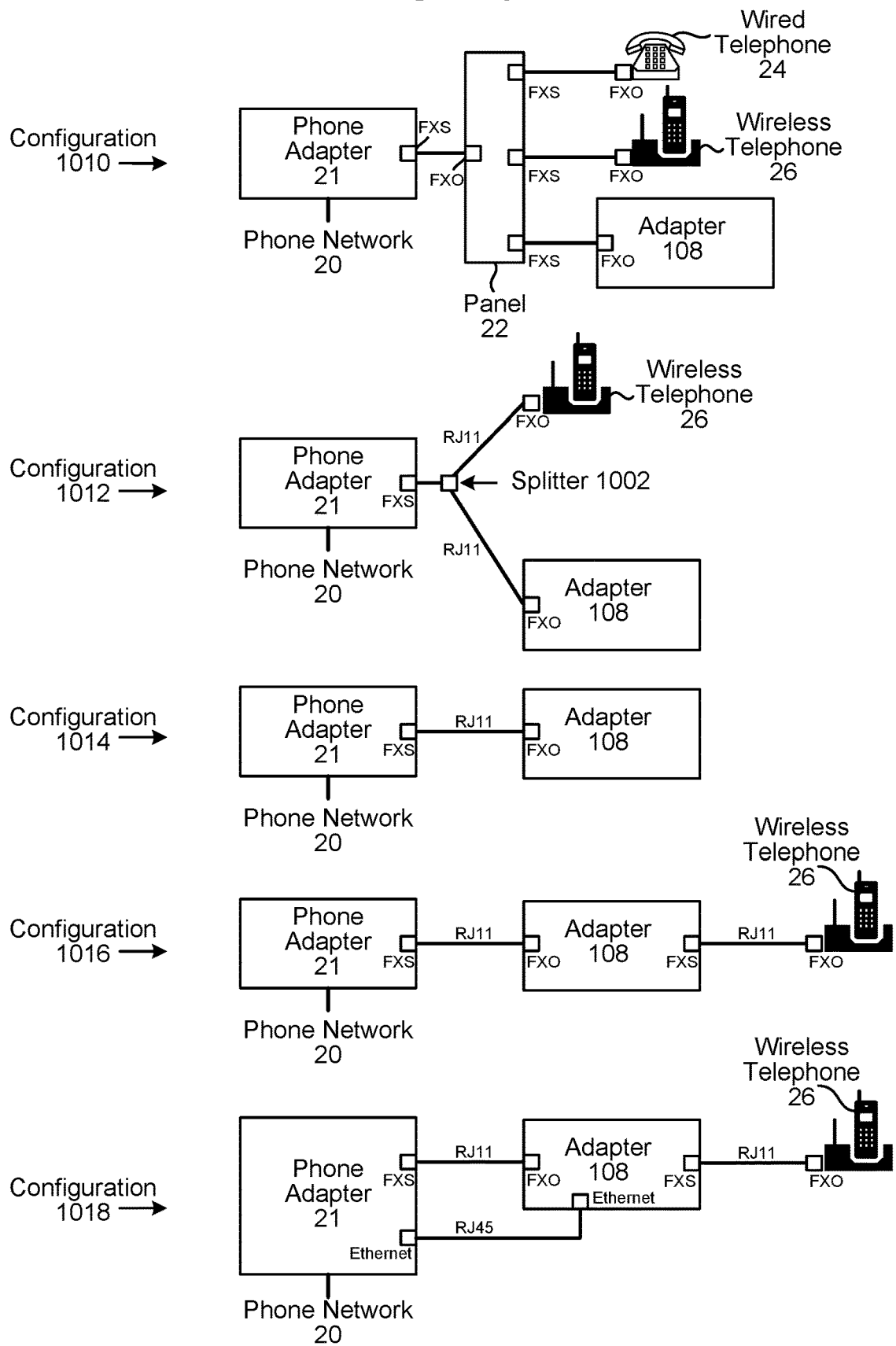
FIG. 10A-10B illustrate examples of different configurations for connecting different types of phone networks to an adapter according to examples of the present disclosure.
Figure 10B:
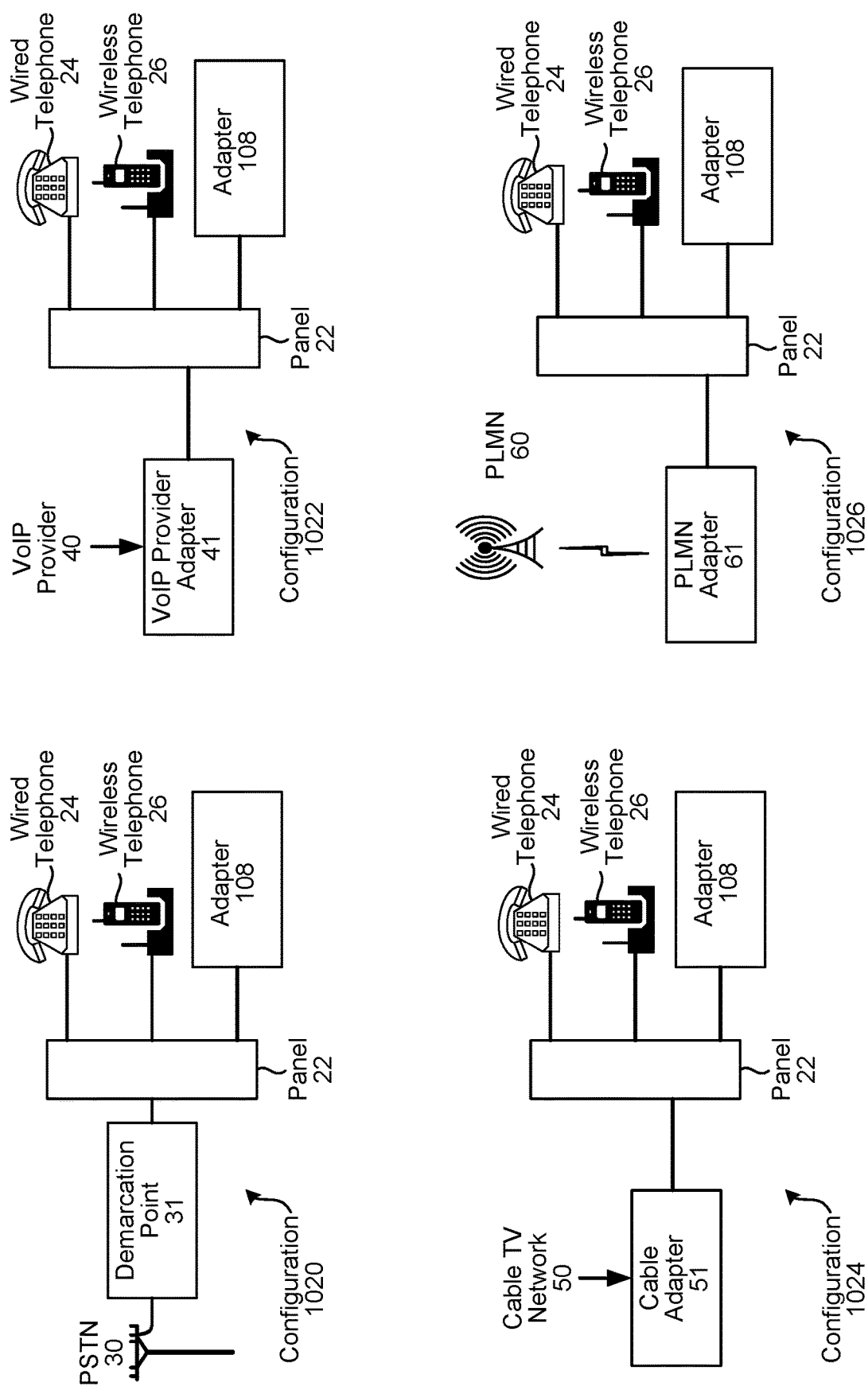

FIG. 10A-10B illustrate examples of different configurations for connecting different types of phone networks to an adapter according to examples of the present disclosure. As illustrated in FIG. 10A, the phone network 20 may be connected to the landline telephones (e.g., wired telephone 24 and wireless telephone 26) and the adapter 108 either directly via a phone adapter 21 or via the home telephone circuit 28. For example, a first configuration 1010 includes the phone adapter 21 connected to the panel 22, enabling any device connected to the panel 22 to be connected to the phone network 20 via the phone adapter 21. As illustrated in FIG. 10A, the phone adapter 21 includes a Foreign Exchange Subscriber (FXS) interface that is connected to a Foreign Exchange Office (FXO) interface on the panel 22. The FXS interface is a port that delivers an analog line to the user, such as a dial tone, battery current and ring voltage, whereas the FXO interface is a port that receives the analog line, such as a plug on the landline telephones and the adapter 108 that delivers an on-hook/off-hook indication (e.g., loop closure). For example, the panel 22 includes multiple FXS interfaces connected to FXOs of the landline telephones (e.g., 24, 26) and the adapter 108.

As illustrated in FIG. 10A, a second configuration 1012 includes the phone adapter 21 connected to the wireless telephone 26 and the adapter 108 via a splitter 1002. Thus, the FXS interface on the phone adapter 21 is connected to the splitter 1002 and to both the FXO interface on the wireless telephone 26 and the adapter 108. In both the first configuration 1010 and the second configuration 1012, the landline telephones will ring at the same time as the adapter 108 notifies the server(s) 120b of an incoming call. While the second configuration 1012 is similar to the first configuration 1010, the phone adapter 21 may not be connected to the panel 22 in the second configuration 1012 and therefore any telephones need to be directly connected to the phone adapter 21 in order to communicate via the phone network 20.

As illustrated in FIG. 10A, a third configuration 1014 includes the phone adapter 21 connected only to the adapter 108. Thus, there are no landline telephones connected to the phone network 20, but the adapter 108 may enable the devices 110 and any remote devices via the server(s) 120b to communicate via the phone network 20.

As illustrated in FIG. 10A, a fourth configuration 1016 includes the phone adapter 21 connected to the adapter 108 and a landline telephone (e.g., 26) connected to the adapter 108. Similarly, a fifth configuration 1018 includes the phone adapter 21 connected to the adapter 108 and the landline telephone 26 connected to the adapter 108. In contrast to the first configuration 1010 and the second configuration 1012, the adapter 108 is closer to the phone network 20 and therefore the adapter 108 may control when the wireless telephone 26 rings to indicate an incoming call. Thus, the adapter 108 may prevent the wireless telephone 26 from ringing entirely or may delay the ringing until the adapter 108 has sent a notification to the server(s) 120b, received caller identification information, and/or the like. The fourth configuration 1016 illustrates the adapter 108 connected to the phone adapter 21 using an RJ11 port, whereas the fifth configuration 1018 illustrates the adapter 108 connected to the phone adapter 21 using an RJ11 port and an RJ45 (e.g., Ethernet) port. Thus, in the fourth configuration 1016 the adapter 108 would need to connect to the AP 12 to send and receive data via the network(s) 10, whereas in the fifth configuration 1018 the adapter 108 may send and receive data via the network(s) 10 using the phone adapter 21.

As discussed above, the phone network 20 may include one or more different networks, such as the PSTN 30, the VoIP provider 40, the cable TV network 50 and/or the PLMN 60. FIG. 10B illustrates examples of connecting the adapter 108 to each of the different phone networks 20. For example, a first configuration 1020 corresponds to the PSTN 30 connecting to the panel 22 via a Demarcation Point 31, a second configuration 1022 corresponds to the VoIP provider 40 connecting to the panel 22 via a VoIP provider adapter 41, a third configuration 1024 corresponds to the cable TV network 50 connecting to the panel 22 via a cable adapter 51, and a fourth configuration 1026 corresponds to the PLMN 60 connecting to the panel 22 via a PLMN adapter 61.

As illustrated in FIG. 10B, the phone adapter 21 corresponds to the demarcation point 31, the VoIP provider adapter 42, the cable adapter 52 and/or the PLMN adapter 62, depending on the type of the phone network 20. Thus, while FIG. 10B illustrates the phone networks 20 connecting to the adapter 108 via the panel 22, this is intended for ease of illustration and the disclosure is not limited thereto. Instead, the phone networks 20 may connect to the adapter 108 using any of the configurations illustrated in FIG. 10A without departing from the disclosure.

The PSTN 30 is a typical landline telephone network that may be used to communicate over telephone wires. In contrast, the VoIP provider 40 may be used to communicate over the network(s) 10 by sending and receiving audio data and/or video data using the VoIP provider adapter 41. Similarly, the cable TV network 50 may be used to communicate via cable telephony over cable TV networks. For example, a telephone interface (e.g., cable adapter 51) may convert analog signals from the home telephone circuit 28 to digital signals and send the digital signals over the cable connection to the cable provider, which may connect to the PSTN 30 and send the digital signals using the PSTN 30. The PLMN 60 may be a mobile network that may also be interconnected with the PSTN 30. For example, a telephone interface (e.g., PLMN adapter 61) may convert analog signals from the home telephone circuit 28 to digital signals and may send the digital signals via a wireless connection to the mobile network (e.g., using cellular towers or the like), which may send the digital signals using the PLMN 60 and/or the PSTN 30.

While FIG. 10B illustrates the adapter 108 connecting to the PLMN 60 via the PLMN adapter 61, the disclosure is not limited thereto and the adapter 108 may connect to the PLMN 60 via a mobile device without departing from the disclosure. In some examples, the adapter 108 may connect to the mobile device via a wireless connection (e.g., WiFi, Bluetooth or the like) and may send and/or receive audio data over the PLMN 60 via the mobile device. For example, the mobile device may be a smartphone and may receive a telephone call over the PLMN 60 (e.g., cellular network). When the telephone call is received by the mobile device, the adapter 108 may receive the telephone call via the wireless connection and may enable the wired telephone 24, the wireless telephone 26 and/or the devices 110 to connect to the telephone call. For example, the adapter 108 may send data to the sever(s) 120 and/or the devices 110 indicating that the telephone call is being received and may receive a command to answer the telephone call and forward audio data to and from a device 110 during the telephone call. Thus, a user may answer the telephone call using the wired telephone 24, the wireless telephone 26 and/or the devices 110 instead of using the mobile device. Similarly, the adapter 108 may be configured to connect the server(s) 120a to the mobile device and/or to enable any functionality disclosed herein.

To illustrate an example of receiving an incoming telephone call, a caller (e.g. "Bob") may dial the home phone number associated with the user (e.g., (555) 555-5555), causing each of the devices (e.g., 24, 26, 108) connected to the home telephone circuit 28 to ring. The adapter 108 would detect the incoming telephone call and send a signal to the server(s) 120a indicating the incoming telephone call and/or a phone number associated with the caller. The server(s) 120a would then notify the user of the incoming telephone call by sending a notification to the devices 110. Thus, the wired telephone 24, the wireless telephone 26 and/or the devices 110 would ring and the user would choose whether or not to answer the incoming telephone call from the wired telephone 24, the wireless telephone 26 and/or the devices 110. If the user elects to answer the incoming telephone call using one of the devices 110, the device 110 may send a command (e.g., answer request) to the server(s) 120*a* and from the server(s) 120*a* to the server(s) 120*b* to the adapter 108 that instructs the adapter 108 to answer the incoming telephone call. Thus, the adapter 108 may answer the incoming telephone call, causing the wired telephone 24 and/or the wireless telephone 26 to stop ringing, and may forward audio data between the phone network 20 and the device 110 via the remote server(s) 120*b*.

Figure 11:
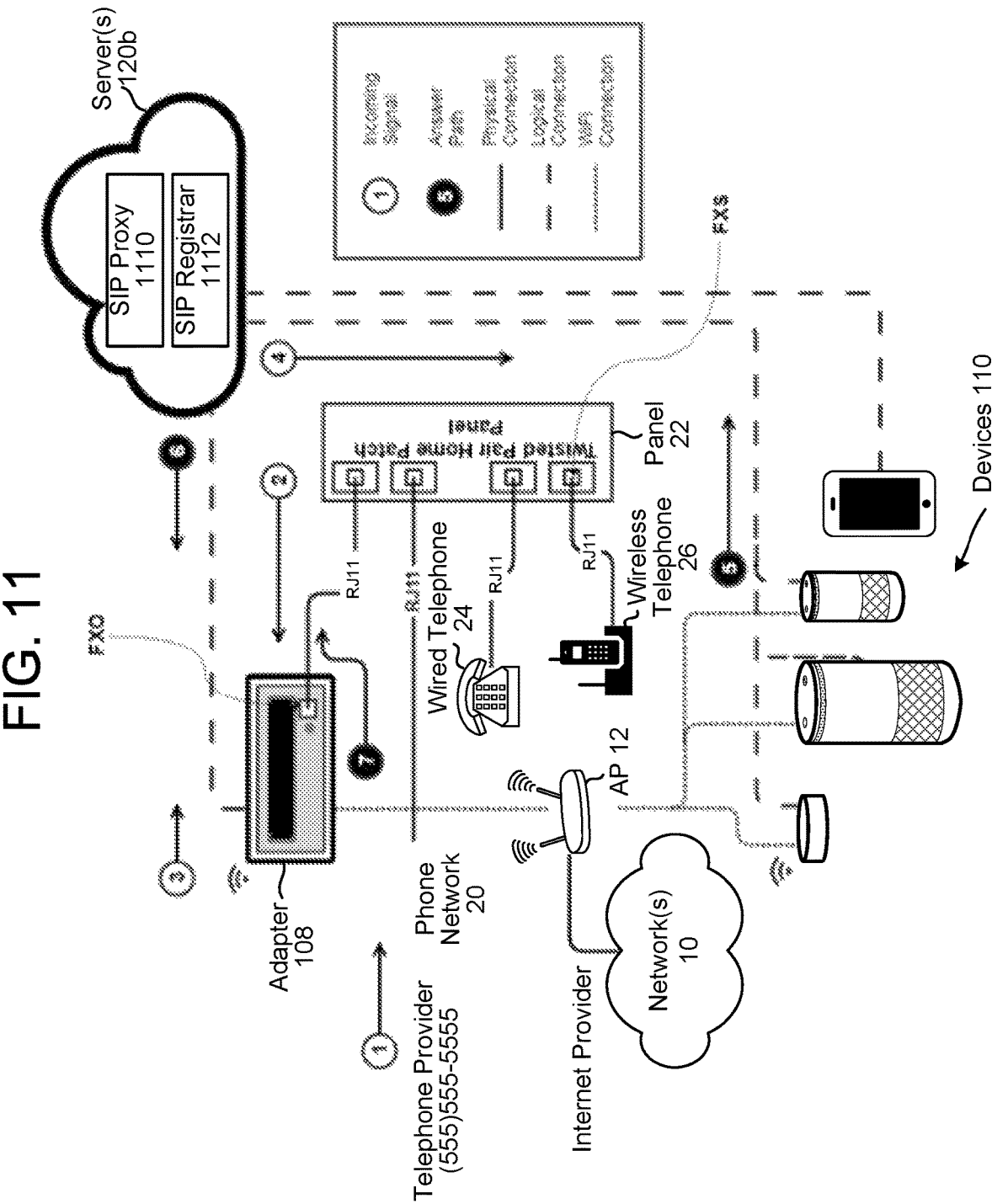
FIG. 11 illustrates an example of receiving an incoming call from a phone network according to examples of the present disclosure.

FIG. 11 illustrates an example of receiving an incoming call from a phone network 20 according to examples of the present disclosure. As illustrated in FIG. 11, an incoming call from the phone network 20 is connected to a home telephone circuit 28 corresponding to the panel 22. The panel 22 is connected to multiple devices using an RJ11 connector, including the wired telephone 24, the wireless telephone 26 and the adapter 108. When the incoming call is received by the home telephone circuit 28, the adapter 108 is notified of the incoming call. The adapter 108, via a wired and/or wireless connection (e.g., WiFi) to the home's router (e.g., AP 12), signals a Session Initiation Protocol (SIP) proxy server (e.g., SIP Proxy 1110, illustrated as part of the server(s) 120*b*) of the incoming call. The SIP proxy 1110 signals the Alexa communications endpoints (e.g., devices 110) including the mobile phone VoIP enabled application. When the user answers the call on one of the Alexa endpoints, the SIP proxy 1110 receives the answer request. The SIP proxy 1110 sends the answer request to the adapter 108, the adapter 108 accepts the call via the RJ11 connection and then seizes the line, which causes the landline telephones (e.g., wired telephone 24 and wireless telephone 26) to stop ringing.

In addition to the SIP proxy 1110, FIG. 11 illustrates the server(s) 120*b* including a SIP Registrar 1112, which is a SIP endpoint that accepts REGISTER requests and records the address and other parameters from the user agent (e.g., device 110). The SIP Registrar 1112 may provide a location service for subsequent requests. For example, the location service links one or more internet protocol (IP) addresses to the SIP uniform resource identifier (URI) of the registering agent. Multiple user agents may register for the same URI, with the result that all registered user agents receive the calls to the URI.

As illustrated in FIG. 11, an incoming signal is associated with a telephone provider for a number (e.g., (555) 555-5555). The phone network 20 sends the incoming signal to the panel 22 using a first connection (1) (e.g., physical connection), which is illustrated by a solid line. The panel 22 forwards the incoming signal to each of the devices connected to the panel 22, which includes the landline telephones (e.g., wired telephone 24 and wireless telephone 26) and the adapter 108, using a second connection (2) (e.g., physical connection). The adapter 108 communicates with the network(s) 10 via the AP 12 using a wireless connection, illustrated by a dotted line, and the adapter 108 forms a third connection (3) (e.g., logical connection) with the server(s) 120*a*/120*b*, illustrated by a dashed line, when the adapter 108 sends the incoming signal to the server(s) 120*b*. The devices 110 communicate with the network(s) 10 via the AP 12 using a wireless connection and the server(s) 120*b* form a fourth connection (e.g., logical connection) with the devices 110 when the server(s) 120*a*/120*b* forward the incoming signal to the devices 110. After receiving the incoming signal, the devices 110 may display a notification of the incoming signal to a user and may receive an input requesting the device 110 to answer the incoming signal.

While the server(s) 120*b* are typically in charge of communication sessions and would be used during the telephone call to send and receive audio data between the adapter 108 and the device 110, the server(s) 120*a* may also send the incoming signal and/or a notification of the incoming signal to the device 110. Thus, the device 110 may send a response to the server(s) 120*a* instead of or in addition to the server(s) 120*b*.

In response to receiving the input requesting the device 110 to answer the incoming signal, an answer path may be formed from the device 110 to the adapter 108. For example, the device 110 may send the answer request to the server(s) 120*a* using a fifth connection (e.g., logical connection) and the server(s) 120*a* may communicate with the server(s) 120*b* and the server(s) 120*b* may forward the answer request to the adapter 108 using a sixth connection (e.g., logical connection). The adapter 108 may receive the answer request via the AP 12 and may accept the call by connecting to the panel 22 using a seventh connection (e.g., physical connection).

Once the adapter 108 has accepted the incoming signal, incoming audio data (e.g., audio data captured by a remote telephone associated with the caller) is received by the adapter 108 from the phone network 20 via the panel 22 and is sent from the adapter 108 to the AP 12, which forwards the incoming audio data to the server(s) 120*b* via the network(s) 10. The server(s) 120*b* may forward the incoming audio data to the AP 12 via the network(s) 10 and the AP 12 may send the incoming audio data to the device 110. After receiving the incoming audio data, the device 110 may generate incoming audio corresponding to the incoming audio data using one or more speakers associated with the device 110.

Similarly, the device 110 may capture outgoing audio data corresponding to audio received from the user and may send the outgoing audio data to the AP 12, which forwards the outgoing audio data to the server(s) 120*b* via the network(s) 10. The server(s) 120*b* may send the outgoing audio data to the AP 12 via the network(s) 10 and the AP 12 may send the outgoing audio data to the adapter 108. After receiving the outgoing audio data, the adapter 108 may send the outgoing audio data to the phone network 20 via the panel 22. The caller may receive the outgoing audio data from the phone network 20 using a telephone or other device that may be configured to generate audio corresponding to the incoming audio data.

To illustrate an example of initiating an outgoing call using the device 110, the user may say "Alexa, call Bob" and the device 110 may capture audio data corresponding to this utterance. The device 110 may send the audio data to the server(s) 120*a* and the server(s) 120*a* may perform speech processing to understand the utterance and determine a command. For example, the server(s) 120*a* may determine that the utterance corresponds to a command to initiate a telephone call to a particular contact (e.g., "Bob") included in a user profile associated with the device 110 and may determine a phone number associated with the contact. If the selected phone number is associated with a landline (e.g., accessible via the phone network 20), the system 100 may determine to initiate the telephone call using the existing landline (e.g., phone network 20). For example, the system 100 may send a signal from the devices 110 to the server(s) 120*a*, the server(s) 120*a* may communicate with the server(s) 120*b* and the server(s) 120*b* may send a signal from the server(s) 120*b* to the adapter 108 to initiate the telephone call using the phone network 20. The recipient (e.g., "Bob") would recognize the user since the caller identification would indicate that the telephone call is associated with the existing landline home phone number (e.g., (555)555-5555), which is associated with the user and may already be in the recipient's address book for the user.

The contact may be associated with multiple phone numbers. In some examples, to identify which phone number with which to initiate the telephone call, the server(s) 120a may request clarification from the user by sending a notification to the device 110. However, the disclosure is not limited thereto and the server(s) 120a may select a default phone number associated with the contact and/or may select from the multiple phone numbers based on the utterance. Thus, the server(s) 120a may attempt to determine the intent of the user based on the utterance. For example, the server(s) 120a may differentiate between "Alexa, call Mom's house" and "Alexa, call Mom's mobile" when initiating the call. Additionally or alternatively, the server(s) 120a may attempt to determine the intent of the user based on characteristics of the multiple phone numbers associated with the contact. For example, if the user requests to initiate a telephone call using the device 110 associated with the server(s) 120a and a first phone number of the multiple phone numbers is also associated with the server(s) 120a, the server(s) 120a may initiate the telephone call to the first phone number without using the phone network 20 (e.g., using software running on the device 110, voice over internet protocol (VoIP) or the like).

Similarly, the server(s) 120a may determine from which phone number the user would like to initiate the telephone call. For example, the server(s) 120a may differentiate between "Alexa, call Mom on my home line" and "Alexa, call Mom with video" or the like. In addition, if the user requests to initiate the telephone call to a landline phone number, the server(s) 120a may determine to initiate the telephone call using the phone network 20, whereas if the telephone call is to a phone number associated with the remote server(s) 120a, the server(s) 120a may determine to initiate the telephone call without using the phone network 20.

In some examples, the contact may be available via different communication paths (e.g., PSTN 30, VoIP 40, etc.), which may be associated with different applications. For example, the contact may be available via a landline number, via a first application associated with the server(s) 120b and via a second application that is not associated with the server(s) 120b. The server(s) 120a may determine which way to route the telephone call (e.g., which communication path to select) based on a cost (e.g., avoid charges), a phone quality (e.g., throughput associated with the communication path), whether presence information is available (e.g., server(s) 120b receives an indication that the contact is available via the first application), and/or the like. Thus, the server(s) 120a may determine how to route the telephone call based on the intent or based on other user preferences without departing from the disclosure.

Figure 12:
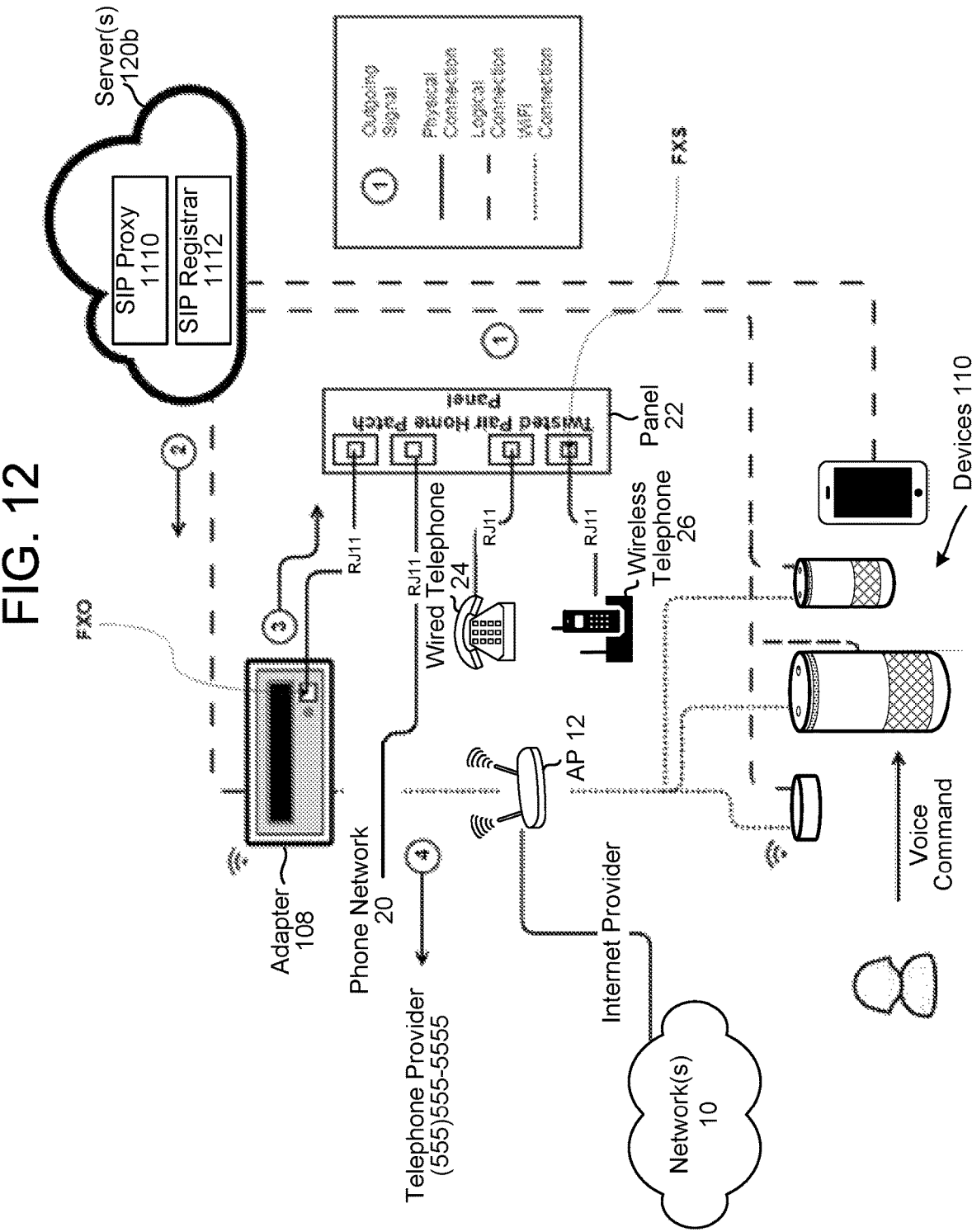
FIG. 12 illustrates an example of sending an outgoing call using a phone network according to examples of the present disclosure.

FIG. 12 illustrates an example of sending an outgoing call using a phone network 20 according to examples of the present disclosure. As illustrated in FIG. 12, the user inputs a voice command as audio to an Alexa communication endpoint (e.g., device 110 or VoIP enabled mobile application) to call a landline contact. The audio data is interpreted by the server(s) 120a and the call request is signaled from the server(s) 120a to the SIP proxy 1110 associated with the server(s) 120b. The SIP proxy 1110 forwards the call request to the adapter 108 and, in response to the call request, the adapter 108 goes off hook to obtain a dial tone. The call request may indicate a phone number with which to initiate the telephone call and the adapter 108 may dial the phone number using audio tones, which establishes a connection through the home telephone circuit 28 to the phone network 20. For example, each number in the phone number dialed by the adapter 108 may correspond to unique audio tones and the adapter 108, the landline telephones (e.g., wired telephone 24 and wireless telephone 26) and the phone network 20 may identify the number based on the unique audio tones.

As illustrated in FIG. 12, the outgoing signal is sent from the device 110 to the adapter 108 to call a recipient using the phone network 20. For example, the device 110 may send the outgoing signal to the server(s) 120b using a first connection (1) (e.g., logical connection) and the server(s) 120b may send the outgoing signal to the adapter using a second connection (2) (e.g., logical connection). The adapter 108 may initiate the telephone call by connecting to the panel 22 using a third connection (3) (e.g., physical connection) and dialing the phone number indicated by the outgoing signal. By dialing the phone number, the adapter 108 may form a fourth connection (4) (e.g., physical connection) with the phone network 20 via the panel 22.

During the telephone call, incoming audio data (e.g., audio data captured by a remote telephone associated with the recipient) is received by the adapter 108 from the phone network 20 via the panel 22 and is sent from the adapter 108 to the AP 12, which forwards the incoming audio data to the server(s) 120b via the network(s) 10. The server(s) 120b may forward the incoming audio data to the AP 12 via the network(s) 10 and the AP 12 may send the incoming audio data to the device 110. After receiving the incoming audio data, the device 110 may generate incoming audio corresponding to the incoming audio data using one or more speakers associated with the device 110.

Similarly, the device 110 may capture outgoing audio data corresponding to audio received from the user and may send the outgoing audio data to the AP 12, which forwards the outgoing audio data to the server(s) 120b via the network(s) 10. The server(s) 120b may send the outgoing audio data to the AP 12 via the network(s) 10 and the AP 12 may send the outgoing audio data to the adapter 108. After receiving the outgoing audio data, the adapter 108 may send the outgoing audio data to the phone network 20 via the panel 22. The recipient may receive the outgoing audio data from the phone network 20 using a telephone or other device that may be configured to generate audio corresponding to the incoming audio data.

FIG. 13 is a communication diagram conceptually illustrating an example of receiving an incoming call according to embodiments of the present disclosure. As illustrated in FIG. 13, the adapter 108 may receive (1310) a notification of an incoming call from the phone network 20 and may send (1312) the notification of the incoming call to the server(s) 120a (e.g., directly or via the server(s) 120b). The server(s) 120a may generate (1314) output audio data indicating the incoming call and may send (1316) the output audio data to the device 110 so that the device 110 may indicate (1318) the incoming call to the user, for example by outputting audio corresponding to the output audio data. The device 110 may receive (1320) input audio data and may send (1322) the input audio data to the server(s) 120a, which may determine (1324) that the input audio data corresponds to an instruction to answer the incoming call.

While FIG. 13 illustrates the server(s) 120 generating output audio data and receiving input audio data, the disclosure is not limited thereto. Instead, in some examples the server(s) 120a may send a notification of the incoming call to the device 110 and the device 110 may indicate the incoming call to the user using other techniques, such as using a display or the like. Thus, the device 110 may receive an input command instructing the device 110 to answer the incoming call and may send an instruction to answer the incoming call (e.g., answer request) to the server(s) 120a without departing from the disclosure. Additionally or alternatively, the server(s) 120b may send the notification of the incoming call directly to the device 110 without involving the server(s) 120a without departing from the disclosure. For example, the device 110 may be configured to perform text-to-speech processing (e.g., using text-to-speech (TTS) component 350) without requiring the server(s) 120a without departing from the disclosure.

The server(s) 120a may send (1326) an instruction to answer the incoming call to the server(s) 120b and the server(s) 120b may initiate (1328) a communication session between the adapter 108 and the device 110 and may send (1330) the instruction to answer the incoming call to the adapter 108 and the adapter 108 may accept (1332) the incoming call from the phone network 20. Afterwards, the system 100 may conduct a telephone conversation (1334), as discussed in greater detail below with regard to FIGS. 15A-15B.

FIG. 14 is a communication diagram conceptually illustrating an example of initiating an outgoing call according to embodiments of the present disclosure. As illustrated in FIG. 14, the device 110 may receive (1410) audio data and may send (1412) the audio data to the server(s) 120a. The server(s) 120a may determine (1414) that the audio data corresponds to a command to initiate a telephone call using the phone network 20 and may determine (1416) call information, including a number from which to call, a number to which to call and other information associated with the telephone call. For example, the server(s) 120a may perform speech processing on the audio data to determine text and may interpret the text to determine the command to initiate the telephone call. In some examples, the server(s) 120a may determine a phone number to call by identifying a contact name included in the text and identifying a phone number corresponding to the contact name using the user profile.

The server(s) 120a may send (1418) an instruction to initiate the telephone call (e.g., initiation request) to the server(s) 120b, the server(s) 120b may initiate (1420) a communication session between the adapter 108 and the device 110 and may send (1422) the instruction to initiate the telephone call to the adapter 108. However, the disclosure is not limited thereto and in some examples, the server(s) 120a may send the instruction to initiate the telephone call to the device 110 and the device 110 may send the instruction to initiate the call to the adapter 108. Thus, the server(s) 120a may send call information and/or the instruction to the device 110 and the device 110 may initiate the telephone call directly with the adapter 108.

The adapter 108 may obtain (1424) a dial tone and may initiate (1426) the telephone call using a phone number corresponding to the contact. For example, the adapter 108 may generate a series of audio tones corresponding to the phone number. After the adapter 108 initiates the telephone call over the phone network 20, the system 100 may conduct a telephone conversation (1334), as discussed in greater detail below with regard to FIGS. 15A-15B.

In some examples, the system 100 may send data to and receive data from a remote device (e.g., landline telephone associated with a caller) over the phone network 20 using the adapter 108, as illustrated in FIGS. 15A-15B. However, the disclosure is not limited thereto and the system 100 may send data to and receive data from a remote device (e.g., landline telephone, mobile device, computer, etc.) using voice over internet protocol (VoIP) without departing from the disclosure.

FIGS. 15A-15B are communication diagrams conceptually illustrating examples of sending and receiving audio data during a telephone conversation according to embodiments of the present disclosure. As illustrated in FIG. 15A, the device 110 may capture (1510) outgoing audio data using one or more microphones associated with the device 110 and may send (1512) the outgoing audio data directly to the adapter 108. For example, the device 110 may send the outgoing audio data to the adapter 108 via the AP 12 and/or directly using a wireless connection, such as WiFi, Bluetooth or the like. The adapter 108 may receive the outgoing audio data and may send (1514) the outgoing audio data over the phone network 20. The adapter 108 may receive (1516) incoming audio data over the phone network 20 and may send (1518) the incoming audio data to the device 110. For example, the adapter 108 may send the incoming audio data to the device 110 via the AP 12 and/or directly using a wireless connection, such as WiFi, Bluetooth or the like. The device 110 may receive the incoming audio data and may playback (1520) the incoming audio data to generate output audio using one or more speakers associated with the device 110.

As illustrated in FIG. 15A, in some examples the device 110 may directly connect to the adapter 108 using a wireless connection without departing from the disclosure. Thus, when the server(s) 120a sends an instruction to the device 110, the adapter 108 and/or the server(s) 120b to establish a communication session, the instruction may cause the device 110 to connect to the adapter 108 without the server(s) 120b. For example, one of the device 110 and/or the adapter 108 may become an access point (e.g., software enabled access point) and the other device may be instructed to connect to the access point.

As illustrated in FIG. 15B, the device 110 may capture (1510) the outgoing audio data using one or more microphones associated with the device 110. Instead of sending the outgoing audio data to the adapter 108 directly, the device 110 may send (1522) the outgoing audio data to the server(s) 120b and the server(s) 120b may send (1524) the outgoing audio data to the adapter 108. The adapter 108 may receive the outgoing audio data and may send (1514) the outgoing audio data over the phone network 20. The adapter 108 may receive (1516) incoming audio data over the phone network 20 and may send (1526) the incoming audio data to the server(s) 120b. The server(s) 120b may receive the incoming audio data and may send (1528) the incoming audio data to the device 110. The device 110 may receive the incoming audio data and may playback (1520) the incoming audio data to generate output audio using one or more speakers associated with the device 110.

Typically, when an incoming telephone call is received by the home telephone circuit 28, the incoming telephone call is indicated by a first ringing signal that doesn't include caller identification followed by a second ringing signal that includes caller identification. The caller identification is sent via the phone network 20 and may indicate a phone number, a name, and/or additional information associated with a caller, enabling a user to determine whether to accept the incoming telephone call. The adapter 108 may detect the incoming telephone call based on the first ringing signal and/or the second ringing signal and may send a notification of the incoming telephone call to the server(s) 120. However, prior to receiving the second ringing signal, the adapter 108 is unable to provide the caller identification to the server(s) 120. Thus, the system 100 must decide whether to indicate the incoming telephone call to the device(s) 110 at the same time that the first ringing signal is output by the wired telephone 24 and/or the wireless telephone 26, without the caller identification, or whether to indicate the incoming telephone call to the device(s) 110 after the second ringing signal is output by the wired telephone 24 and/or the wireless telephone 26, with the caller identification.

In some examples, the adapter 108 may send a first notification corresponding to the first ringing signal and may send a second notification corresponding to the second ringing signal, the second notification including the caller identification. Thus, the server(s) 120 may indicate that the incoming telephone call is being received based on the first notification and may indicate contact information associated with the caller identification based on the second notification. Additionally or alternatively, the server(s) 120 may begin preparing output data after receiving the first notification, may finalize the output data after receiving the second notification, and then may send the output data to the device(s) 110. Thus, while the device(s) 110 doesn't indicate the incoming telephone call prior to the second ringing signal, by preparing the output data prior to receiving the caller identification, the device(s) 110 may indicate the incoming telephone call at the same time that the second ringing signal is output by the wired telephone 24 and/or the wireless telephone 26.

Figure 16B:
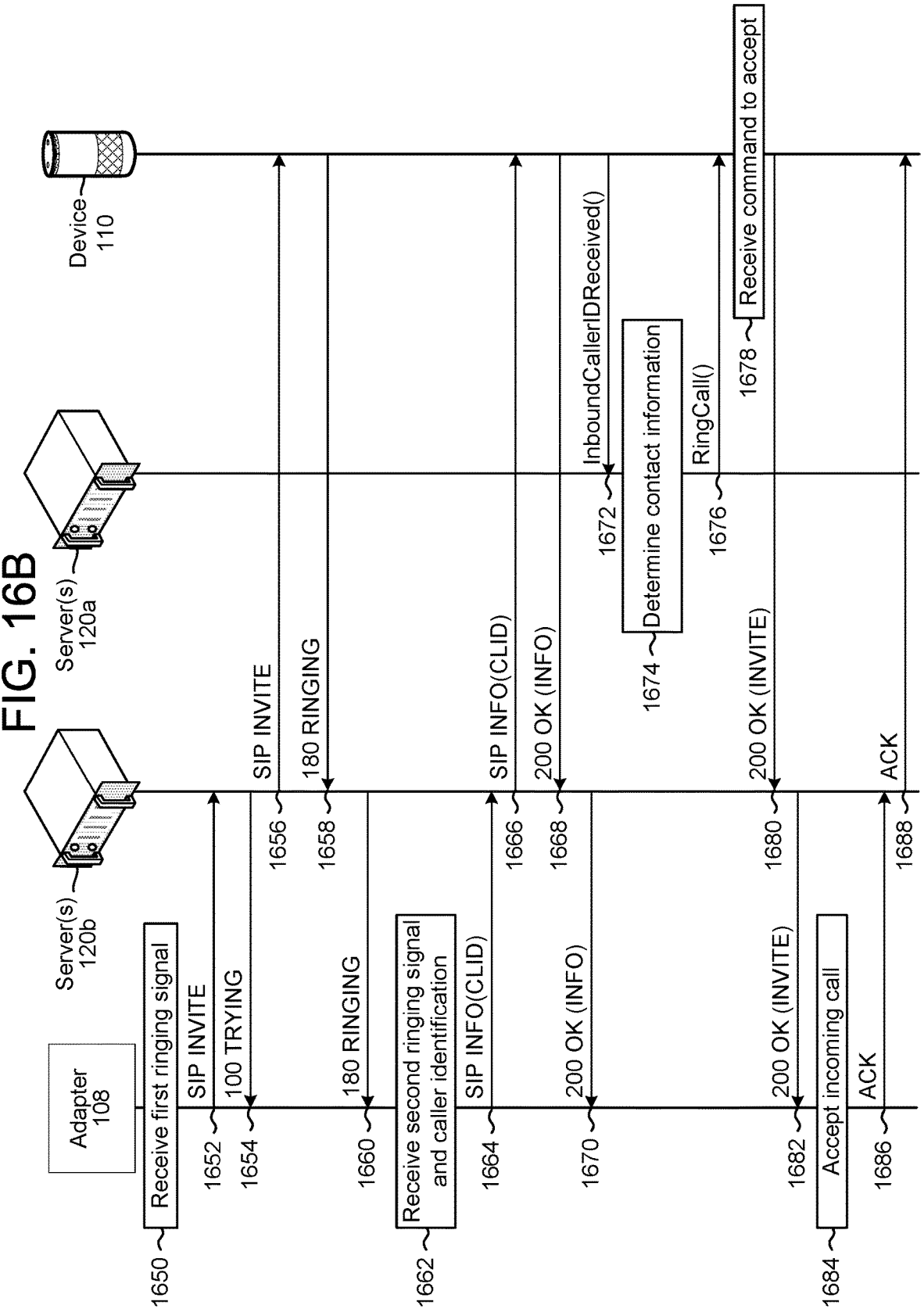

FIGS. 16A-16B are communication diagrams conceptually illustrating examples of receiving delayed caller identification and outputting a notification of an incoming call based on the caller identification according to embodiments of the present disclosure. As illustrated in FIG. 16A, the adapter 108 may receive (1610) a first ringing signal from the phone network 20 and may send (1612) a first notification of an incoming telephone call to the server(s) 120a. While FIG. 16A illustrates the adapter 108 sending the first notification to the server(s) 120a, the disclosure is not limited thereto and the adapter 108 may send the first notification to the server(s) 120b and/or the device 110 without departing from the disclosure. For example, the adapter 108 may send the first notification to the device 110 via the server(s) 120b and the device 110 may send the first notification to the server(s) 120a.

After receiving the first notification, the server(s) 120a may optionally interrupt (1614) a current skill (e.g., application). For example, the server(s) 120a may determine a current dialog state and may store the dialog state, along with any additional information about a current state of the current skill. Thus, after telephone call, the device 110 may return to the current state in the current skill.

Additionally or alternatively, the server(s) 120a may initialize (1616) text-to-speech processing. For example, the server(s) 120 may load a template (e.g., text data) that indicates an incoming telephone call and may perform text-to-speech processing on the template without knowing the caller identification. By initializing the text-to-speech processing prior to receiving the second notification, the server(s) 120a may more quickly generate audio data indicating the incoming telephone call once the caller identification is received.

The adapter 108 may receive (1618) a second ringing signal and caller identification from the phone network 20 and may send (1620) a second notification, which may include the caller identification, to the server(s) 120a. As discussed above, the disclosure is not limited thereto and the adapter 108 may send the second notification to the server(s) 120b and/or the device 110 in addition to or instead of the server(s) 120a without departing from the disclosure.

After receiving the second notification and the caller identification, the server(s) 120a may determine (1622) contact information that corresponds to the caller identification. For example, the caller identification may indicate a phone number, a name, and/or additional information provided by the phone network 20. The server(s) 120 may identify contact information associated with the device 110, an account associated with the device 110, a user profile associated with the device 110, and/or the like. For example, the caller identification may indicate that the incoming telephone call is associated with a name (e.g., John Doe) and a number (e.g., (555)555-5555). The server(s) 120a may compare the name and/or the number to a database of contacts that correspond to a first user profile associated with the device 110, and may determine that first contact information matches the name and/or the number. Thus, the server(s) 120a may associate the caller identification and therefore the incoming call with the first contact information that is associated with the first user profile. The contact information may include a variety of data associated with the caller, such as a name, a number, a relationship to a first user associated with the first user profile, image data representing the caller, recent messages between the caller and the first user profile (e.g., using email, text message, social networking applications, etc.), recent telephone calls between the caller and the first user profile (e.g., date and time), recent and/or upcoming calendar entries indicating meetings between the caller and the first user profile, or the like. Thus, the server(s) 120a may determine (1624) information from social networks, may determine (1626) calendar data (e.g., recent or upcoming meetings) and/or communication data (e.g., previous communications via text, email, social networks or telephone) or the like.

In some examples, the server(s) 120a may determine (1628) if the number is included in a database of numbers. For example, the database of numbers may be unique to the first user profile (e.g., a blocked number list set by the first user) and/or to an account associated with the first user profile (e.g., a blocked number list set by anyone in the first user's family), which may be referred to as a local database. If the phone number is included in the local database, the server(s) 120a may indicate to the first user that the phone number is blocked or the like. Additionally or alternatively, the database of numbers may be a global list indicating telemarketers, political campaigns, robo-calling centers or the like, which may be referred to as a global database. This global list may be compiled based on multiple accounts and/or based on third party sources that monitor call histories and/or receive feedback indicating unwanted telephone calls. If the phone number is included in the global database, the server(s) 120a may indicate to the first user that the phone number is possible spam or the like.

The server(s) 120a may generate (1630) output data indicating the incoming telephone call and may send (1632) the output data to the device 110 and the device 110 may indicate (1634) the incoming call to the first user. The output data may include at least a portion of the caller identification and/or the contact information. For example, the server(s) 120a may generate text data that indicates that an incoming telephone call has been received from a phone number, along with a name of the caller, a relationship between the caller and the first user, relevant information retrieved from social networks, recent communications between the caller and the first user, recent and/or upcoming meetings scheduled between the caller and the first user, and/or the like. In addition, if the phone number is included in the local database or the global database, the text data may indicate that the phone number is blocked, possible spam and/or the like. In some examples, such as when the device 110 includes a display, the server(s) 120*a* may send the text data to the device 110 and the device 110 may indicate the incoming call by displaying the text data on the display. In other examples, such as when the device 110 doesn't include a display, the server(s) 120*a* may generate audio data based on the text data using text-to-speech processing and may send the audio data to the device 110. Thus, instead of or in addition to displaying the text information on the display, the device 110 may generate audio output based on the audio data using loudspeaker(s) 114.

In some examples, the server(s) 120*a* previously initialized the text-to-speech processing using a template and generated a first portion of audio data in step 1616. To promptly alert the first user to the incoming telephone call, the server(s) 120*a* may determine the contact information in step 1622 and then may generate the output audio data by generating a second portion of audio data and combining the first portion and the second portion in step 1630. Thus, a majority of the output audio data is generated prior to the server(s) 120*a* receiving the second notification, enabling the server(s) 120*a* to quickly send the output audio data to the device 110 to indicate the incoming telephone call.

While the disclosure is not limited thereto, FIG. 16B illustrates an example of sending the first notification and the second notification using session initiation protocol (SIP). As illustrated in FIG. 16B, the adapter 108 may receive (1650) a first ringing signal from the phone network 20 and may send (1652) a SIP INVITE message to the server(s) 120*b*. In some examples, the SIP INVITE message may include a join header including additional information about the incoming telephone call. For example, the SIP invite message may include JavaScript Object Notation (JSON), which is a lightweight data-interchange format based on the JavaScript programming language. The server(s) 120*b* may send (1654) a 100 TRYING message back to the adapter 108 and may send (1656) a SIP INVITE message to the device 110. The device 110 may send (1658) a 180 RINGING message to the server(s) 120*b* and the server(s) 120*b* may send (1660) the 180 RINGING message back to the adapter 108.

While not illustrated in FIG. 16B, the device 110 may send a first message (e.g., inboundcallreceived( ) message) to the server(s) 120*a* indicating that the incoming telephone call is being received and the server(s) 120*a* may send a second message (e.g., ringcall( ) message) to the device 110 to indicate the incoming telephone call. To confirm that the device 110 received the second message, the device 110 may send a third message (e.g., inboundcallringing( ) message) to the server(s) 120*a*. Thus, the device 110 may not indicate to the first user (e.g., by displaying text data, image data and/or generating audio output) that the incoming telephone call is being received based on the SIP INVITE message in step 1656, but may need a separate message from the server(s) 120*a* to instruct the device 110 to indicate to the first user that the incoming telephone call is being received.

The adapter 108 may receive (1662) a second ringing signal and caller identification and may send (1664) a SIP INFO(CLID) message to the server(s) 120*b* indicating the caller identification (e.g., CLID). In some examples, the SIP INFO message may include JSON to indicate additional information about the incoming telephone call, such as a first field indicating a display name (e.g., display_name: CNAM from CLID), a second field indicating the caller identification (e.g., caller_id: Phone number from which the call is received), a third field indicating whether the information is associated with the first telephone call or a new incoming second telephone call (e.g., second_call: A Boolean indicating if the INFO is for the ongoing call or for a new incoming telephone call), and/or the like. The server(s) 120*b* may send (1666) the SIP INFO(CLID) message to the device 110. The device 110 may send (1668) a 200 OK (INFO) message back to the server(s) 120*b* and the server(s) 120*b* may send (1670) the 200 OK (INFO) message to the adapter 108.

The device 110 may send (1672) an InboundCallerIDReceive( ) message to the server(s) 120*a* indicating the caller identification received via the SIP INFO(CLID) message. The server(s) 120*a* may determine (1674) contact information based on the caller identification, as discussed above with regard to step 1622, and may send (1676) a RingCall( ) message to the device 110 to instruct the device 110 to indicate to the first user (e.g., by displaying text data, image data and/or generating audio output) that the incoming telephone call is being received. The RingCall( ) message may include at least a portion of the caller identification, contact information and/or additional information determined in steps 1624-1628. Thus, the device 110 may indicate to the first user that the incoming telephone call is being received along with information about the caller.

In some examples, the first user may input a command to accept the incoming telephone call and the device 110 may receive (1678) the command to accept the call. For example, the first user may input the command using a touchscreen, buttons and/or other input devices associated with the device 110 and the device 110 may interpret the command. Additionally or alternatively, the first user may speak a voice command and the device 110 may capture audio data, send the audio data to the server(s) 120*a* and the server(s) 120*a* may send an instruction to the device 110 to accept the incoming telephone call. Thus, while not illustrated in FIG. 16B, the server(s) 120*a* may perform speech processing to determine the command from audio data generated by the device 110. As a result, the system 100 may enable the first user to accept the incoming second telephone call and/or switch between the first telephone call and the second telephone call using voice commands.

After receiving the command to accept the incoming telephone call, the device 110 may send (1680) a 200 OK (INVITE) message to the server(s) 120*b*, which may send (1682) the 200 OK (INVITE) message to the adapter 108. The adapter 108 may accept (1684) the incoming call (e.g., answer the call) and send (1686) an acknowledgement message (e.g., ACK) to the server(s) 120*b*, which may send (1688) the acknowledgement message to the device 110.

In some examples, the server(s) 120*a* may enable additional functionality based on the caller identification and/or contact information. For example, the server(s) 120*a* may store the caller identification and/or contact information and associate the information with a current telephone call. If a user inputs a query requesting information about the telephone call and/or the caller, the server(s) 120*a* may retrieve the caller identification and/or contact information and generate a response providing the requested information.

Additionally or alternatively, the system 100 may enable additional functionality for specific phone numbers based on the caller identification and/or contact information. As a first example, the system 100 may enable drop-in functionality for a first device 110*a*. For example, if the adapter 108 and the first device 110*a* (e.g., smart phone) are associated with a user profile, the system 100 may receive the caller identification (e.g., a phone number) from the phone network 20, may determine that the phone number is associated with the first device 110a and that the first device 110a is permitted to drop-in on other devices 110, and may initiate a communication session between the first device 110a and a second device 110b via the adapter 108. In some examples, the system 100 may send a notification of the incoming telephone call to all devices 110 associated with the adapter 108. However, the disclosure is not limited thereto and the system 100 may identify a specific device (e.g., second device 110b) to which to direct the incoming telephone call without departing from the disclosure. For example, the system 100 may determine that the incoming telephone call is from a first user (e.g., husband), may determine a second device 110b associated with a second user (e.g., wife) and may direct the incoming telephone call to the second device 110b. The system 100 may determine the second device 110b using techniques known to one of skill in the art, including presence detection, recent interactions, computer vision, voice recognition or the like.

FIG. 17 is a flowchart conceptually illustrating an example method for enabling additional functionality by storing caller identification associated with a telephone call according to examples of the present disclosure. As illustrated in FIG. 17, the server(s) 120a may store (1710) caller identification and/or contact information after the caller identification is received from the adapter 108. For ease of illustration, FIG. 17 and the corresponding description will refer to storing and retrieving the caller identification. However, the disclosure is not limited thereto and any reference to the caller identification may refer to the contact information without departing from the disclosure.

The server(s) 120a may optionally receive (1712) a command to accept the telephone call, may send (1714) an instruction to accept the telephone call and may send (1716) an instruction to forward audio data between the adapter 108 and the device 110. For example, the device 110 may send audio data representing a voice command and the server(s) 120a may perform speech processing to determine that the voice command instructs the device 110 to accept the telephone call. Therefore, the server(s) 120a may send the instruction to accept the telephone call to the device 110 and/or the adapter 108. If the server(s) 120a sends the instruction to the device 110, the device 110 may accept the call by sending a message (e.g., a 200 OK (INVITE) message) to the adapter 108 via the server(s) 120b and the adapter 108 may accept the call (e.g., go off hook). If the server(s) 120a sends the instruction to the adapter 108, the adapter 108 may accept the call (e.g., go off hook) and initiate a communication session with the device 110 to forward the audio data between the device 110 and the phone network 20.

While FIG. 17 illustrates the server(s) 120a receiving the command and sending the instructions, the disclosure is not limited thereto. Instead, the device 110 may receive the command (e.g., using input devices) and send a message to the adapter 108 to accept the telephone call without departing from the disclosure. Additionally or alternatively, the wired telephone 24 and/or the wireless telephone 26 may accept the incoming telephone call by going off hook. In this example, the adapter 108 may send a notification to the server(s) 120a indicating that the phone network 20 is currently busy (e.g., ongoing telephone call) and the server(s) 120a may associate the caller identification with the ongoing telephone call.

The server(s) 120a may receive (1718) a query requesting information about the telephone call from a device. For example, if a first device 110a is participating in the ongoing telephone call, the server(s) 120a may receive the query from a second device 110b. Additionally or alternatively, if the wired telephone 24 and/or the wireless telephone 26 are participating in the ongoing telephone call, the server(s) 120a may receive the query from the first device 110a.

The server(s) 120a may determine a command (1720) associated with the query, may retrieve (1722) the caller identification (and/or the contact information), may determine (1724) a response to the query based on the caller identification, may generate (1726) output data (e.g., text data and/or audio data) based on the response and may send (1728) the output data to the device. For example, the query may correspond to "Who is on the other line" or "Who is calling," the server(s) 120a may determine that the query corresponds to a command to send an indication including at least a portion of the caller identification to the device 110 and the output data may correspond to text data and/or audio data (e.g., "John Doe is calling from (555)555-5555").

While the above example illustrates a specific request as a potential query, the disclosure is not limited thereto. Instead, the query may correspond to a variety of requests that the server(s) 120a may answer based on the caller identification and/or associated information without departing from the disclosure. For example, the query may correspond to "What is the duration of the telephone call?" and the server(s) 120a may identify a first time when the caller identification was stored, determine a current time, and indicate a duration of time between the first time and the current time that is associated with the ongoing telephone call. Similarly, the query may correspond to "Has anyone called during the telephone call?" and the server(s) 120a may determine if any additional caller identification was stored since a beginning of the current telephone call. Additionally or alternatively, the query may correspond to requests for more information about the caller, such as "What is the relationship between John and the first user," "When did the first user last speak with John," "What was the last communication between John and the first user," or the like. In some examples, the first user participating in the ongoing telephone call may input the query (e.g., "What is the relationship between John and myself," "When did I last speak with John," What was the last communication between John and myself," or the like) without departing from the disclosure.

During an ongoing telephone call, the adapter 108 enables an additional device to join the telephone call. For example, using SIP messaging, an additional device 110 may send a SIP INVITE (Join) message to the adapter 108, the adapter 108 may send a TRYING message and a 200 OK message to the device 110, and the device 110 may send an acknowledgment message (e.g., ACK) back to the adapter 108. After joining the additional device 110 to the current telephone call, the adapter 108 may perform audio mixing to combine audio data from one or more devices and output the combined audio data over the phone network 20. However, the disclosure is not limited thereto and in some examples, the server(s) 120a and/or the server(s) 120b may perform audio mixing to combine audio data from one or more devices and may send the combined audio data to the adapter 108 to output over the phone network 20. Additionally or alternatively, the server(s) 120a and/or the server(s) 120b may perform first audio mixing to combine audio data from one or more devices and may send first combined audio data to the adapter 108, the adapter 108 may perform second audio mixing to combine the first combined audio data with additional audio data from one or more devices to generate second combined audio data, and may output the second combined audio data over the phone network 20.

Figure 18:
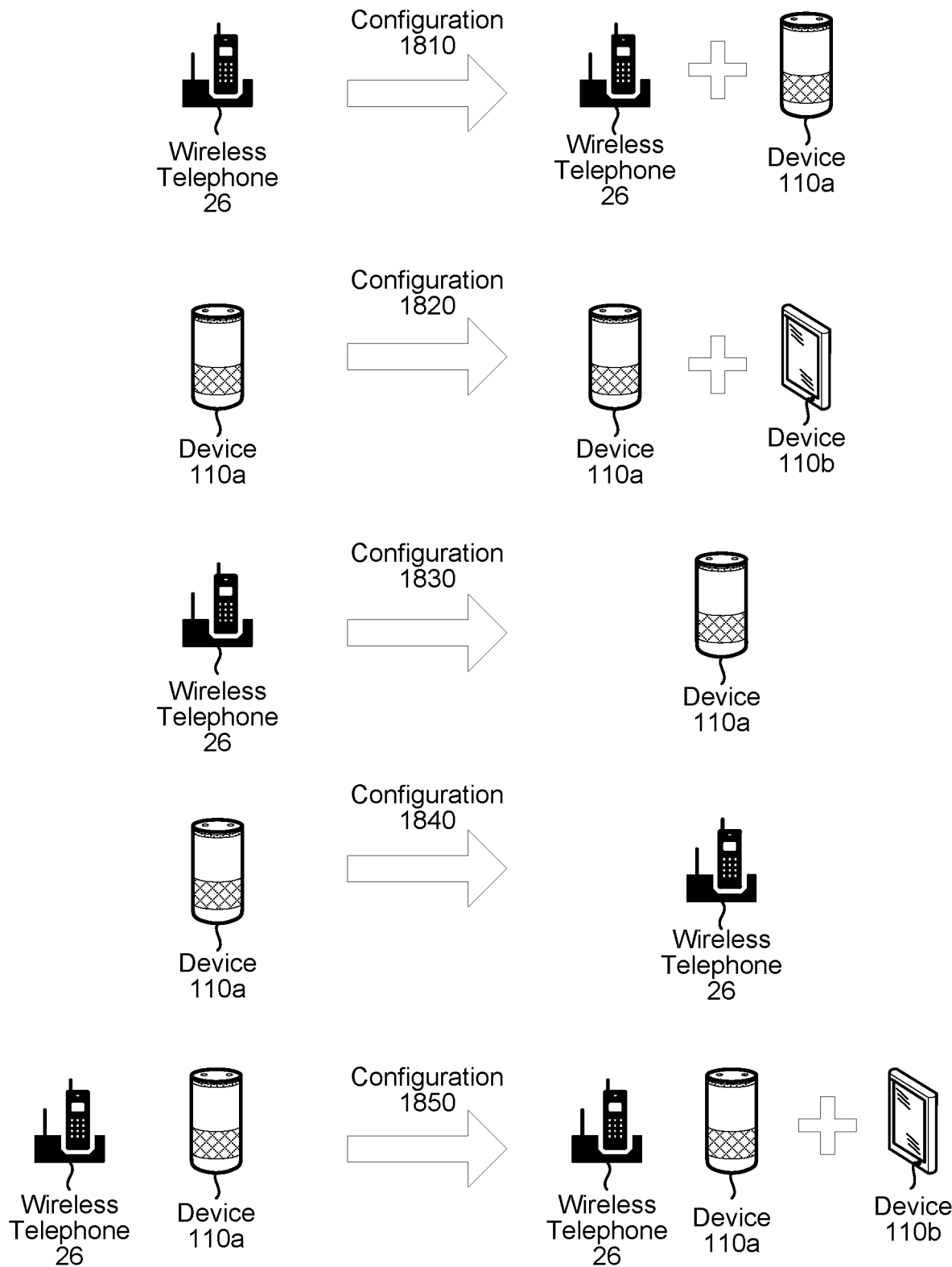
FIG. 18 illustrates examples of additional devices joining an ongoing telephone call using the adapter according to examples of the present disclosure.

FIG. 18 illustrates examples of additional devices joining an ongoing telephone call using the adapter according to examples of the present disclosure. As illustrated by a first configuration 1810 in FIG. 18, an analog telephone (e.g., wireless telephone 26) may be participating in the telephone call and the adapter 108 may join a first device 110*a* (e.g., a digital device that generates digital audio data) to the telephone call. In the first configuration 1810, the adapter 108 may perform audio mixing to combine first audio data (e.g., analog audio data) from the wireless telephone 26 and second audio data (e.g., digital audio data) from the first device 110*a*. However, the disclosure is not limited thereto and the wireless telephone 26 may be directly connected to the phone network 20 instead of connected to the phone network 20 via the adapter 108. Thus, the adapter 108 may output the second audio data to the phone network 20 without mixing the first audio data and the second audio data.

As illustrated by a second configuration 1820 in FIG. 18, a first device 110*a* (e.g., a digital device that generates digital audio data) may be participating in the telephone call and the adapter 108 may join a second device 110*b* (e.g., a digital device that generates digital audio data) to the telephone call. In the second configuration 1820, the adapter 108 may perform audio mixing to combine second audio data (e.g., digital audio data) from the first device 110*a* and third audio data (e.g., digital audio data) from the second device 110*b*. However, the disclosure is not limited thereto and the server(s) 120*a* and/or the server(s) 120*b* may perform audio mixing to combine the second audio data and the third audio data. Thus, the adapter 108 may receive the combined audio data and output the combined audio data to the phone network 20 without mixing the second audio data and the third audio data.

While not illustrated in FIG. 18, the first device 110*a* may initially connect to the adapter 108 directly. For example, the first device 110*a* may detect that the adapter 108 is available and may initiate a direct connection to the adapter 108, enabling the first device 110*a* to initiate a telephone call using the adapter 108. However, the disclosure is not limited thereto, and in other examples the first device 110*a* may connect to the adapter 108 indirectly via the server(s) 120*a*/120*b*. For example, the first device 110*a* may send a command to the server(s) 120*a* to initiate a telephone call and the server(s) 1120*a* may send instructions to the adapter 108 and/or the first device 110*a* to establish a direct connection between the adapter 108 and the first device 110*a*.

As illustrated by a third configuration 1830 in FIG. 18, an analog telephone (e.g., wireless telephone 26) may be participating in the telephone call and the adapter 108 may join a first device 110*a* to the telephone call prior to the analog telephone disconnecting (e.g., hanging up). Thus, the telephone call continues but moves from the wireless telephone 26 to the first device 110*a*. For example, a first user may move between rooms and/or prefer using the first device 110*a*. Additionally or alternatively, the first user associated with the wireless telephone 26 may pass the telephone call off to a second user associated with the first device 110*a*. In the third configuration 1830, the adapter 108 joins the first device 110*a* to the telephone call and may perform audio mixing for a short time before the wireless telephone 26 disconnects (e.g., hangs up).

As illustrated by a fourth configuration 1840 in FIG. 18, a first device 110*a* may be participating in the telephone call, the wireless telephone 26 may join the telephone call using an analog process (e.g., by connecting to the phone network, such as taking the wireless telephone 26 off hook) and the adapter 108 may disconnect the first device 110*a* from the telephone call (e.g., by ending a communication session between the adapter 108 and the first device 110*a*). Thus, the telephone call continues but moves from the first device 110*a* to the wireless telephone 26. For example, a first user may move between rooms and/or prefer using the wireless telephone 26. Additionally or alternatively, the first user associated with the first device 110*a* may pass the telephone call off to a second user associated with the wireless telephone 26.

While configurations 1810-1840 illustrate up to two devices (e.g., device(s) 110 and/or wireless telephone 26) participating in a telephone call, the disclosure is not limited thereto and a number of devices may join the telephone call. For example, a plurality of analog telephones may join the call using an analog process (e.g., taking the analog telephone off hook) and a plurality of digital devices 110 may join the call using the adapter 108. A fifth configuration 1850 illustrates the wireless telephone 26 and the first device 110*a* participating in the telephone call and the adapter 108 joining a second device 110*b* to the telephone call. In the fifth configuration 1850, the adapter 108 may perform audio mixing to combine first audio data (e.g., analog audio data) from the wireless telephone 26 (if the wireless telephone 26 is connected in series with the adapter 108, instead of in parallel), second audio data (e.g., digital audio data) from the first device 110*a*, and/or third audio data (e.g., digital audio data) from the second device 110*b*. However, the disclosure is not limited thereto and the server(s) 120*a* and/or the server(s) 120*b* may perform audio mixing to combine the second audio data and the third audio data. Thus, the adapter 108 may receive the combined audio data and output the combined audio data to the phone network 20 without mixing the second audio data and the third audio data.

As discussed above, a plurality of devices 110 may join the telephone call using the adapter 108. However, the adapter 108 may be capable of performing audio mixing for only a limited number of devices 110 (e.g., 2-5 devices 110 at a time). Thus, when the adapter 108 is at maximum capacity (e.g., performing audio mixing for 2-5 devices 110), additional devices 110 are unable to join the telephone call using the adapter 108. In some examples, upon receiving a request from an additional device to join the telephone call, the system 100 may send a notification to the additional device indicating that the adapter 108 is at maximum capacity and preventing the additional device from joining the telephone call. For example, the additional device may display an error code indicating that the adapter 108 has reached a maximum number of endpoints for the telephone call. However, the disclosure is not limited thereto, and in other examples the system 100 may enable additional devices 110 to join the telephone call even when the adapter 108 is at maximum capacity by shifting at least a portion of the audio mixing from the adapter 108 to the server(s) 120*a* and/or the server(s) 120*b*.

To illustrate an example, if the adapter 108 is only capable of combining two digital audio streams (e.g., first audio data associated with a first device 110*a* and second audio data associated with a second device 110*b*) and a third device 110*c* wants to join the telephone call, the system 100 may perform first audio mixing using the server(s) 120*b* and second audio mixing using the adapter 108. For example, the server(s) 120*b* may combine the second audio data and third audio data associated with the third device 110*c* to generate first combined audio data and may send the first combined audio data to the adapter 108. The adapter may combine the first combined audio data and the first audio data to generate second combined audio data, which corresponds to a combination of the first audio data, the second audio data and the third audio data. Additionally or alternatively, the server(s) 120*b* may combine the first audio data, the second audio data and the third audio data to generate combined audio data, which may be sent to the adapter 108 to be output using the phone network 20 without additional audio mixing. Thus, the server(s) 120*b* enable the devices 110*a*-110*c* to participate in the telephone call even though it exceeds the adapter 108's maximum capacity.

Figure 19A:
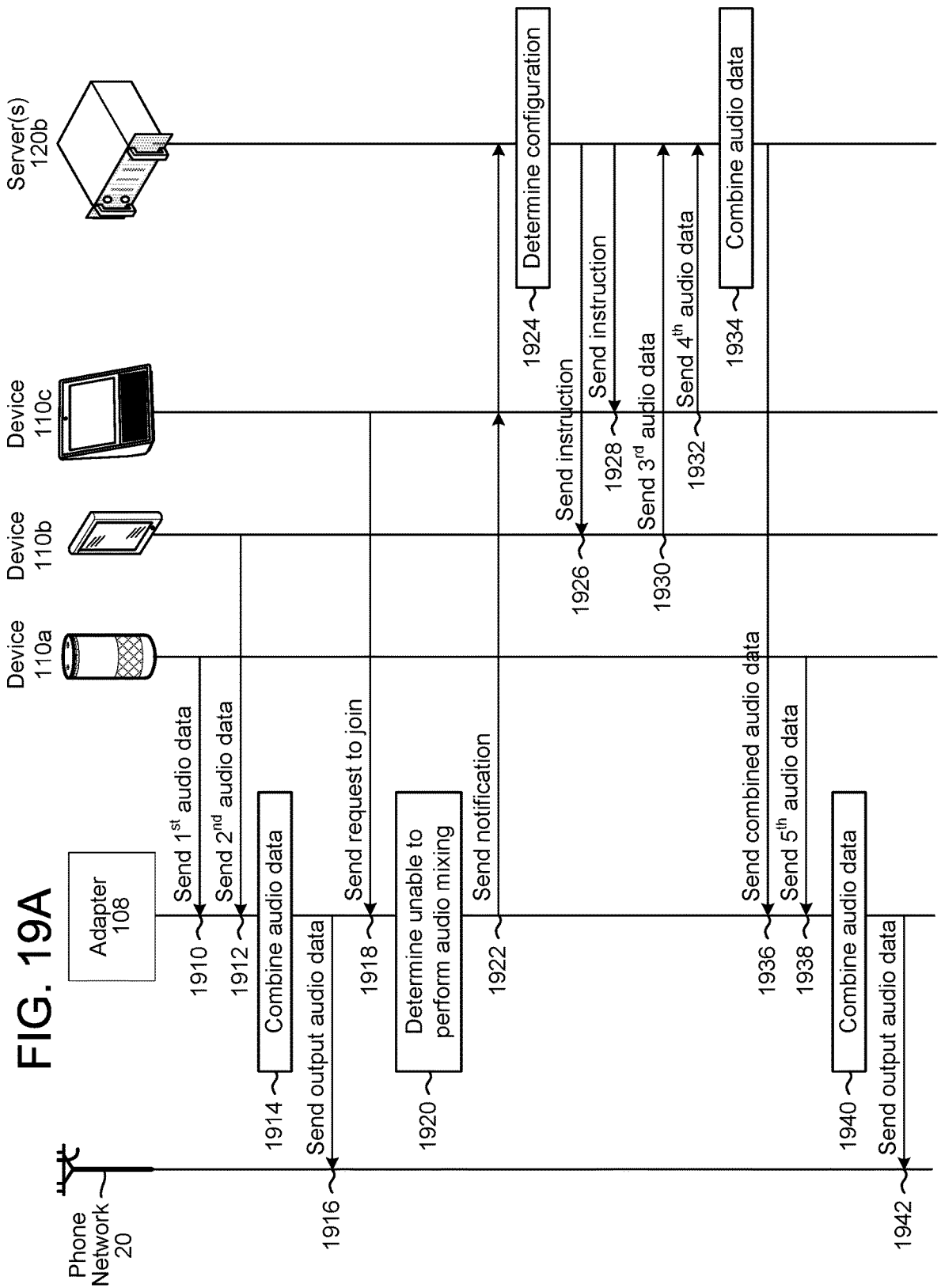

FIGS. 19A-19B are communication diagrams conceptually illustrating examples of shifting audio mixing from an adapter to a remote server when a number of devices exceed a maximum value according to embodiments of the present disclosure. As illustrated in FIG. 19A, the first device 110*a* may send (1910) first audio data to the adapter 108 and the second device 110*b* may send (1912) second audio data to the adapter 108. The adapter 108 may combine (1914) the first audio data and the second audio data to generate first output audio data, and the adapter 108 may send (1916) the first output audio data to the phone network 20.

The third device 110*c* may send (1918) a request to join the telephone call and the adapter 108 may determine (1920) that the adapter 108 is unable to perform audio mixing for the third device 110*c*. Thus, the adapter 108 may send (1922) a notification to the third device 110*c* and/or the server(s) 120*b* indicating that the adapter 108 is unable to perform additional audio mixing.

In some examples, the system 100 may use SIP messages to join the third device 110*c* to the existing telephone call. For example, the third device 110*c* may send a SIP INVITE message to the adapter 108 indicating that the third device 110*c* would like to join the telephone call, and the adapter 108 may send a 100 TRYING and/or 200 OK message back to the third device 110*c*. If the adapter 108 successfully joins the third device 110*c* to the existing telephone call, the adapter 108 may send an acknowledge message (e.g., ACK) to the third device 110*c* to indicate that the third device 110*c* is part of the ongoing telephone call.

The server(s) 120*b* may determine (1924) a configuration that will enable the third device 110*c* to join the telephone call. For example, if the second device 110*b* sends the second audio data to the server(s) 120*b* and the server(s) 120*b* mixes the second audio data with audio data from the third device 110*c*, the adapter 108 is capable of mixing the combined audio data with the first audio data. Therefore, the server(s) 120*b* may send (1926) a first instruction to the second device 110*b* to send audio data to the server(s) 120*b*, and may send (1928) a second instruction to the third device 110*c* to send audio data to the server(s) 120*b*.

The second device 110*b* may send (1930) third audio data to the server(s) 120*b* and the third device 110*c* may send (1932) fourth audio data to the server(s) 120*b*. The server(s) 120*b* may combine (1934) the third audio data and the fourth audio data to generate combined audio data and may send (1936) the combined audio data to the adapter 108. The first device 110*a* may send (1938) fifth audio data to the adapter 108, and the adapter 108 may combine (1940) the combined audio data and the fifth audio data to generate second output audio data and may send (1942) the second output audio data to the phone network 20. Thus, audio data from each of the devices 110*a*-110*c* may be sent to the phone network 20.

While FIG. 19A illustrates the three devices 110*a*-110*c* being digital devices, the disclosure is not limited thereto and one or more of the devices 110*a*-110*c* may be analog telephones without departing from the disclosure. Additionally or alternatively, while FIG. 19A illustrates the server(s) 120*b* mixing audio data from the second device 110*b* and the third device 110*c* and the adapter 108 mixing the combined audio data with audio data from the first device 110*a*, the disclosure is not limited thereto. Instead, the first device 110*a* may send the fifth audio data to the server(s) 120*b* and the server(s) 120*b* may generate the combined audio data using the third audio data, the fourth audio data and the fifth audio data without departing from the disclosure. Using the server(s) 120*b*, a large number of devices 110 that far exceeds the maximum capacity of the adapter 108 may join the telephone call.

While FIG. 19A illustrates the second device 110*b* and the third device 110*c* sending audio data directly to the server(s) 120*b*, the disclosure is not limited thereto. Instead, the second device 110*b* and the third device 110*c* may send audio data to the server(s) 120*b* via the adapter 108. For example, while the adapter 108 may not be capable of performing audio mixing past a maximum capacity, the adapter 108 may be capable of sending the audio data to the server(s) 120*b* for audio mixing, as illustrated in FIG. 19B.

As illustrated in FIG. 19B, the first device 110*a* may send (1910) first audio data to the adapter 108 and the second device 110*b* may send (1912) second audio data to the adapter 108. The adapter 108 may combine (1914) the first audio data and the second audio data to generate first output audio data, and the adapter 108 may send (1916) the first output audio data to the phone network 20.

The third device 110*c* may send (1918) a request to join the telephone call and the adapter 108 may determine (1920) that the adapter 108 is unable to perform audio mixing for the third device 110*c*. Thus, the adapter 108 may send (1950) a notification to the server(s) 120*b* indicating that the adapter 108 is unable to perform additional audio mixing. To avoid disrupting existing connections between the devices 110*a*-110*c* and the adapter 108, the adapter 108 may instead forward audio data to the server(s) 120*b* for audio mixing.

Thus, the second device 110*b* may send (1952) third audio data to the adapter 108 and the adapter 108 may send (1954) the third audio data to the server(s) 120*b*. The third device 110*c* may send (1956) fourth audio data to the adapter 108 and the adapter 108 may send (1958) the fourth audio data to the server(s) 120*b*. The server(s) 120*b* may combine (1960) the third audio data and the fourth audio data to generate combined audio data and may send (1962) the combined audio data to the adapter 108.

In some examples, the first device 110*a* may send (1964) fifth audio data to the adapter 108, and the adapter 108 may combine (1966) the combined audio data and the fifth audio data to generate second output audio data and may send (1968) the second output audio data to the phone network 20. While FIG. 19B illustrates the server(s) 120*b* mixing audio data from the second device 110*b* and the third device 110*c* and the adapter 108 mixing the combined audio data with audio data from the first device 110*a*, the disclosure is not limited thereto. Instead, the first device 110*a* may send the fifth audio data to the server(s) 120*b* and the server(s) 120*b* may generate the combined audio data using the third audio data, the fourth audio data, and the fifth audio data without departing from the disclosure. Additionally or alternatively, while FIG. 19A illustrates the three devices 110*a*-110*c* being digital devices, the disclosure is not limited thereto and one or more of the devices 110*a*-110*c* may be analog telephones without departing from the disclosure.

Using the server(s) 120*b*, a large number of devices 110 that far exceeds the maximum capacity of the adapter 108 may join the telephone call.

During an ongoing telephone call, the phone network 20 may be currently in use by a first user. For example, the first user may be engaged in a first telephone call using the phone network 20 via the wired telephone 24, the wireless telephone 26 and/or any device 110 connected to the adapter 108. In some examples, an incoming second telephone call may be received via the phone network 20 during the first telephone call. If the phone network 20 is configured to enable call waiting, the first user may detect an audible tone indicating the existence of the incoming second telephone call. The first user may choose to answer the second telephone call, in which case the first user may switch between the first telephone call and the second telephone call, or the first user may choose to ignore the second telephone call. To ensure that important telephone calls are received and/or intended recipients are notified of incoming telephone calls, the system 100 may determine that the incoming second telephone call is directed to a second user and may send a message to the second user indicating the incoming second telephone call.

FIGS. 20A-20B are communication diagrams conceptually illustrating examples of sending notifications of an incoming telephone call during an existing telephone call according to embodiments of the present disclosure. As illustrated in FIG. 20A, the phone network 20, the adapter 108, and/or the first device 110*a* may send (2010) audio data during an ongoing first telephone call. For example, audio data generated by the device 110*a* may be sent to the phone network 20 via the adapter 108 and second audio data generated by a remote telephone device may be sent to the first device 110*a* from the phone network 20 via the adapter 108. While FIG. 20A illustrates a first user participating in the first telephone conversation using the first device 110*a*, the disclosure is not limited thereto and the first user may use an analog telephone (e.g., wired telephone 24 and/or wireless telephone 26) without departing from the disclosure.

During the first telephone conversation, the adapter 108 may send (2012) audio data and/or first caller identification associated with the first telephone conversation to the server(s) 120*a* and the server(s) 120*a* may determine (2014) a first user profile associated with the first user. For example, the server(s) 120*a* may perform voice recognition on the audio data and may identify the first user profile based on the voice recognition. Additionally or alternatively, the server(s) 120*a* may identify that the first caller identification is associated with the first user profile (and not other user profiles associated with the first device 110*a*). However, the disclosure is not limited thereto and the server(s) 120*a* may determine the first user profile using any techniques known to one of skill in the art without departing from the disclosure.

While FIG. 20A illustrates the adapter 108 sending the audio data and/or the first caller identification to the server(s) 120*a*, the disclosure is not limited thereto and the first device 110*a* may send the audio data and/or the first caller identification to the server(s) 120*a* without departing from the disclosure.

The phone network 20 may send (2016) a ringing signal and second caller identification to the adapter 108 and the adapter 108 may send (2018) a notification of an incoming second telephone call that includes the second caller identification to the server(s) 120*a*. However, the disclosure is not limited thereto and the adapter 108 may send the notification of the incoming second telephone call the server(s) 120*a* via the first device 110*a* without departing from the disclosure.

The server(s) 120*a* may determine (2020) contact information corresponding to the second caller identification, determine (2022) that the contact information is associated with a second user profile (e.g., second user), determine (2024) a second device 110*b* associated with the second user profile, generate (2026) output data indicating the incoming second telephone call, and send (2028) the output data to the second device 110*b*. The second device 110*b* may indicate (2030) the incoming second telephone call by displaying text data on a display and/or generating audio based on the output data received from the server(s) 120*a*. Thus, the system 100 may alert the second user that the second incoming telephone call is being received via the phone network 20.

The system 100 may enable the second device 110*b* to accept the incoming second telephone call. For example, the second device 110*b* may send a command and/or audio data including a voice command to the server(s) 120*a* and the server(s) 120*a* may interpret the command/voice command as an instruction to accept the second telephone call. In some examples, the system 100 may join the second device 110*b* to the ongoing telephone call (e.g., the first device 110*a* and the second device 110*b* are connected to the adapter 108) and send an instruction to the adapter 108 to switch to the second telephone call. However, the disclosure is not limited thereto and in other examples, the system 100 may join the second device 110*b* to the ongoing telephone call and disconnect the first device 110*a* (e.g., only the second device 110*b* is connected to the adapter 108) and send the instruction to the adapter 108 to switch to the second telephone call.

While FIG. 20A illustrates the system 100 sending a notification to the second user (e.g., to the second device associated with the second user profile), the system 100 may instead determine that the caller is important and/or that the second user has higher priority than the first user and may interrupt the first telephone call to announce the incoming second telephone call. As illustrated in FIG. 20B, the system 100 may repeat steps 2010-2020, enabling the server(s) 120*a* to determine contact information.

The server(s) 120*a* may optionally perform step 2022 to determine that the contact information is associated with the second user profile and may optionally determine (2050) that the second user profile has priority over the first user profile. For example, the second user profile may correspond to a parent, whereas the first user profile may correspond to a child. Thus, if the incoming second telephone call is intended for the parent while the child is participating in the first telephone call, the system 100 may interrupt the first telephone call to announce the incoming second telephone call.

Additionally or alternatively, the server(s) 120*a* may optionally determine (2052) that the contact information is associated with a priority list and may determine to interrupt the first telephone call to announce the incoming second telephone call. For example, the contact information may be a parent or close family member calling and the system 100 may ensure that important contacts that are included in the priority list are announced as the telephone call is received.

The server(s) 120*a* may generate (2054) text data indicating the incoming telephone call, may generate (2056) audio data corresponding to the text data, and may send (2058) the audio data to the first device 110*a*. The first device 110*a* may output (2060) the audio data to the first user, announcing that the incoming second telephone call is being received as well as additional information about the caller. While FIG. 20B illustrates the first device 110*a* participating in the first telephone call and outputting the audio data, the disclosure is not limited thereto and an analog telephone (e.g., wireless telephone 26) may participate in the telephone call without departing from the disclosure. In this case, the server(s) 120*a* may send the audio data to the adapter 108 and the adapter 108 may output the audio data to the wireless telephone 26 (if possible) and/or the phone network 20 without departing from the disclosure.

While FIGS. 19A-20B illustrate telephone calls including the first device 110*a* (e.g., a speech-enabled device), the disclosure is not limited thereto. Instead, the system 100 may perform the same steps illustrated in FIGS. 19A-20B using an analog telephone (e.g., wired telephone 24 and/or wireless telephone 26) in place of the first device 110*a* without departing from the disclosure. Thus, the adapter 108 may perform audio mixing including analog audio data received from the analog telephone and/or may output audio data indicating the incoming telephone call using the analog telephone.

If the analog telephone is directly connected to the adapter 108 (e.g., connected in series, with the adapter 108 between the analog telephone and the phone network 20), the system 100 may output the output audio data to the first user separately from the first telephone call. For example, the system 100 may indicate the incoming telephone call and/or contact information about the incoming telephone call only to the first user, similar to how the analog telephone outputs an audible signal indicating call waiting. However, if the analog telephone is not directly connected to the adapter 108 (e.g., connected in parallel, such as both the analog telephone and the adapter 108 connected to the home telephone circuit 28), the system 100 may indicate the incoming telephone call and/or the contact information as part of the first telephone call (e.g., to the first user and a caller on the other end of the first telephone call).

If the system 100 receives a command to accept the incoming telephone call, the system 100 may enable the first user to switch between the first telephone call and the second telephone call over a period of time. For example, the first user may tell a first caller during the first telephone call that they will be right back, switch to the second telephone call and speak with a second caller for a period of time, and then switch back to the first telephone call. The disclosure is not limited thereto, however, and the first user may switch between the first telephone call and the second telephone call as many times as desired without departing from the disclosure.

In some examples, the system 100 may enable the first user to switch between the first telephone call and the second telephone call for an extended period of time. The system 100 may optionally send notifications, including audio notifications (e.g., intermittent beeps or other audio signals) and/or textual notifications (e.g., displaying text on a display and/or sending text to the first device 110*a* and/or the second device 110*b*), to indicate to the first user that both telephone calls are still active (e.g., first/second telephone call is waiting on the line). For example, the system 100 may periodically receive an audible signal from the phone network 20 indicating that both telephone calls are active and may continue to send notifications to the first user. In some examples, the system 100 may receive the audible signal at a first frequency and may send the notifications at the first frequency, such that the system 100 sends a notification corresponding to each audible signal. However, the disclosure is not limited thereto, and in other examples the system 100 may send the notifications at a second frequency without departing from the disclosure. For example, the system 100 may determine the second frequency based on user preferences or other system settings and may adjust the second frequency based on user feedback and/or to improve user satisfaction.

In some examples, the system 100 may use session initiation protocol (SIP) messages, such as those described above with regard to FIG. 16B, in order to switch between the first telephone call and the second telephone call. For example, the system 100 may send a SIP INFO message and/or SIP INFO response(s) (e.g., 200 OK(INFO), 200 OK (INVITE), and/or the like) to indicate to the adapter 108 to switch between the telephone calls. The server(s) 120*a* may determine to switch between the telephone calls based on commands received from the device 110, such as voice commands. Thus, the system 100 may enable the first user to switch between the first telephone call and the second telephone call using voice commands.

Figure 21B:
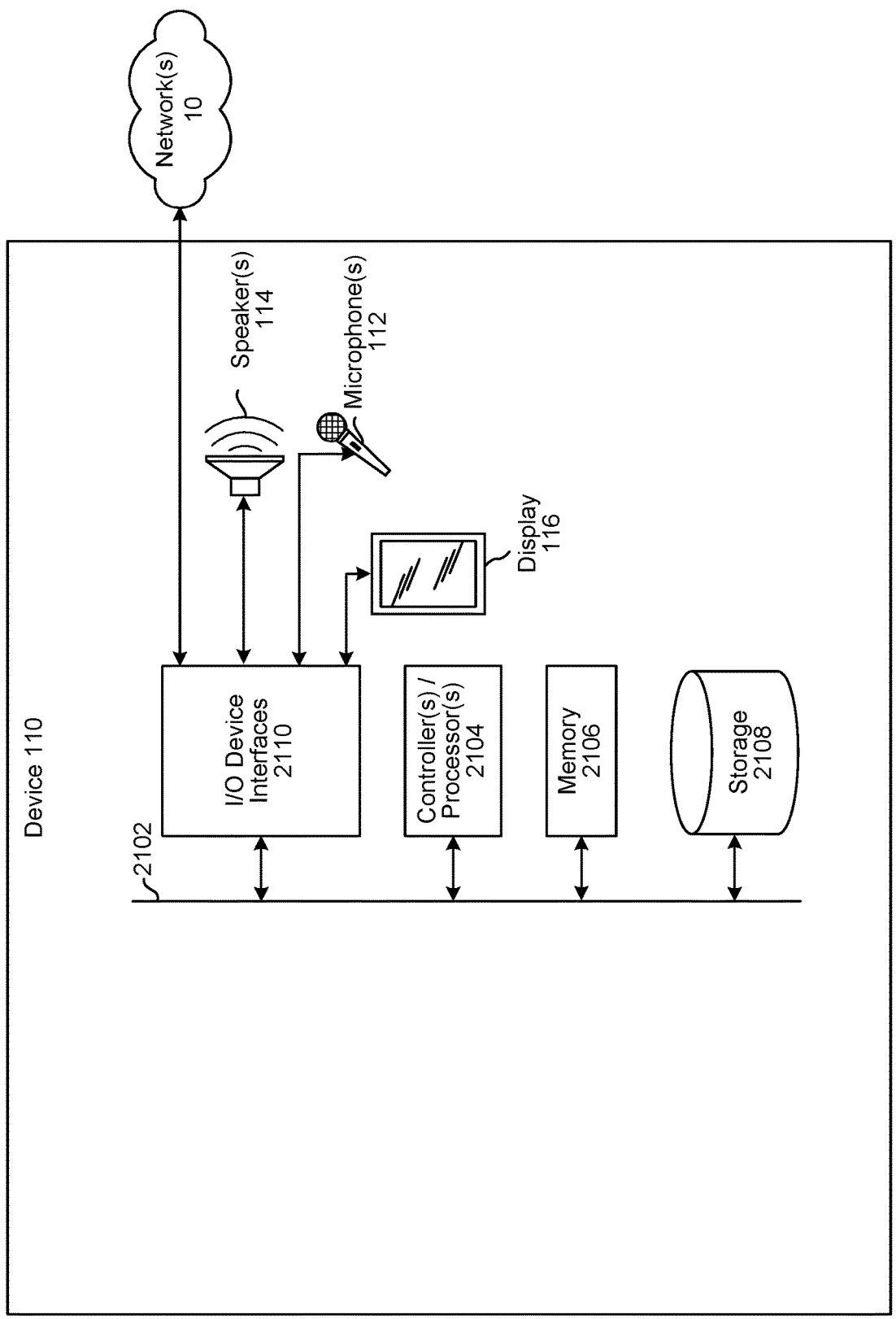

FIG. 21A is a block diagram conceptually illustrating an adapter 108 that may be used with the described system 100. FIG. 21B is a block diagram conceptually illustrating a device 110 that may be used with the described system 100. FIG. 21C is a block diagram conceptually illustrating example components of a remote device, such as remote server(s) 120*a* that may assist with Automatic Speech Recognition (ASR), Natural Language Understanding (NLU) processing, command processing, generating and storing progress data and/or generating synthesized speech. Multiple such server(s) 120*a* may be included in the system 100, such as one or more server(s) 120*a* for ASR, one or more server(s) 120*a* for NLU, etc. FIG. 21D is a block diagram conceptually illustrating example components of a remote device, such as remote server(s) 120*b* that may assist with communication. Multiple such server(s) 120*b* may be included in the system 100.

In operation, the system 100 may include computer-readable and computer-executable instructions that reside on the adapter 108, device 110, server(s) 120*a* and/or server(s) 120*b*, as will be discussed further below. The device 110 may be an electronic device capable of receiving voice commands, generating synthesized speech, receiving audio/video content, generating audio output and/or generating video output. Examples of electronic devices may include computers (e.g., a desktop, a laptop, a server or the like), portable devices (e.g., a smart phone, tablet or the like), media devices (e.g., televisions, video game consoles, media components or the like) or the like. The device 110/server(s) 120*a*/server(s) 120*b* may also be a component of any of the abovementioned devices or systems. The adapter 108 may be a device connected to the phone network 20 via a wired connection and may be connected to the network(s) 10 via a wired and/or wireless connection. Thus, the adapter 108 may send and receive audio data via the phone network 20 and may send and receive any data (e.g., data, audio data, video data, etc.) via the network(s) 10.

As illustrated in FIGS. 21A-21D, the adapter 108/device 110/server(s) 120*a*/server(s) 120*b* may include an address/data bus 2102 for conveying data among components of the adapter 108/device 110/server(s) 120*a*/server(s) 120*b*. Each component within the adapter 108/device 110/server(s) 120*a*/server(s) 120*b* may also be directly connected to other components in addition to (or instead of) being connected to other components across the bus 2102.

The adapter 108/device 110/server(s) 120*a*/server(s) 120*b* may include one or more controllers/processors 2104, that may each include a central processing unit (CPU) for processing data and computer-readable instructions, and a memory 2106 for storing data and instructions. The memory 2106 may include volatile random access memory (RAM), non-volatile read only memory (ROM), non-volatile magnetoresistive (MRAM) and/or other types of memory. The adapter 108/device 110/server(s) 120a/server(s) 120b may also include a data storage component 2108, for storing data and controller/processor-executable instructions (e.g., instructions to perform the algorithm illustrated in FIGS. 1A-1C, 13, 14, 15A-15B, 16A-16B, 17, 18A-18B, 19A-19B and/or 20A-20B). The data storage component 2108 may include one or more non-volatile storage types such as magnetic storage, optical storage, solid-state storage, etc. The adapter 108/device 110/server(s) 120a/server(s) 120b may also be connected to removable or external non-volatile memory and/or storage (such as a removable memory card, memory key drive, networked storage, etc.) through the input/output device interfaces 2110.

The adapter 108/device 110/server(s) 120a/server(s) 120b includes input/output device interfaces 2110. A variety of components may be connected through the input/output device interfaces 2110. For example, the adapter 108 may be connected to the network(s) 10 and to the phone network 20 using the input/output device interfaces 2110. The adapter 108 (using input/output device interfaces 2110, etc.) may be configured to transmit and/or receive audio data using the phone network 20 and to transmit and/or receive data using the network(s) 10. In addition, the adapter 108 may be configured to transmit the audio data to server(s) 120a for further processing and/or to process the audio data using internal components such as an optional wakeword detection component 220.

In some examples, the device 110 may be connected to a microphone(s) 112, speakers 114, and/or a display 116. However, the disclosure is not limited thereto and the device 110 may not include integrated microphone(s) 112, speakers 114, and/or display 116. Thus, the microphone(s) 112, speakers 114, display 116, and/or other components may be integrated into the device 110 or may be separate from the device 110 without departing from the disclosure. In some examples, the device 110 may include an inertial measurement unit (IMU), gyroscope, accelerometers or other component configured to provide motion data or the like associated with the device 110. If an array of microphones 112 is included, approximate distance to a sound's point of origin may be performed acoustic localization based on time and amplitude differences between sounds captured by different microphones of the array. The device 110 (using microphone 112, wakeword detection component 220, ASR component 250, etc.) may be configured to determine audio data corresponding to detected audio. The device 110 (using input/output device interfaces 2110, etc.) may also be configured to transmit the audio data to server(s) 120a for further processing or to process the data using internal components such as a wakeword detection component 220.

The input/output device interfaces 2110 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 2110 may also include an interface for an external peripheral device connection such as universal serial bus (USB), FireWire, Thunderbolt, Ethernet port or other connection protocol that may connect to network(s) 10. The input/output device interfaces 2110 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The adapter 108/device 110/server(s) 120a/server(s) 120b further includes a telephone component, which may comprise processor-executable instructions stored in storage 2108 to be executed by controller(s)/processor(s) 2104 (e.g., software, firmware, hardware, or some combination thereof). For example, components of the telephone component may be part of a software application running in the foreground and/or background on the adapter 108/device 110/server(s) 120a/server(s) 120b. The telephone component may control the adapter 108/device 110/server(s) 120a/server(s) 120b as discussed above, for example with regard to FIGS. 1A-1C, 13, 14, 15A-15B, 16A-16B, 17, 18A-18B, 19A-19B and/or 20A-20B. Some or all of the controllers/components of the telephone component may be executable instructions that may be embedded in hardware or firmware in addition to, or instead of, software. In one embodiment, the adapter 108/device 110/server(s) 120a/server(s) 120b may operate using an Android operating system (such as Android 4.3 Jelly Bean, Android 4.4 KitKat or the like), an Amazon operating system (such as FireOS or the like), or any other suitable operating system.

Executable computer instructions for operating the adapter 108/device 110/server(s) 120a/server(s) 120b and its various components may be executed by the controller(s)/processor(s) 2104, using the memory 2106 as temporary "working" storage at runtime. The executable instructions may be stored in a non-transitory manner in non-volatile memory 2106, storage 2108, or an external device. Alternatively, some or all of the executable instructions may be embedded in hardware or firmware in addition to or instead of software.

The components of the adapter 108/device 110/server(s) 120a/server(s) 120b, as illustrated in FIGS. 21A-21D, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, via the internet and a local area network (LAN), from an adapter connected to i) the internet via the LAN and ii) a public switched telephone network (PSTN) using a telephone port, a first notification indicating that the PSTN is being used for a first telephone call;
   receiving, from the adapter via the internet, first audio data corresponding to the first telephone call;
   performing voice recognition on the first audio data;
   determining, based on results of the voice recognition, a first user profile corresponding to a first user and associated with a first phone number;
   receiving, from the adapter via the internet, a second notification corresponding to an incoming second telephone call from the PSTN, the second notification including caller identification received from the PSTN that is associated with the second telephone call, the caller identification indicating at least one of a second phone number or a name;
   determining contact information associated with the caller identification, the contact information including at least one of the second phone number or the name;
   determining that the contact information is associated with a second user profile corresponding to a second user and associated with the first phone number; and
   sending, via the internet to a device associated with the second user profile, a third notification of the second telephone call, the third notification including at least a portion of the contact information.

2. The computer-implemented method of claim 1, further comprising:
   receiving, from the device via the internet, a command to accept the second telephone call; and
   sending, to the adapter via the internet, an instruction to accept the second telephone call, send second audio data to the device, and receive third audio data from the device, wherein the adapter is configured to facilitate communications from the PSTN to the device.

3. The computer-implemented method of claim 1, further comprising:
   determining that the contact information is on a priority list;
   generating text data indicating the second telephone call, the text data including at least a portion of the contact information;
   generating, using text-to-speech processing, second audio data based on the text data;
   determining that the adapter is sending third audio data corresponding to the first telephone call to a second device; and
   sending, to the second device via the internet, the second audio data.

4. The computer-implemented method of claim 1, further comprising:
   determining a first weight associated with the first user profile;
   determining a second weight associated with the second user profile;
   determining that the second weight is greater than the first weight;
   generating text data indicating the second telephone call, the text data including at least a portion of the contact information;
   generating, using text-to-speech processing, second audio data based on the text data;
   determining that the adapter is sending third audio data corresponding to the first telephone call to a second device; and sending, to the second device via the internet, the second audio data.

5. A computer-implemented method comprising:
receiving, via the internet and a local area network (LAN), from a first device connected to i) the internet via the LAN and ii) a wired communication network using a telephone port, a first message indicating that the wired communication network is being used for a first synchronous communication session;
determining a first user profile associated with a first phone number and the first synchronous communication session;
receiving, via the internet from the first device, a second message corresponding to an incoming second synchronous communication session from the wired communication network, the second message including first caller information associated with the second synchronous communication session;
determining second caller information associated with the first caller information;
determining that the second caller information is associated with a second user profile associated with the first phone number that is different than the first user profile; and
sending, via the internet to a second device associated with the second user profile, a third message indicating the second synchronous communication session, the third message including at least a portion of the second caller information.

6. The computer-implemented method of claim 5, further comprising:
receiving, from the first device via the internet, audio data corresponding to the first synchronous communication session;
performing voice recognition on the audio data; and
selecting, based on results of the voice recognition, the first user profile.

7. The computer-implemented method of claim 5, wherein the first message includes at least one of a second phone number or a name associated with the first synchronous communication session, and the determining the first user profile further comprises:
determining contact information associated with at least one of the second phone number or the name;
determining a first weight value indicating a first likelihood that the contact information is associated with the first user profile;
determining a second weight value indicating a second likelihood that the contact information is associated with the second user profile; and
determining that the first weight value exceeds the second weight value.

8. The computer-implemented method of claim 5, wherein the determining that the second caller information is associated with the second user profile further comprises:
determining a first weight value indicating a first likelihood that the second caller information is associated with the first user profile;
determining a second weight value indicating a second likelihood that the second caller information is associated with the second user profile; and
determining that the second weight value exceeds the first weight value.

9. The computer-implemented method of claim 5, further comprising:
determining that the second caller information is associated with a priority list;
generating text data indicating the second synchronous communication session, the text data including at least a portion of the second caller information;
generating, using text-to-speech processing, audio data based on the text data;
sending, to the first device via the internet, the audio data; and
sending, to the first device via the internet, an instruction to output the audio data as part of the first synchronous communication session.

10. The computer-implemented method of claim 5, further comprising:
determining a first weight associated with the first user profile;
determining a second weight associated with the second user profile;
determining that the second weight is greater than the first weight;
generating text data indicating the second synchronous communication session, the text data including at least a portion of the second caller information;
generating, using text-to-speech processing, audio data based on the text data;
sending, to the first device via the internet, the audio data; and
sending, to the first device via the internet, an instruction to output the audio data as part of the first synchronous communication session.

11. The computer-implemented method of claim 5, further comprising:
receiving, from the second device via the internet, a command to accept the second synchronous communication session; and
sending, to the first device via the internet, an instruction to accept the second synchronous communication session, send first audio data to the second device, and receive second audio data from the second device.

12. The computer-implemented method of claim 5, wherein:
the first synchronous communication session involves a first user corresponding to the first user profile; and
the second synchronous communication session is intended for a second user corresponding to the second user profile.

13. The computer-implemented method of claim 5, wherein:
the first caller information corresponds to caller identification received by the first device from the wired communication network; and
the second caller information is obtained from a database associated with the second user profile.

14. The computer-implemented method of claim 5, wherein:
the first caller information corresponds to caller identification received by the first device from the wired communication network, the caller identification including at least one of a second phone number or a name; and
the second caller information corresponds to contact information associated with at least one of the second phone number and the name, the contact information associated with at least the second user profile.

15. A computer-implemented method, comprising: receiving, via the internet and a local area network (LAN), from a first device connecting to i) the internet via a the LAN and ii) a wired communication network via at least one network component using a telephone port, a first message indicating that the wired communication network is being used for a first synchronous communication session;

determining a first user profile associated with a first phone number and the first synchronous communication session;

receiving, via the internet from the first device, a second message corresponding to an incoming second synchronous communication session from the wired communication network, the second message including first caller information associated with the second synchronous communication session;

determining second caller information associated with the first caller information; determining that the second caller information is associated with a second user profile associated with the first phone number that is different than the first user profile;

determining that at least one of the second user profile has priority over the first user profile or the second caller information is on a priority list;

generating text data indicating the second synchronous communication session, the text data including at least a portion of the second caller information;

generating, using text-to-speech processing, first audio data based on the text data;

determining a second device associated with the first synchronous communication session; and sending, to the second device, the first audio data.

16. The computer-implemented method of claim 15, further comprising:

determining a third device associated with the second user profile; and sending, to the third device via the internet, a third message indicating the second synchronous communication session, the third message including at least a portion of the second caller information.

17. The computer-implemented method of claim 16, further comprising:

receiving, from the third device via the internet, a command to accept the second synchronous communication session; and sending, to the first device via the internet, an instruction to accept the second synchronous communication session, send second audio data to the third device, and receive third audio data from the third device.

18. The computer-implemented method of claim 15, wherein sending the first audio data further comprises:

determining that the second device is communicating with the first device via the internet; and sending, to the second device via the internet, the first audio data.

19. The computer-implemented method of claim 15, wherein sending the first audio data further comprises:

determining that the second device is an analog telephone communicating with the first device via the at least one network component;

sending, to the first device via the internet, the first audio data; and sending, to the first device via the internet, an instruction to output the first audio data to the second device.

20. The computer-implemented method of claim 15, wherein determining the first user profile further comprises:

receiving, from the first device via the internet, second audio data corresponding to the first synchronous communication session;

performing voice recognition on the second audio data; and selecting, based on results of the voice recognition, the first user profile.

21. The computer-implemented method of claim 5, wherein the first device is capable of connecting to the wired communication network via a demarcation point associated with the first phone number.

* * * * *